United States Patent
Cooper et al.

(10) Patent No.: US 6,512,597 B1
(45) Date of Patent: Jan. 28, 2003

(54) METHOD AND APPARATUS FOR CORRECTING UNADJUSTED THRESHOLD ARRAYS FOR HALFTONING BY USE OF PARAMETERIZED TRANSFER FUNCTIONS THAT GENERATE ADJUSTED THRESHOLD ARRAYS AT RUN TIME

(75) Inventors: Brian Edward Cooper, Lexington, KY (US); Brian Wesley Damon, Lexington, KY (US); Paul Athanasius Robinson, Lexington, KY (US); Thomas Campbell Wade, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/442,211

(22) Filed: Nov. 17, 1999

(51) Int. Cl.[7] .............................................. G06F 13/00
(52) U.S. Cl. ......................... 358/1.9; 358/1.2; 358/1.5; 358/452
(58) Field of Search ........................ 358/1.2, 1.5, 1.9, 358/1.11, 1.12, 1.14, 1.15, 1.16, 1.17, 444, 452, 296

(56) References Cited

U.S. PATENT DOCUMENTS

| | | |
|---|---|---|
| 5,455,873 A | 10/1995 | Cameron |
| 5,480,240 A | 1/1996 | Bolash et al. |
| 5,542,029 A | 7/1996 | Karlsson |
| 5,553,200 A | 9/1996 | Accad |
| 5,647,026 A | 7/1997 | Kwarta |
| 5,754,309 A | 5/1998 | Chen et al. |
| 5,854,882 A | 12/1998 | Wang |
| 6,266,155 B1 * | 7/2001 | Lee et al. .................... 358/1.9 |

OTHER PUBLICATIONS

Adobe Systems, PostScript language reference manual/ Adobe Systems 2nd ed., Addison–Wesley Publishing Company, Inc. (US), p. 307–309, (1985).

* cited by examiner

Primary Examiner—Mark Wallerson
(74) Attorney, Agent, or Firm—Frederick H. Gribbell

(57) ABSTRACT

A printer that stores a minimal number of unadjusted stochastic threshold arrays in non-volatile memory, in which the unadjusted threshold arrays are used to generate adjusted threshold arrays at run time by use of special parameterized transfer functions. The unadjusted array for a particular color is stored in the printer's ROM and preferably is stored in a packed configuration to save memory space. The parameterized transfer functions are used to convert the unadjusted threshold data into adjusted threshold data for each color and type of print media. These parameterized transfer functions are stored in the printer's non-volatile memory, and take up very little memory space. In a preferred embodiment, the unadjusted threshold array comprises a 128 row by 128 column sized array, and each element of this array comprises a 10-bit number. When a parameterized transfer function is applied to this unadjusted array, the resulting numeric values for the adjusted array elements are produced as 8-bit numeric values. The greater precision in the originating unadjusted array provides more perceptual levels of intensity (i.e., color brightness), which is particularly important at the lighter shades of each color. The adjusted threshold arrays add only the number of dots per gray level (i.e., per differential threshold array level) that are required to provide a printer response that very nearly approximates the human eye perceptual differential response of intensity.

48 Claims, 11 Drawing Sheets

METHOD AND APPARATUS FOR CORRECTING UNADJUSTED THRESHOLD ARRAYS FOR HALFTONING BY USE OF PARAMETERIZED TRANSFER FUNCTIONS THAT GENERATE ADJUSTED THRESHOLD ARRAYS AT RUN TIME

TECHNICAL FIELD

The present invention relates generally to image forming equipment and is particularly directed to printers of the type which halftone color or black and white images. The invention is specifically disclosed as a printer that provides a 10-bit unadjusted stochastic threshold array, and applies one or more parameterized transfer function equations at run time to the unadjusted array to derive an 8-bit adjusted threshold array, thereby improving perceptual printer response while saving memory space.

BACKGROUND OF THE INVENTION

Threshold arrays have been used for years to accomplish halftoning for image forming equipment, such as printers. Modern printers generally use a threshold array in a tiling manner to halftone a particular square or rectangular portion of an image bitmap that is to be printed, and then move the threshold array to the next position as if placing a new tile over the bitmap in an adjacent location. Video displays also can operate using tiled threshold arrays. Threshold arrays include array elements that have numeric values that range from the lightest gray scale shade to the darkest gray scale shade. As the light intensity (or a particular color intensity) increases, a greater number of pixels will be illuminated in a display device such as a liquid crystal display, or conversely a fewer number of dots will be printed in the case of a printer as the output device. This is accomplished by comparing the actual pixel intensity values against the array element numeric values. For example, all dots will be printed. for threshold levels at array element locations that have a numeric value less than the dot intensities of the input image information.

The numeric values of the array elements for threshold arrays in conventional printers are normally integer values that define a plurality of gray levels, and the most typical range of numeric values is from 0 through 255, which are represented by 8-bit binary numbers. Since 8-bit linear or unadjusted threshold arrays produce printed responses that typically do not match the desired linear human perceptual response, it has been common for most printers to provide adjusted (or corrected) threshold arrays for each color that can be printed by that particular print engine. In color printers, for example, this implies that there would be a minimum of three different adjusted threshold arrays for the "ordinary" colors cyan, magenta, and yellow, and further, many color printers also provide black ink, thereby requiring a fourth adjusted threshold array. (Some printers may provide a single threshold array to be used for all colors, but the visual results are not pleasing.) Such adjusted threshold arrays may have array elements of integer numeric values or, to achieve greater precision, the numeric values could each be represented by a floating point number. Floating point values will require, of course, much more storage space in the memory system of a printer than the use of integer values. One main reason that 8-bit integer values are typically used for the gray level representations is that standard memory devices provide "chunks" of memory in bytes, which each comprise a set of 8 bits.

Early printers may have used unadjusted threshold arrays to produce their final printed outputs, however, such printers usually lose tone levels, and at best exhibit crude approximations to the desired perceptual tone levels. While some print engines may produce reasonable perceptual responses by use of unadjusted threshold arrays, that is not the general case, and adjusted threshold arrays are much more common.

To develop a linearized halftone screen, it is common to start with a grid of equal proportions of the numbers between one (1) and the maximum value, and then print squares representing each of the tone levels. The printed squares can be then measured with respect to the parameter that is desired to be linearized. The series of measured values can then be assembled and analyzed to form an adjusted (or corrected) halftone screen or threshold array that is linear. The new screen or array is formed for a given paper type, color plane, printing mechanism, etc., and usually is stored in ROM to be used when printing.

The maximum value of the equal proportions used in generating the unadjusted threshold array may not be the same as the maximum tone level. However, the maximum values of the adjusted screen or threshold array and the tone level must be the same. It very rarely occurs that using an unadjusted screen yields a set of equally visually spaced discernible intensity levels, which is the property of a "perfect" halftone screen. Thus, it is necessary to "correct" (or adjust) this screen.

In correcting the screen (or threshold array), the first thing to be achieved is determining a set of distinct intensity levels, as many as the number of tone levels (i.e., gray scale levels in many cases). These intensity levels must be analyzed and modified so that they are as visually distinct as possible. This usually is done by linearizing the screens in $L^*$ space. Historically, correction (or adjustment) of the screens or threshold arrays has been done using one of two different methods. The first method is referred to as the "array mapping" method, which stores a one-dimensional array that maps each of the possible values in the uncorrected (or unadjusted) screen or threshold array to the appropriate value in the corrected (or adjusted) screen or threshold array. Each of the values in the unadjusted screen or threshold array is used as an index to the array map, and the adjusted screen or threshold array is formed therefrom. This method saves memory space, but can be restrictive concerning the number of dots that must be placed on the page for different tone levels. For example, if the uncorrected (or unadjusted) screen or array has dimensions of 128×128, and if there are 256 tone levels, each tone level must contain 64 more dots than the previous level, assuming that the unadjusted screen or array contains equal proportions of each value (which must be true if it is to be used as a base to transition to adjusted (or corrected) arrays).

Since being restricted to adding a fixed number of dots at each level reduces the number of distinct intensity levels, accuracy will suffer. This accuracy problem can be alleviated by increasing the range of values in the unadjusted screen or array until the maximum number of unique levels is obtained. Unfortunately, this also increases the size of both the one-dimensional arrays and the unadjusted screens, which are both stored in the printer when using the array mapping method. The size of the one-dimensional arrays increases proportionally with the bit size of the uncorrected (or unadjusted) screens or threshold arrays.

The second historical correcting method is called the "complete storage" method. This performs the complete correction of the threshold arrays offline, and all of the adjusted (or corrected) threshold arrays are stored in the ROM of the printer. No correction takes place at run time. This method requires a large amount of memory space; however, it's advantage it that the adjusted (or corrected) threshold arrays can be manipulated as necessary to obtain the greatest number of visually discernible intensity levels, since all correction is done offline (i.e., at the factory). Increase of accuracy does not mean an increase of the memory space required for storage. Nevertheless, the memory storage space is quite large for any threshold arrays of meaningful precision.

In printers that provide adjusted threshold arrays, a separate transfer function is typically determined for each color that can be printed, and additionally, for each type of print media that will be printed on. The benefits of using adjusted threshold arrays include assuring that there will be 256 unique tone levels (e.g., for 8-bit integer gray levels), and further, to produce tone levels as close as possible to each desired perceptual level. However, a separate array must be generated for each combination of color and type of paper, and therefore, a large amount of memory is required to store each of the separate, adjusted threshold arrays. More detailed examples of the memory requirements are provided hereinbelow.

Once the printer's actual response curve is known, it is possible to apply a transfer function to correct or adjust the data so that a perceptually appropriate gray level will be printed for a corresponding lightness level L*. In the prior art, such transfer functions have normally taken the form of a correction factor that is added to the gray level for a particular lightness L* value. In essence, the printer's response curve (such as curve 102 on FIG. 2) is compared to the ideal target response (such as line 100 on FIG. 2), and the deviation at all important points is calculated. Once this deviation is known, it is a simple matter to create a mirror-image curve on the opposite side of the ideal target response line 100, and this mirror-image curve can be added to the actual printer response curve (such as curve 102) and an average taken, which then will provide the adjusted (or corrected) response that will have the appearance of the ideal target response line 100.

While the prior art methodology works well for many conventional printers, a large amount of memory storage space is required to store the corrected threshold array that is generated or derived by applying the mirror image transfer function curve to correct for the printer's non-linear actual response curve. Moreover, since correcting for each printer color and print media type will lead to a large number of possible combinations, it has been common in the prior art for the conventional printers to store a large number of such adjusted threshold arrays in their non-volatile memory, such as in the printer's ROM, thereby requiring substantial amounts of memory space.

Since threshold arrays provide an extremely fast way to halftone an image, various types of halftoning techniques have been developed that all use threshold arrays, including cluster-dot ordered dithering (known as "classical" screening), dispersed-dot ordered dithering (known as "Bayer" screening), dispersed-dot unordered dithering (known as stochastic screening), or another form of stochastic screening, using cluster-dot unordered dithering. For printers that must quickly process image data for an incoming print job, this extremely fast method using threshold arrays so far seems to be the optimum method to halftone various types of images. It would be very beneficial to further streamline the process of providing corrected threshold arrays, especially when that process can also save memory space within the printer's memory circuits.

SUMMARY OF THE INVENTION

Accordingly, it is a primary advantage of the present invention to provide an image forming apparatus such as a printer that stores a minimum number of threshold arrays in non-volatile memory, and at run time creates adjusted threshold arrays to meet the precise print job requirements, such as for the appropriate colors and appropriate types of print media.

It is another advantage of the present invention to provide an image forming apparatus such as a printer that stores a minimal number of unadjusted threshold arrays consisting of numeric elements that have a greater precision than the numeric elements of adjusted threshold arrays that are derived at run time and which benefit from the greater precision of the unadjusted arrays to more nearly match the printer's response to the human visual perceptual levels.

It is a further advantage of the present invention to provide an image forming apparatus such as a printer that stores a minimal number of unadjusted threshold arrays consisting of numeric elements that have a greater precision than the numeric elements of adjusted threshold arrays that are derived at run time and which benefit from the greater precision of the unadjusted arrays to create a predetermined non-linear response that closely matches a response of another printing device, as desired for a specific printing application.

It is a yet further advantage of the present invention to provide an image forming apparatus such as a printer that stores a minimal number of unadjusted threshold arrays and generates adjusted threshold arrays that are derived at run time and which compensate for the gradual change in darkness of the printer response due to the aging of an electrophotographic (EP) process cartridge over its useful life, by providing new transfer functions that further correct the adjusted threshold arrays after predetermined amounts of usage of the EP process cartridge.

It is yet another advantage of the present invention to provide an image forming apparatus such as a printer that stores a minimum number of unadjusted threshold arrays along with a set of transfer function equations that can quickly produce a set of adjusted threshold arrays that are minimal in number to reduce memory requirements, and further that are produced for the specific print job requirements, such as the appropriate colors to be printed as well as the type of print media to be printed upon.

It is still a further advantage of the present invention to provide an image forming apparatus such as a printer that stores a minimal number of unadjusted threshold arrays in a packed memory configuration to minimize the amount of memory space required in a non-volatile memory circuit, and to provide an unpacking routine that quickly re-configures the unadjusted threshold array data in a format that allows quick access and application of a set of transfer function equations to derive a set of adjusted threshold arrays to be stored in the printer's RAM circuit.

It is still another advantage of the present invention to provide an image forming apparatus such as a printer having a minimal number of unadjusted threshold arrays stored in a printer's non-volatile memory circuit in a packed data format to minimize the amount of space required in the printer's ROM storage circuit, and to provide an unpacking routine that quickly unpacks the unadjusted threshold array data, and applies one or more transfer function equations that generate a set of adjusted threshold arrays at run time, in which these adjusted threshold arrays are generated for the precise print job requirements, such as appropriate colors and type of print media to be printed upon.

It is yet a further advantage of the present invention to provide a set of packed data stochastic threshold arrays that are stored in a printer's non-volatile memory circuit, in which these threshold arrays comprise array elements having numeric values of a greater precision than the precision of numeric elements for later derived adjusted threshold arrays that are generated at run time by the printer after application of a set of transfer function equations that convert the unadjusted threshold arrays into adjusted threshold arrays.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an improved printer is provided that stores a minimal number of unadjusted stochastic threshold arrays in non-volatile memory, in which a single stochastic threshold array is provided per ordinary color of the printer. For example, if the printer is a black and white printer only, then only a single stochastic threshold array would be required. This single unadjusted array is used to determine the printer's light intensity printed response, which will not likely provide an ideal target response as compared to the perceptual intensity levels of the human eye. Accordingly, the uncorrected threshold array needs to be adjusted before the array is used to halftone image data in the form of a print job.

The unadjusted array for a particular color is stored in the printer's ROM (Read Only Memory) and preferably is stored in a packed configuration to save memory space. A set of transfer function equations (also referred to herein as "parameterized transfer functions") additionally are provided for the various types of print media that can be expected for use with a particular printer, as well as for various combinations of ordinary colors and specialized colors. For example, if the uncorrected threshold array represents the color magenta, and if the print media type is "plain paper," and further if the type of printing that is to be accomplished is to use the "ordinary" magenta shading, then either a single transfer function equation, or multiple transfer function equations, is/are applied to the unadjusted threshold array, which produces a single corrected threshold array that will be the "target array" for halftoning the color magenta when printing this particular print job. On the other hand, if a "diluted" magenta color ink is to be utilized (for example, if a color "photo cartridge" is used in a particular style of ink jet color printer), then a different set of transfer function equations will be applied to the unadjusted threshold array to produce a different adjusted threshold array (i.e., for diluted magenta ink) that will finally be used at run time to halftone this particular print job. This is just one example of the various combinations of color shades and print media types that can be utilized with a modem color printer.

The mere use of unadjusted threshold arrays will typically produce printed shades that are too dark as compared to the incremental shade differences as perceived by the human eye. The transfer function equations are used to convert the unadjusted threshold data into adjusted threshold data for each color and type of print media. In a preferred embodiment, the particular transfer function equations generate a temporary conversion table which essentially acts as a look-up table in which the original numeric value of a particular array element in the unadjusted threshold array is found, and a different numeric value is then substituted therefor. In short, for every array element position in which the original numeric value appeared, a corrected numeric value is then substituted in the same row and column position of the derived, adjusted threshold array. This occurs very quickly at run time for each print job received by the printer that requires halftoning.

As an alternative embodiment, the transfer function equations can be applied to each single data element of the unadjusted threshold array, and a new "corrected" data value can be calculated and placed into the appropriate memory element location in the adjusted threshold array now being derived. In this alternative methodology, a temporary look-up table is not needed, which saves some space in the printer's RAM that otherwise would need to be temporarily allocated. However, in this alternative methodology, the execution or processing time to derive the adjusted threshold array in this manner—that is, by inspecting each numeric value of the unadjusted threshold array and then applying the correct transfer function equation for the correct range of gray scale values to calculate the corrected numeric value in the adjusted array—will likely be greater than that of the preferred methodology described above. It should be noted that multiple calculations for the very same numeric value will be the result of applying the alternative methodology in circumstances where the unadjusted threshold array is of a sufficient size, i.e., if its size requires the same threshold level numeric value in multiple array element locations.

In the preferred mode of the present invention, the unadjusted threshold array comprises a 128 row by 128 column sized array, and each element of this array comprises a 10-bit number having a precision of one part in 1024. When the transfer function equations are applied to this unadjusted array, the resulting numeric values for the adjusted array elements are produced as 8-bit numeric values, which provides a somewhat lower precision of one part in 256. This greater precision in the originating unadjusted array provides more perceptual levels of intensity (i.e., color brightness), which is particularly important at the lighter shades of each color. This greater number of possible printed gray levels by using the 10-bit numeric data is used to advantage, and the adjusted threshold arrays derived therefrom will add only the number of dots per gray level (i.e., per differential threshold array level) that are required to provide a printer response that very nearly approximates the human eye perceptual differential response of intensity. In essence, the 8-bit adjusted threshold arrays used in printing the colors effectively have the precision of 10-bit data.

Since most modem microprocessor and memory circuits are based upon 8-bit bytes, use of 10-bit data normally requires a 2-byte data word for storage in the memory circuit. Such 2-byte data words are easily accessed for each individual 10-bit data numeric value. However, in the preferred embodiment of the present invention, the unadjusted threshold arrays are stored in a packed data format, such that contiguous memory locations are used to store each 10-bit numeric value with no unused bits spaced therebetween (e.g., such as "padding bits" used to round the data size up to two bytes per value). This saves over 35% of the memory space in the printer's non-volatile memory required for storing the unadjusted threshold arrays.

At run time, it is preferred to unpack this 10-bit data for the unadjusted threshold arrays by removing each 10-bit numeric value from the packed memory locations and placing it into a different 2-byte set of memory locations, which then makes it very easy to access this 10-bit data value merely by scrolling through the various memory locations. The appropriate transfer function equations are then applied to each unadjusted threshold array, and the output of this transfer function equation application is an 8-bit numeric value for each array element in the derived adjusted threshold array that will be used for printing that particular color/media combination. Since the adjusted threshold array uses 8-bit numeric data, this will perfectly correspond to a single byte of memory space, thereby most efficiently packing this adjusted array data.

The principles of the present invention can be applied to any type of unadjusted threshold arrays, regardless of how they are derived (e.g., stochastic, dot-cluster, etc.). Moreover, the present invention will produce a memory savings in the printer regardless of the data size of the unadjusted threshold arrays and the resulting adjusted threshold arrays, by use of the transfer function equations as described hereinbelow. Furthermore, the present invention can be used to advantage regardless of whether or not the data is packed or unpacked, since both a memory storage space savings is exhibited, as well as an increase in efficiency by using less processing time to derive the adjusted threshold arrays at run time, as compared to other methodologies. Finally, the present invention can be used to advantage to provide corrected threshold arrays regardless of the shape of the response curves of any of the colors when utilizing a particular print engine's response curve for its unadjusted threshold array data.

The principles of the present invention not only apply to printers, but also apply equally well to other types of image forming apparatuses including copiers and video displays that use halftoning techniques. Of course, many video monitors do not require halftoning, since they can be designed to directly apply the correct intensity of the individual primary colors for each pixel. However, certain types of video displays may well require halftoning for a correct or pleasing visual appearance of images. Such video displays include liquid crystal displays (LCD's) and light emitting diode (LFD) displays. Moreover, even some cathode ray tube (CRT) displays may use halftoning, especially for older such CRT's.

The principles of the present invention further apply not only to situations where the printer's response is being corrected so as to appear "linear" in accordance with human visual perception, but also to situations where the printer's response is purposely being corrected so as to appear "non-linear" in accordance with a customer/user's printing application. Moreover, the principles of the present invention can be used to compensate for the gradual change in darkness in the printer response due to aging of components of EP-type printers (including components of EP process cartridges). A new set of transfer function equations can be applied to create a new set of adjusted threshold arrays after predetermined amounts of usage of the EP process cartridge, or other internal printer components.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
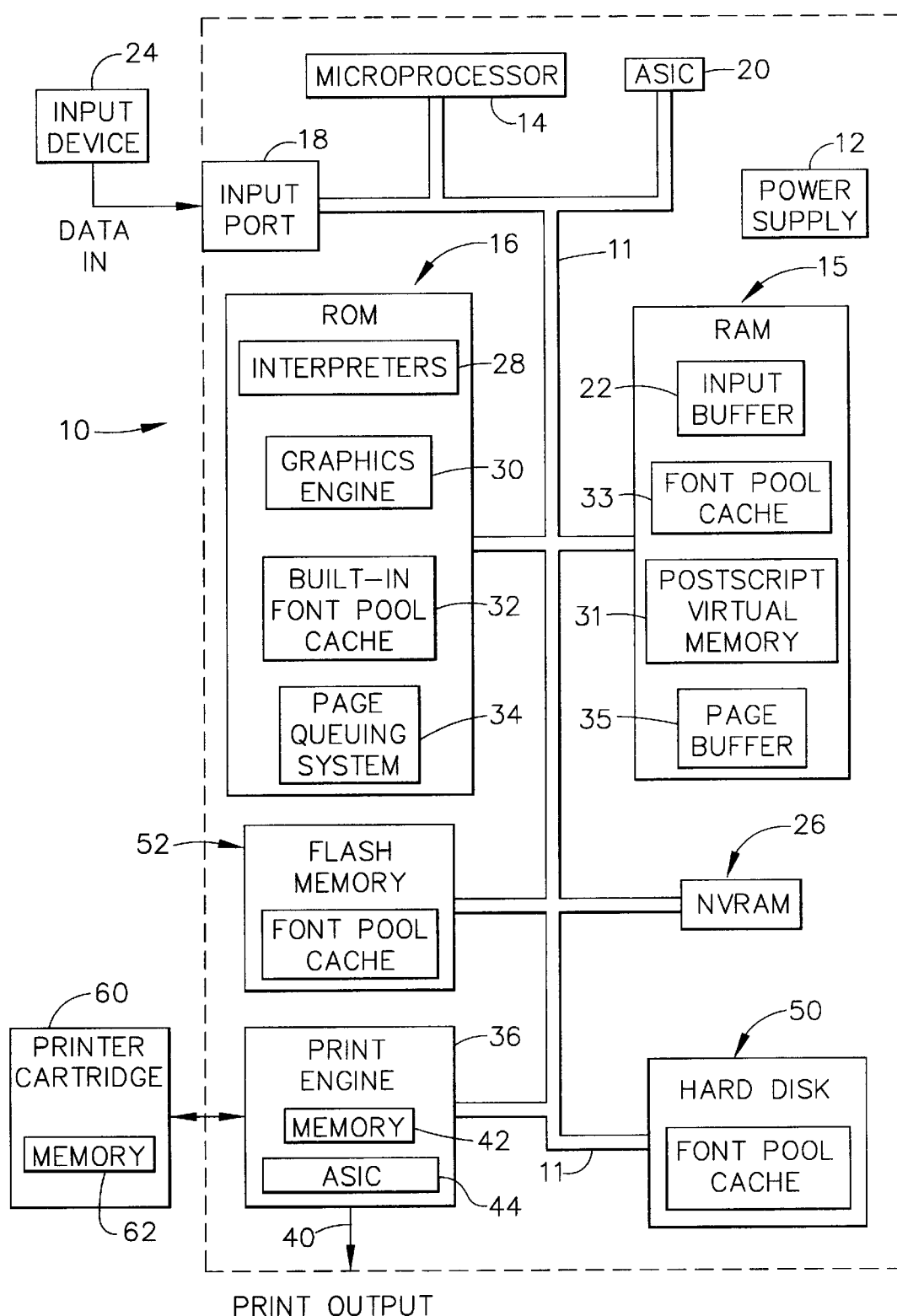
FIG. 1 is a block diagram of the major components of a printer, as constructed according to the principles of the present invention.

Referring now to the drawings, FIG. 1 shows a hardware block diagram of a laser printer generally designated by the reference numeral 10, although virtually the same components will be found on many ink jet printers. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM) 15, which is divided by software operations into several portions for performing several different functions.

Laser printer 10 also contains at least one input port, or in many cases several types of input ports, as designated by the reference numeral 18. Each of these ports would be connected to a corresponding input buffer, generally designated by the reference numeral 22 on FIG. 1. Each port 18 would typically be connected to an output port of either a personal computer (PC) or a workstation (WS) (designated on FIG. 1 as an "input device" 24) that would contain a software program such as a word processor or a graphics package or computer aided drawing package, or to a network that could be accessed by such a PC or WS. Laser printer 10 preferably will also contain an Application Specific Integrated Circuit (ASIC) 20, which typically contains a large number of programmable logic circuits.

Once text or graphical data has been received by input buffer 22, it is commonly communicated to one or more interpreters designated by the reference numeral 28. A common interpreter is PostScript™, which is an industry standard used by many laser printers. To speed up the process of rasterization, a font pool and typically also a font cache are stored in memory within most laser printers, and these font memories are designated by the reference numeral 32, 33, 50 and 52 on FIG. 1. Such font pools and caches supply bitmap patterns for common characters so that a graphics engine 30 can easily translate each such character into a bitmap using a minimal elapsed time. The memory devices designated by the reference numerals 50 and 52 may be options on most laser printers, in which a hard disk drive 50 and/or a Flash memory device 52 can be added to the base printer upon the request of the user/customer. Such alternative storage memory devices also will likely appear in top-line ink jet printers in the future.

Once the data has been rasterized, it is directed by a page queuing system 34 into a page buffer, which is a portion of RAM designated by the reference numeral 35. In a typical laser printer, an entire page of rasterized data is temporarily stored by the page queuing system 34 in the page buffer 35, although some of the more modern laser printers do not buffer an entire page's worth of data at one time, thereby managing to operate with a much smaller amount of RAM in a "partial page buffer." The data within the page buffer 35 is communicated in real time to a print engine designated by the reference numeral 36. Print engine 36 includes a laser light source within its printhead (not shown), and its output 40 is the physical printing onto a piece of paper, which is the final print output from laser printer 10. Print engine 36 also may contain a programmable non-volatile memory device 42, in addition to registers contained within its ASIC 44 that may act as either RAM or ROM, as desired. Programmable memory device 42 could consist of a Flash type-device, or an NVRAM-type device, for example, or any other type of non-volatile memory device. Of course, certain printer-specific information could be stored within the programmable memory device 42, and preferably this information can be updated from a host computer (e.g., input device 24) if desired. This concept will be discussed in greater detail hereinbelow, as applicable to the present invention.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers. For ease of illustrating the present invention, the various buses used within printer 10 are grouped on FIG. 1 into a single bus pathway, designated by the reference numeral 11.

A portion of the RAM 15 is typically allocated for virtual memory for at least one interpreter, and on FIG. 1 a POSTSCRIPT virtual memory is depicted at the reference numeral 31. This virtual memory 31 can, for example, be used for storing PostScript font descriptors within the printer. In addition, particularly important information that is to be retained in printer 10 while unpowered can be stored in a quickly accessible non-volatile memory location called "NVRAM," which is designated by the reference numeral 26. This non-volatile RAM is most likely (using today's technology) an EEPROM integrated circuit chip.

A replaceable cartridge, generally designated by the reference numeral 60, is used in typical printing devices available at the present time. For ink jet printers, reference numeral 60 represents one or more ink cartridges that contain the black or colored ink that is supplied to the ink jet nozzles of the print engine 36. In many modem ink jet printers, a black ink cartridge is supplied separately from a colored ink cartridge that contains the standard "process" colors of cyan, magenta, and yellow ink. For laser printers (or other types of electrophotographic printing devices), reference numeral 60 represents a replaceable EP process cartridge that contains toner material, as well as a new photoconductive drum unit (not shown) supplied in most such EP process cartridges. The EP process cartridge typically contains black toner material for monochrome laser printers, and at least three different toner materials for color laser printers (for the standard "process" colors of cyan, magenta, and yellow—and possibly black), although multi-color EP printers and copiers are also available that use multiple individual toner cartridges that each contain only a single color of toner material. Whether or not a black toner cartridge—or a black toner "bay" of a multi-color EP process cartridge—is included for the particular printer or copier is a matter of design choice.

Some conventional EP process cartridges contain a non-volatile memory device, such as an EEPROM chip or an EPROM chip. For purposes of the present invention, the cartridge 60 contains a non-volatile memory device 62 that is programmable. Programmable memory device 62 could consist of a Flash type-device, or an NVRAM-type device, for example, or any other type of non-volatile memory device.

It is preferred to be able to update the stored information contained in this memory device 62. On the other hand, a write once, read often memory device could be used in conjunction with the present invention in a situation where the information stored therewithin is specific to certain characteristics of this particular cartridge 60. For example, in a laser printer one EP process cartridge 60 could provide a certain type of toner material that produces a particular response curve vs. intensity level of the image data, whereas a second, later design EP process cartridge 60 could provide a somewhat different type of toner material that produces a different particular response curve vs. intensity level of the image data. Such characteristics could be stored on memory device 62 and reported to the print engine 36 when the EP process cartridge 60 is installed into the main printer body of printer 10. Other types of data could also be stored on the memory device 62, as will be described in greater detail, hereinbelow.

In another example, in an ink jet printer one color toner cartridge 60 could provide a certain type of color inks that produce a particular response curve vs. intensity level of the image data, whereas a second color toner cartridge 60 could provide a somewhat different type of color inks (e.g., "dilute" colors) that produces a different particular response curve vs. intensity level of the image data. Such characteristics could be stored on memory device 62 and reported to the print engine 36 when the toner cartridge 60 is installed into the main printer body of printer 10. Other types of data could also be stored on the memory device 62, as will be described in greater detail, hereinbelow.

Figure 2:
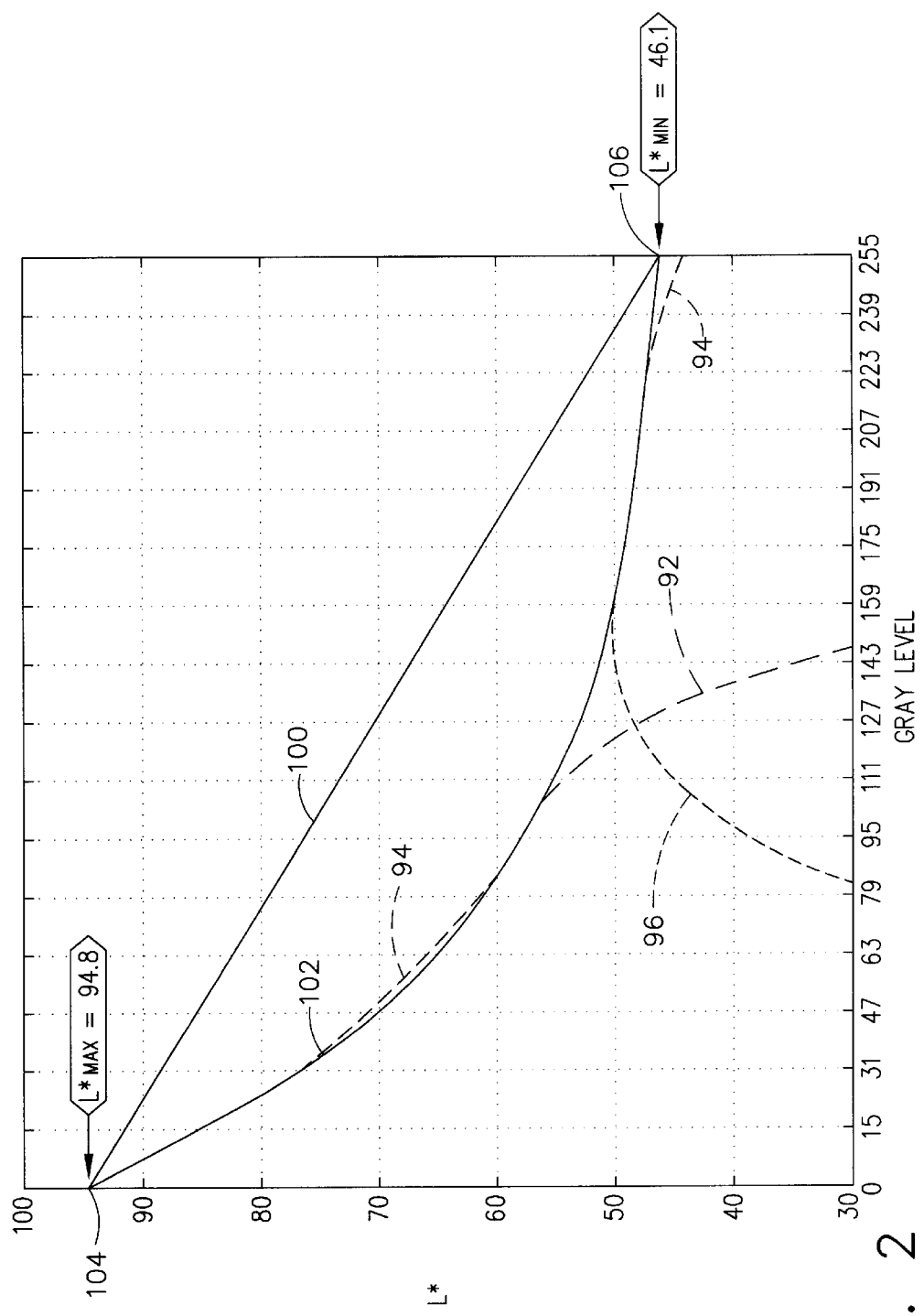
FIG. 2 is a graph illustrating the printer response for a single color showing actual darkness versus gray level, as well as the ideal target response, and further depicts a set of transfer function equations calculated to "fit" the printer response curve, as according to the principles of the present invention.

On FIG. 2, the line 100 represents the ideal target response for a printer that produces an output using gray level halftoning between its darkest possible output (as at the reference numeral 106) and its lightest possible output (as at the reference numeral 104). On FIG. 2, the gray levels are represented by 8-bit binary numbers ranging between zero (0) and 255. In this example, zero (0) represents the lightest gray level shade, while 255 represents the darkest gray level shade.

If the printer mechanism were ideal, then the printer's output (or "response") would directly follow the line 100 between the lightest L* light intensity level at 104, and the darkest L* light intensity level at 106. FIG. 2 represents actual printer data for an ink jet printer that is printing the color magenta. On "plain paper" the lightest possible shade shows up as an L* value of 94.8 (which is blank paper), while the darkest possible shade is represented as an L* value of 46.1. Since the printer cannot create any darker L* value, there is no point in attempting to correct for values less than L*=46.1 (or above L*=94.8, which is due strictly to the paper brightness).

Since the vast majority of printers do not have an ideal response, it is preferred that their output responses be adjusted or corrected. Using the actual print data depicted along the curve 102, it can be seen that the example printer quickly produces light intensities for the color magenta that are much too dark as compared to the ideal response at line 100. In other words, the printer is simply producing too many dots at each incremental gray level after departing from the lightest possible point on the curve at L*=94.8 (at the reference numeral 104), which, of course, is where no dots at all were printed. The curve 102 was generated by increasing the number of dots per gray level at a constant differential number of dots per next increasing gray level. This produces the unadjusted (or uncorrected) gray level response, as exhibited by the curve 102.

Unless some type of correction is applied to the printer's output, the printer's colors will always appear to be too dark with respect to the human eye's perceptual level. This is not only true with the single color magenta, but is also true for other colors on the vast majority of printers. Therefore, not only must the single color magenta be corrected, but all of the other printing primary (or "ordinary") colors must be corrected, which typically would include cyan, yellow, and black. Each of these individual colors will have an individual response curve of L* versus gray level, although in the case of the color yellow, the preferred response curve to be analyzed and corrected for would be the b* curve versus gray level. It will be understood that the variables L* and b* refer to the CIELAB industry standard using the L*a*b* color space terminology.

Not only are the response curves for various colors different from one another for a particular printer, but additionally the color response for different types of print media also generate different curves on the L* or b* versus gray level graphs. For example, on FIG. 3 the three different curves, 102, 112, and 122, represent the printer response for the color magenta on three different types of paper. The curve 102 is the same as the curve seen on FIG. 2, and is for "plain paper." The curve 112 also represents the printer's actual response for the color magenta, however, in this case the print media is "coated paper." Finally, the curve 122 also represents the printer's actual response for the color magenta, although in this case the print media is "glossy paper."

Figure 3:
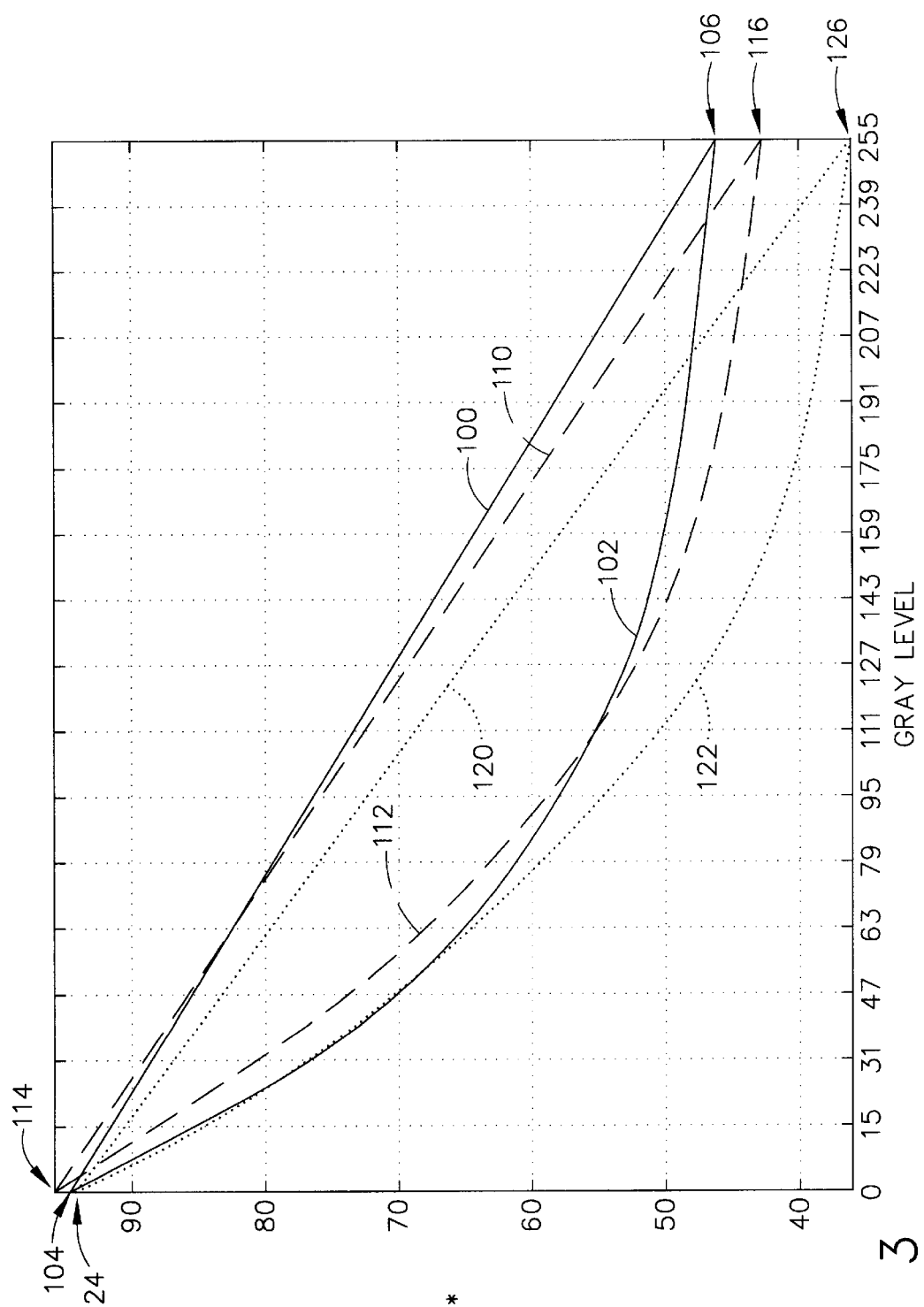
FIG. 3 is a graph illustrating an actual printer response for printing on three different types of paper, showing print darkness versus gray level, as well as their ideal target response for those three paper types.

As can be seen by viewing FIG. 3, each of these curves 102, 112, and 122 not only has a different shape, but also has different starting and stopping points between the lightest shades at the gray level zero (0) and the darkest shades at the gray level 255. As was seen on FIG. 2, the curve 102 had a lightest end point at 104 and a darkest end point at 106, and the ideal target response was the line 100 between those two points. For the coated paper example, the curve 112 has its lightest shade end point at 114 and its darkest shade end point at 116, and the ideal target response is represented by the line 110 between those two points. Finally, the glossy paper example of curve 122 has its lightest shade end point at 124 and its darkest shade end point at 126, with an ideal target response line 120 between those two points.

The present invention eliminates the need for storing a large number of adjusted threshold arrays in a printer's non-volatile memory, such as its Read Only Memory (ROM). This can be a significant savings in memory, as will be described in greater detail hereinbelow. In the present invention, it is preferred to store only a single unadjusted threshold array for each of the ordinary colors that can be printed by a particular printer. If the printer is a monocolor laser printer, for example, then it is preferred to store only a single threshold array that comprises unadjusted data. It is preferred to generate the appropriate adjusted threshold array for each color and for the particular type of print media that will be printed upon, and this generation preferably will occur at run time after the printer receives a print job from a host computer.

A The adjusted threshold array for each color type/print media type combination used in a particular print job preferably will be generated or derived from one or more parameterized "transfer function equations" that are stored in the printer's non-volatile memory. The non-volatile memory that stores the transfer function equations can either be ROM (such as ROM 16 on FIG. 1), or it can be non-volatile Random Access Memory (also known as NVRAM), such as the NVRAM circuit 26 on FIG. 1. As described hereinabove, the present technology for NVRAM circuits typically uses an EEPROM integrated circuit technology. The use of NVRAM type circuitry makes it possible to easily change the transfer function equations, if desirable. This can be a significant advantage for printers that can be upgraded to use different colors of ink, or different types of print media, which were not part of the original printer design when first manufactured.

The derivation of the transfer function equations preferably is performed by a close inspection of the printer's actual response for a given printed color and a given type of print media. The example provided on FIG. 2 depicts the color magenta that is printed on a sheet of plain paper, as noted above. It is unlikely that a single equation will sufficiently match up to the printer's actual response curve 102 (on FIG. 2), and it is far more likely that more than one such transfer function equation will need to be defined to cover the entire range of gray levels (along the X-axis as seen on FIG. 2). As discussed above, the maximum L* value at a gray level of zero is 94.8 in the example of FIG. 2, and the minimum L* value is 46.1 at the maximum gray level of 255. The following example assumes that the Y-axis (L*) is a function of "x," which will also be referred to as "f(x)," where "x" is equal to the gray level in the range of 0–255.

In the example of FIG. 2, three different equations were derived to find a "fit" with respect to the actual response curve 102. The first equation is designated by the reference numeral 92, and closely matches the actual response curve 102 in the gray level range from zero (0) through one hundred (100). The second equation closely fits the actual response curve 102 in the gray level range from one hundred (100) through one hundred sixty (160), and is indicated by the reference numeral 94 on FIG. 2. The third equation is designated by the reference numeral 96 on FIG. 2, and closely matches the actual response curve 102 in the range of gray levels from one hundred sixty (160) through two hundred fifty-five (255).

In this example, the first equation (i.e., curve 92) is a quartic equation, as follows:

$$f(x)=94.8269-0.595525x-0.000255349x^2+5.62084 \cdot 10^{-5}x^3-3.19718 \cdot 10^{-7}x^4.$$

The second equation (i.e., curve 94) is a cubic equation, as follows:

$$f(x)=93.8434-0.598143x+0.00276929x^2-4.62357 \cdot 10^{-6}x^3.$$

The third equation (i.e., curve 96) is also a quartic equation, as follows:

$$f(x)=-149.52+4.0956x-0.0307397x^2+0.000100148x^3-1.20741 \cdot 10^{-7}x^4.$$

While these equations may seem complicated, the amount of memory needed to store these parameterized values in the computer's ROM or NVRAM will be very minimal, especially as compared to the amount of memory space required to hold an entire adjusted threshold array used in halftoning. In the present invention, the typical amount of memory to store a set of transfer function equations ranges between 30 and 70 bytes. Since these transfer functions equations occupy such little space in memory, it makes them imminently feasible for storage in the NVRAM-type of memory, for easy modification (as discussed above).

The number of distinct intensity levels that can be provided by the methodology of the present invention can be made equivalent to that of storing the complete set of adjusted (or corrected) threshold arrays in the printer through the use of the appropriate transfer function equations, and by increasing the bit size of the unadjusted threshold arrays that provide the original data against which the transfer function equations are applied. One important characteristic of the present invention is that the parameterized transfer functions remain the same size, independent of the size of the unadjusted threshold arrays. This offers a distinct advantage over the prior art method of "array mapping" which produces array maps that increase in size proportional to the size of the unadjusted arrays. In the present invention, the parameterized transfer function is simply sampled more frequently for larger unadjusted threshold arrays. The memory storage space required by the methodology of the present invention is less than both the prior art method of "array mapping" and the prior art method of "complete storage," and the accuracy obtained can be made as good as that of the complete storage methodology.

As discussed above, the methodology of the present invention is very flexible in that the parameterized transfer functions (in the form of the transfer function equations) can be stored in NVRAM since they are very small in size with respect to memory storage requirements. These transfer function equations can be changed very easily, for example, by sending a simple PostScript file to the printer. If a customer needs a different adjusted threshold array, that customer can be supplied with the necessary PostScript file to effect the change. If during development at the factory, for example, new adjusted threshold arrays need to be quickly tested, the transfer function equations can also be conveniently and quickly changed, allowing for efficient testing of the new adjusted threshold arrays.

In addition to the above flexibility, the methodology of the present invention can also allow a user to adjust contrast and brightness quite easily, since rigorous experimentation with various adjustments to unadjusted threshold arrays is feasible by use of this invention. Moreover, the parameterization of the transfer functions tends to hide measurement errors in the original lightness readings. Linearization by itself often does not provide the optimal number of visually unique intensity levels, since a linear increase in dots per level typically does not produce the desired linear L* space. By use of the present invention, it is easy to correct the adjusted threshold arrays to obtain a wider range of dark shades, or a smaller range of light shades, or whatever type of change is needed to gain the best visual spacing of intensity levels by mapping the intensity levels to a curve other than the linear curve, if desirable.

One alternative methodology that uses the principles of the present invention is to intentionally create a non-linear printer response, rather than the typically-desired linear response that substantially matches the human visual perception in L* space. In this alternative method, the printer is provided with transfer functions that, for example, cause the printer to produce an output that emulates some other printer, such as an existing printer that has been previously used to a large extent by a customer for certain reports. When the existing printer is replaced (or supplemented) by a new printer that is capable of producing a substantially linear visual response, the reports may suddenly look "wrong," because the previously-used existing printer itself did not have a true linear response. The previous non-linear response may have been caused by design, so that certain reports (or photographs, or other contone images, for example) would have a certain distinctive appearance. The "new" printer would need to also produce a non-linear response to make those same reports have the same distinctive appearance. In this situation, the transfer functions would take the non-linear unadjusted threshold array (for each color, where multi-color reports are to be printed), and effectively create an adjusted threshold array that will cause the "new" printer (i.e., printer 10) to create a printed output response that substantially looks like the printed output response of the existing "old" printer which has now been replaced (or supplemented) in a customer's system.

Another example where a non-linear printer response is desirable is to provide a printed output that is appropriate for particular circumstances as an input to a scanning-type apparatus. Examples of such scanning devices include a fax machine, copier, or digitizing scanner. Such scanning devices in certain instances may be better served by having a particular non-linear image for their input, which can be provided by the printer of the present invention.

The first step in generating the graphical data as seen on FIGS. 2 and 3 for a particular printer according to the present invention is to initially print 256 sets of small squares for each color on a particular type of print media. This is the first step 150 as seen on the flow chart of FIG. 4. These 256 squares are to be printed so that each square represents one of the 8-bit gray levels between the numeric value 0–255. Of course, other numeric values could be used for the gray scale, either of lesser or greater resolution, but 256 shades has become the industry standard. Once these squares are made available (i.e., printed) for each color that can be produced by the printer, each of the squares is then measured by shining a bright light on the square and by analyzing the response of each square. This occurs at a step 152 on FIG. 4. It is preferred that a spectrophotometer be used as the brightness or color intensity measuring device, and a preferred brand of the spectrophotometer is manufactured by GretagMacbeth.

Naturally, the light source used should emit the entire visible spectrum of electromagnetic energy, and preferably would have a substantially equal output energy level across the entire visible spectrum. If lesser expensive light sources are used, their spectrum should be known (or become determined), so any necessary compensation can be made for a non-linear electromagnetic radiation output.

For most of the colors, it would be preferred to measure L* of each of the 256 squares, although for yellow, it is preferred to measure b*. It is also preferred to perform this printing and measuring operation for each type of print media that would normally be expected to be used in the printer. This would include plain paper, glossy paper, and coated paper, as well as transparency material. For certain types of printers, it would also be possible to use a more stiff cardboard media, such as paperboard or Bristol board material.

As discussed hereinabove, the response for each color and each type of print media will very likely not be a linear ideal target response. Instead, the output response of most printers probably will be much more like one of the curves depicted on FIG. 3. One primary reason for this non-linear response is a phenomenon called "dot gain." As is understood by those skilled in the art of halftoning, a binary output image consists of an array of dots. Conceptually, each dot is a perfect square that is situated at a given location within the array. However, an actual printed dot is typically circular instead of square, and furthermore is usually larger and spreads past the boundaries of the conceptual square dot. Therefore, when an image is printed, it will usually look darker than expected. This is the result of step 150 when 256 sets of squares are printed for each color (and on each type of print media).

When measuring the light intensity of each square at step 152, the range of samples that have been printed will range from 0% intensity (i.e., solid black, or solid magenta as the case may be) to 100% intensity (i.e., solid white). When the actual intensity of these samples is measured, the actual intensity will usually be darker than the requested intensity. The inverse of these measurements defines a transfer function which can be used to characterize the dot gain. The transfer function can be used to map the requested tone level (i.e., the gray scale level) to a different—usually lighter—tone level. This level, when printed with dot gain, will produce a tone level that matches the originally requested level. In this manner, the transfer function can compensate for dot gain.

In the present invention, a threshold array is provided as a fast method to halftone an image. Conceptually, a threshold array comprises a two-dimensional array of thresholds, where each threshold is a numeric value. The threshold array is preferably repeated periodically in a tiling manner to fill an arbitrarily large area (e.g., the page to be printed in the form of a bitmap). If the tiled region is, for example, 1024×1024 number of bits or dots, then a large number of copies of a smaller threshold array would be required to cover this 1024×1024 region such that a 16×16 threshold array (for example) would require 64×64 copies (i.e., 4,096 copies). To render a continuous tone input image, each image pixel is compared to the corresponding threshold at the same location. If the image pixel's value is greater than or equal to the threshold value, then a dot will be placed at the corresponding location within the bitmap. Otherwise, no dot will be placed at this location.

Figure 4:
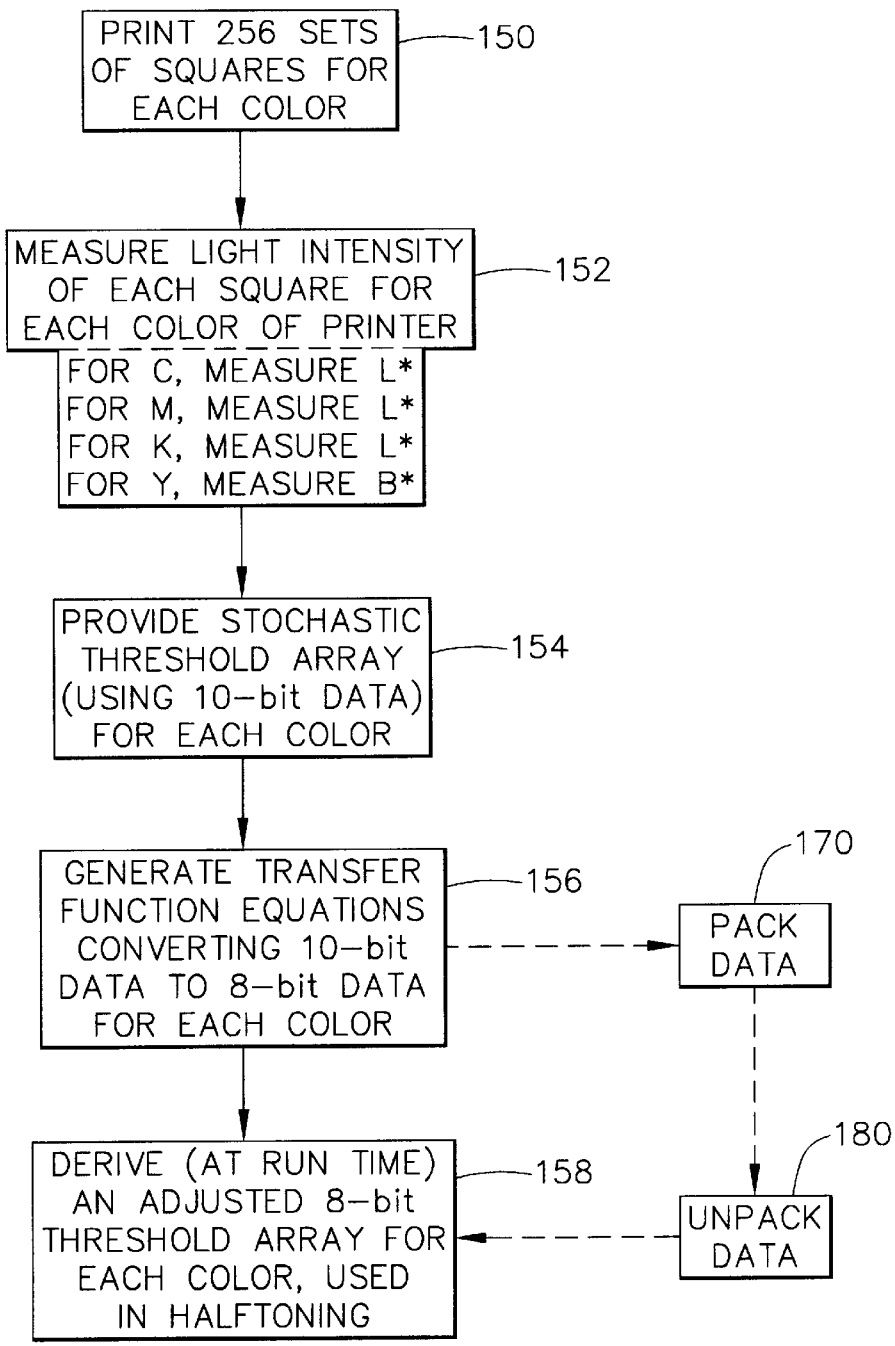
FIG. 4 is a flow chart depicting initial set-up steps for determining the printer response for each color, then generating one or more transfer function equations for each color that will be used to derive an adjusted threshold array used in halftoning, as according to the principles of the present invention.

In the present invention, it is preferable to provide a stochastic threshold array for each color, at a step 154 on FIG. 4. An exemplary stochastic threshold array can be developed using the principles of U.S. Pat. No. 5,696,602, Ser. No. 08/522,010, filed on Aug. 31, 1995, titled "Method for Halftoning Using Stochastic Dithering with Minimum Density Variance," which is commonly assigned to Lexmark International, Inc., and is hereby incorporated by reference in its entirety. It is preferred to use a different stochastic threshold array for each color; however, it would be possible to use a single stochastic threshold array for all of the colors, although the results would likely not be as pleasing to the human eye.

When compensating for dot gain, two obvious solutions include using a transfer function to adjust the input pixel values, or to use a transfer function to adjust the threshold values. On one hand, if the input pixel values are adjusted, then every pixel that will ever be printed must be adjusted. On the other hand, if threshold values are adjusted a single time before using the threshold array, then the adjusted threshold array may be used to render images without affecting the pixel values of the incoming images. Therefore, it is preferred to perform dot gain adjustment by applying the transfer function to the threshold array itself.

In the present invention, the transfer function comprises one or more equations that fit the printer's response curve for a particular color and print media combination. An example of such a printer response curve is curve 102 on FIG. 2. Once the one or more equations are determined, they are stored in the printer's non-volatile memory system, such as in ROM 16. Alternatively, the equations could be stored in a type of non-volatile memory that could be easily changed, for example, by a user or by installation of a new printer driver, such as the NVRAM circuit 26 on FIG. 2. The advantages of using an NVRAM circuit to store the transfer functions equations are that, as improvements are made to printer drivers for a given model of printer to use a special color of ink or toner or to print upon a special type of print media, or as the printer ages and its characteristics may change over time, the equations could be changed to match up to the printer's true response curve for a particular combination of color and print media.

In the present invention, the transfer function is applied by using a "parameterized transfer function" (i.e., one or more "transfer function equations") to convert the unadjusted threshold data into adjusted threshold data for each color. This occurs at a step 156 on FIG. 4. Moreover, it is preferred to use more precise data in the unadjusted array, such as 10-bit data, and then convert this higher precision data to an 8-bit data byte value for each of the numeric values that are entered into the various locations of the threshold array. Obviously, any size binary number could be used for the threshold data elements, however, 8-bit data is not only typical for microprocessor-based systems and standard memory elements (such as Random Access Memory), but further, there is no need for greater precision with respect to the actual human perceptual levels that can be realistically perceived by the average human being. In general, the human eye can see a perceptual difference of approximately 100 different shades of a given color, and when using 8-bit precision, there are a possible 256 different levels of color intensity or shade that can be reproduced. This is much more than is necessary to create a smooth perceptual transition that can be seen or observed by the human eye.

It will be understood that the 10-bit data that is provided in the stochastic threshold array of step 154 could also be of greater precision, merely by using more bits of data to represent each numeric value in the threshold array. However, excellent results have been produced using 10-bit data, and this should be sufficient for most applications. Of course, a stochastic threshold array using 9-bit data would also provide more precision using the principles of the present invention, at least as compared to a stochastic threshold array that would only have 8-bit data numeric values. The overall beneficial effects of using this 10-bit data for the original stochastic threshold array for each color will be discussed in greater detail hereinbelow.

Once the transfer function equations have been generated for each color, it is a simple matter to derive an adjusted 8-bit threshold array for each color that is to be used in halftoning, as at a step 158 on FIG. 4. To perform this operation, the initial stochastic threshold array from step 154 is stored in the Read Only Memory portion of the printer, for example, the ROM 16 from FIG. 1. This typically would be under the control of the graphics engine function 30, which as an executable computer program is also stored in ROM. The transfer function equations themselves would also be stored in ROM 16.

During run time, when it is time to print an incoming print job, the transfer function equations are applied to the stochastic threshold array to create the adjusted 8-bit threshold array in RAM 15 of the printer. When run time occurs, the printer will know what type of print media is going to be used, with the default being plain paper. That being the case, the printer will only require four different adjusted threshold arrays, one per ordinary color that is to be printed (i.e., cyan, magenta, yellow, and black). Therefore, in most cases only four different adjusted threshold arrays having 8-bit element values need be generated using the transfer function equations, then stored in RAM. This is a great memory savings in comparison to the prior art printers that had to store the entire set of adjusted threshold arrays for all combinations of colors and types of print media in the ROM of their printer's memories.

It will be understood that the adjusted 8-bit threshold array need not be stored in true random access memory for the invention to be operative. Instead, any sufficiently numerous group of registers could be used instead of RAM, including registers that reside within an ASIC (Application Specific Integrated Circuit). Since ASICs are constantly being made more flexible and more powerful (i.e., with greater numbers of programmable elements), it may be preferred at some time in the future to use ASIC registers of ASIC 20 to hold the adjusted threshold arrays utilized by the present invention.

A nuance of FIG. 4 not previously discussed is the use of data "packing" and "unpacking," in which the data values for the stochastic threshold arrays are packed into as tight as possible memory locations in the printer's ROM. In many microprocessor-based systems, 10-bit numeric values would each require a 16-bit data word for memory storage. By packing the data according to the step 170 on FIG. 4, the printer can save over 35% of the memory storage space that would normally be used to contain this same amount of data. Of course, the data while in its packed state is less useful and harder to get at, so it is preferred to first unpack that data at a step 180 on FIG. 4 before attempting to use the data at run time. The details of packing and unpacking data are provided in other flow charts, as discussed hereinbelow.

In a preferred system, the printing and measuring steps 150 and 152 are performed "off-line" at the factory, and the stochastic threshold array at step 154 is also provided at the factory. Furthermore, the transfer function equations of step 156 preferably are also derived at the factory based upon the dot gain data from the light measuring step 152. It is preferred that the stochastic threshold array elements have their data or numeric values stored in a packed format, as per the step 170, at the factory and stored in the printer's ROM 16.

In the preferred printer, at run time the processing circuit of the printer merely needs to unpack the data at step 180, and then derive the adjusted 8-bit threshold arrays for the colors that are going to be used for a particular type of print media, as per step 158. While this will take a small amount of time, this processing time will be mainly indiscernible to the human user when added to the amount of processing time required to otherwise prepare the printer at run time for each new incoming print job.

Figure 5:
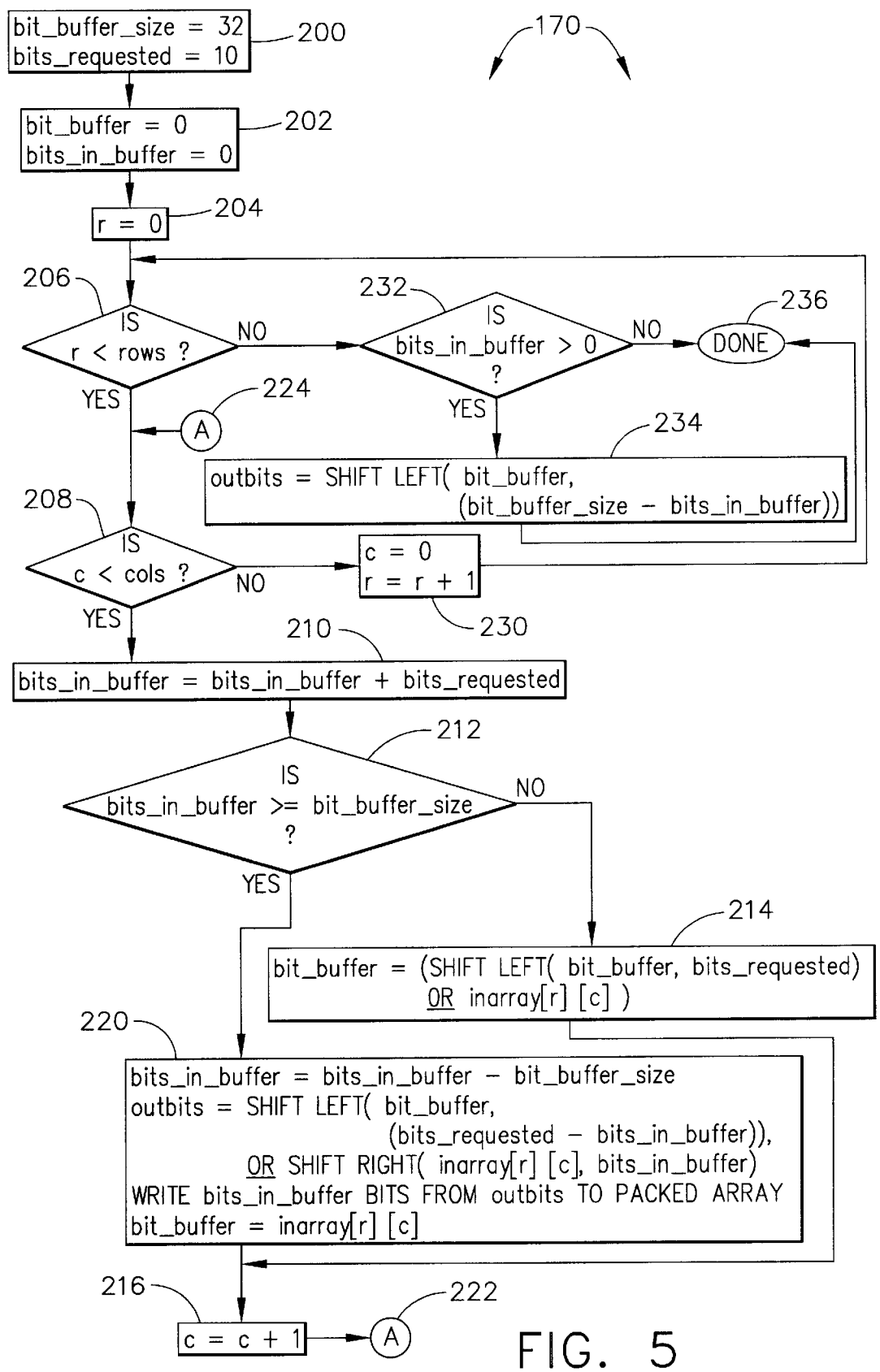
FIG. 5 is a flow chart depicting the steps for packing data into a very tight memory structure, as according to the present invention.

The packing step 170 of FIG. 4 is depicted in greater detail in a flow chart on FIG. 5. Starting at a step 200, some variables are set to initialized values, including a variable "bit_buffer_size" that is set to 32, and a variable "bits_requested" is set to the value 10. At a step 202, a variable "bit_buffer" is set to 0, and a variable "bits_in_buffer" is also set to 0.

By use of these initial variable values, it is assumed that the array elements are 10-bit values, although different element sizes could be used merely by changing the size of the "bits-requested" variable. At the same time, the "bit_buffer_size" variable is microprocessor dependent, and should be set to the most efficient data size for the microprocessor that will be used to pack and unpack the data. Today, many microprocessors contain 32-bit wide registers.

The main input for this packing routine 170 is a two-dimensional 10-bit threshold array. (stored in 16 bits), named "inarray[r][c]," in which the variable "r" refers to the element at row "r" and the variable "c" refers to the element at column "c" of this array. The output of this routine 170 is a one-dimensional stream of data containing the packed contents of the input array.

At a step 204, the "row" variable "r" is set to its initial value of zero (0). At a decision step 206, the value of "r" is compared to see if it is less than the numeric value of a variable named "rows" that, in the preferred embodiment, is set equal to the number 128. The value for a variable called "cols" is also preferably set to 128, since the preferred stochastic threshold array has a size that is 128×128 rows and columns.

The value for the variable "r" will be incremented throughout this routine 170, and initially the result at the decision step 206 will always be YES until the routine has incremented the value for "r" up to the number 128. During the first pass, the logic flow is directed to a decision step 208 that asks a similar question regarding the value for "c" with respect to the numeric value of the variable "cols." Again, the initial passes will always result in a YES answer, thereby directing the logic flow to a step 210.

At step 210, the variable "bits_in_buffer" is set equal to itself plus the value of the variable "bits_requested." Since the value of the variable "bits_requested" was set to ten (10), this step 210 will always result in a new value for the variable "bits_in_buffer" being increased by the amount of ten.

A decision step 212 now determines whether or not the variable "bits_in_buffer" is greater than or equal to the variable "bit_buffer_size." With the values set for the "bit_buffer_size" of thirty-two and the "bits_requested" value of ten, the first three passes into this decision step 212 will result in a NO answer, thereby directing logic flow to a step 214. At step 214, the variable "bit_buffer" is set equal to a numeric value that is equal to the variable "inarray[r][c]" that is logically OR'ed to the current value of the variable "bit_buffer" that is shifted left by the number of bits that is currently the numeric value of the variable "bits_requested." After this occurs, the logic flow is directed to a step 216 where the value for the variable "c" is incremented by one.

The logic flow now reaches a point on the flow chart of FIG. 5 referred to as 222, and is designated "A," which directs the logic flow back to a point 224 on FIG. 5, in which the next operation is the decision step 208. Until all of the columns in the array have been completed, the answer will again be YES at decision step 208, and the logic flow is directed to the step 210. After that occurs, the decision step 212 is reached, and for the next two passes, the step 214 is reached that affects the value of the variable "bit_buffer." Each time that occurs, the value of "c" is incremented at step 216, and the logic flow is directed back to the decision step 208 via the letter "A."

The fourth time that decision step 212 is reached in this example, the result will be YES, and a step 220 will be reached. In step 220, the variable "bits_in_buffer" is set equal to itself minus the variable "bit_buffer_size" (which has a value of 32). Next a variable called "outbits" is set equal to a rather complex mathematical value. "Outbits" is the one-dimensional stream of data that is the output of this packing routine 170. In step 220, "outbits" is set equal to the variable "bit_buffer" after it has been shifted left by the number of bits equal to the quantity ("bits_requested" minus "bits_in_buffer"), and this value is logically OR'ed to the quantity "inarray[r][c]" that is shifted right by the number of bits equal to the value of the variable "bits_in_buffer."

After this occurs, the number of bits equal to the variable "bits_in_buffer" is written from the variable "outbits" to the packed array in memory. The variable "bit_buffer" is now set equal to the current element of "inarray[r][c]," which is the last function that occurs within step 220. After that occurs, the variable "c" is incremented at step 216, and the logic flow is directed back via "A" to the decision step 208.

Eventually, all of the 128 columns will have been filled for the first row of the array, and the result at decision step 208 will become NO. When that occurs, a step 230 sets the value of "c" back to zero (0), and the value of "r" is incremented by one. After that occurs, the logic flow is directed back to decision step 206 that determines if the value of "r" is less than the variable rows, which will not occur until all of the rows of the array have been operated upon. When only the second row of the array has been reached, the logic flow is directed back through the YES result to the decision step 208, where the columns begin to be operated upon again.

When the logic flow has finally reached the final row, the result at decision step 206 will become NO, and the logic flow will be directed to a decision step 232. At this decision step, it is determined if the variable "bits_in_buffer" is greater than zero (0), and if the answer is NO, then this routine is finished at the step 236. However, in the general case, there will be some left over bits that need to be handled, and the result at decision step 232 will likely be YES. In that circumstance, a step 234 sets the variable "outbits" equal to the value of the variable "bit_buffer" after it is shifted left by the number of bits equal to the quantity "bit_buffer_size" minus "bits_in_buffer." Once that has been accomplished, the logic flow reaches the return step called "done" at 236, and the packing routine 170 is finally completed.

While data compression could be applied to reduce the amount of memory, it is preferred to use the packing routine as illustrated on FIG. 5 to pack or "squeeze" the numeric elements together within the printer's memory. The unused bits of each 16-bit word are eliminated, so that a single 10-bit element immediately follows the previous 10-bit element. This makes the individual elements more difficult to access later, and an unpacking routine preferably will be used to first re-arrange these 10-bit elements into a more easily addressable set of values in the printer's memory.

In the example of FIG. 5, it was assumed that ten bits per element was needed, while of course, other element sizes could be used instead. Moreover, a variable number of bits per element is also possible, although this would involve additional complexity. One method for accommodating a variable number of bits would be to encode the number of bits per element along with the actual data. Another method would be to synchronize the packing and unpacking routines so as to use the proper number of bits for each consecutive element.

Although packing the array data reduces memory space, the individual array elements are more difficult to access when packed. To allow for more convenient access of the array elements at run time, the data may be unpacked. The routine 180 is illustrated in greater detail in the form of a flow chart on FIG. 6. In this unpacking example, it is assumed that each packed element requires ten bits, although other element sizes may be used instead if desirable. Of course, if an array of elements has been packed using "x" number of bits per element, then the unpacking routine 180 must also unpack assuming that there are "x" bits per element. Otherwise, the results will be nonsense.

As an alternative, a variable number of bits per element is possible, although this would involve additional complexity. One method for accommodating a variable number of bits (as noted above) would be to encode the number of bits per element along with the data itself, whereas another method would be to synchronize the packing and unpacking routines so that they use the proper number of bits for each consecutive element.

In the unpacking routine 180, the input information is a one-dimensional stream of data containing the packed contents of the input array. The output of this routine 180 is an uncorrected, two-dimensional 10-bit threshold array, named "outarray" in this example. The notation "outarray[r][c]" refers to the element at row "r" and column "c" of this array.

The routine starts with a step 250 in which a variable named "bit_buffer_size" is set to the value of 32, which is a convenient standard size of a single element for a microprocessor that utilizes 32-bit registers. Also in step 250, a variable named "bits_requested" is set to the value of ten (10) which, as stated before, means that there are ten bits per array element in the packed data.

Next a step 252 places the value of the variable "bit_buffer_size" into a variable named "bits_in_buffer." This step then reads the next number of bits equal to the value of the "bits_in_buffer" variable from the packed array into a variable named "bit_buffer."

Now that the main working variables have been initialized, a step 254 sets a variable "r" equal to zero (0), after which a decision step 256 determines whether the value of "r" is less than the value of a variable named "rows" which is set to the value 128, since the preferred array size is 128×128 number of elements in rows and columns. Of course, a different size array could be used, in which case the value for the variable rows would be set to a different number. At this first pass, the result of this decision step 256 will be YES, and the logic flow is directed to another decision step 258.

At decision block 258 the value of the variable "c" is compared to see if it is less than the value of a variable "cols" which represents the number of columns in the array. In this example, the value of the variable "cols" is set to 128. At this first pass, the result will be YES at decision step 258, and the logic flow is directed to a step 260.

At step 260, the variable "unpacked[r][c]" is set equal to the value in the variable "bit buffer" after it has been shifted right by the number of bits equal to the quantity "bit_buffer_size" minus "bits_requested." After this occurs, the "bits_in_buffer" variable is set equal to itself minus the value of the variable "bits_requested."

A decision step 262 now determines whether or not the variable "bits_in_buffer" is less than zero (0). In this example, the first three passes through decision step 262 will result in a NO answer to this comparison, since the "bit_buffer_size" variable was set to 32 and the size of the data elements is 10 bits. In view of this NO result, the logic flow is directed to a step 264 which places in the variable "bit_buffer" the value of itself after it has been shifted left by the number of bits that equals the numeric value currently in the variable "bits_requested."

After this has occurred, a step 266 increments the value of "c," which means that it is time to move to the next column of data in the array. After that has occurred, the logic flow is directed back to decision step 258, where it is determined whether or not the value of "c" is still less than the value of "cols" (which is set to the value 128). At this second pass through decision step 258, the result will be YES, and step 260 is again executed. This will occur for the first 128 passes through this portion of the flow chart of FIG. 6. Once the logic flow arrives at decision step 262 after the first three passes, the result will become YES upon the fourth pass through this decision step 262. When that occurs, a step 270 will perform several functions.

At step 270, a certain number of bits will be read from the packed array and placed into the variable "bit_buffer." This number of bits is equal to the variable "bit_buffer_size," which in this example is equal to 32 bits. After that occurs, the variable "bits_in_buffer" is set equal to itself plus the value of the variable "bit_buffer_size." After that occurs, the output array variable "unpacked[r][c]" is set equal to itself (at this same row and column position) which is logically OR'ed with the value of the variable "bit_buffer" after it has been shifted right by the number of bits that equal the current numeric value of the variable "bits_in_buffer." The variable "bit_buffer" is now set equal to itself after it has been shifted left by the number of bits that equals the quantity "bit_buffer_size" minus "bits_in_ buffer."

The value of "c" is now incremented at step 266 and the logic flow is directed back to the decision step 258 for further passes at different columns of the array in this first row. Once all of the columns have been processed, the variable "c" will ultimately reach a value of 128, and at decision step 258 the result will finally become NO. When that occurs, a decision step 280 resets the value of "c" back to zero (0), and the value of the row variable "r" is incremented. After that occurs, decision step 256 is arrived at, which compares the current value of "r" to see if it is less than the value of the variable "rows" (which was earlier set to 128).

For each new value of "r," all of the columns of the array are processed, basically using an internal DO-loop, and then the value of the row variable "r" is incremented. After all of the columns have been processed for all of the rows, the value of the variable "r" will finally reach 128 at step 280, and decision step 256 will finally have a result equal to NO. When that occurs, this routine 180 is finished and can return, at a step 282 referred to as "Done."

The end result of routine 180 is to provide an unadjusted 10-bit element size stochastic threshold array having 128 rows and 128 columns. The resulting unadjusted array is unpacked, which means that each 10-bit element is placed in a separate two-byte memory location within the RAM 15 of printer 10, at run time. The transfer function equations can now be easily applied to the unadjusted threshold array at this point, in the form of temporarily-stored look-up tables that contain conversion data. These look-up tables are preferably stored in the printer's RAM 15 at run time, and these look-up tables are generated by application of the transfer function equations for a specific combination of color and type of print media.

In a sense, the above look-up tables do not in the least depend upon the preferred unadjusted stochastic threshold arrays; the only important criteria are the data precision of the unadjusted threshold array elements (e.g., 10-bit data in the range of 0–1023) and the actual size in rows and columns of the unadjusted threshold array (e.g., a 128×128 array). The values in the temporary look-up tables are applied to the unadjusted threshold array using a routine 158 that is depicted in the form of a flow chart on FIG. 7. Once the adjusted threshold array is fully developed by application of the functions in the flow chart of FIG. 7, the temporary look-up table may be abandoned, and its space in RAM can then be re-allocated for other printer uses, such as deriving a second adjusted array of a different color/print media combination for the very same print job.

The input to this routine 158 is the unpacked uncorrected threshold array having 10-bit elements that are arranged in two-byte memory locations. The output of this routine is an adjusted (or corrected) threshold array that has elements of 8-bit size, in which each 8-bit element is placed in a single 8-bit byte in the printer's RAM. This all occurs at run time when the printer needs to process an incoming print job.

Figure 7:
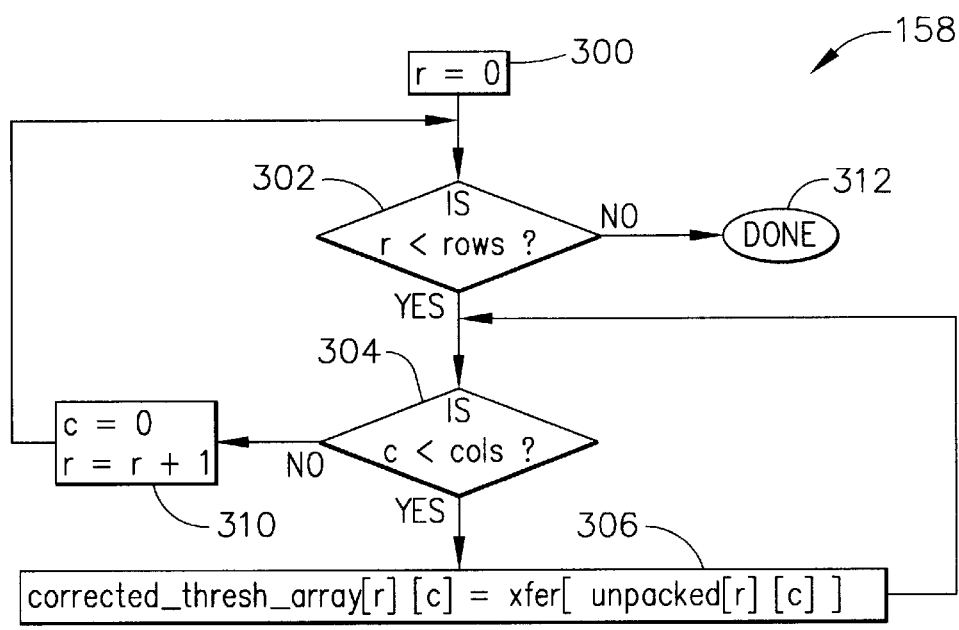
FIG. 7 is a flow chart illustrating the steps for applying a temporary look-up table generated from application of transfer function equations to an unadjusted threshold array, as according to the methodology of the present invention.

On FIG. 7 starting at a step 300, the row variable "r" is set equal to zero (0). A decision step 302 then determines whether the current value of "r" is less than the variable named "rows," which in this example, is set equal to the value of 128 (since there are 128 rows in the threshold array). Naturally, at this first pass the result will be YES at decision step 302.

A decision step 304 now determines whether or not the variable "c" is less than the value for a variable "cols," which is set equal to 128 (since there are 128 columns in the threshold array). Of course, at this first pass the result will be YES, and the logic flow is directed to a step 306. At step 306, a variable named "corrected_thresh_array[r][c]" is set equal to the look-up table result, which is a variable named "xfer[unpacked[r][c] ]." This "xfer" variable comprises a look-up table, an example of which is provided in TABLE #5, hereinbelow. In more detail, the variable called "unpacked[r][c]" comprises an unadjusted threshold array, an example of which is provided in TABLE #4 (i.e., for a 32×32 threshold array example). The look-up table provided in TABLE #5 is also a 32×32 array, and is an example of the look-up table that would be used in the step 306. The output adjusted (or corrected) threshold array that is calculated at step 306 preferably is a 128×128 sized array, and an example of such 8-bit adjusted array (as a 32×32 sized array) is provided in TABLE #6, hereinbelow. These example tables provided below will be discussed in greater detail. It will be understood that the preferred size of all the arrays being described herein is 128×128, although any size could be used without departing from the principles of the present invention. The example arrays provided in the TABLES #1–6 herein are of a smaller 32×32 size only for the purposes of illustration.

The unpacking routine 180 and the transfer function equations (using the temporary look-up tables) application routine 158 preferably are always executed at run time within the printer 10. It should be noted that, from a processing time standpoint, it will likely be much more efficient to both unpack the 10-bit data that makes up the unadjusted threshold array and then apply the transfer function equations (again, using the temporary look-up tables) to that particular row and column of the unadjusted array to create the corresponding adjusted 8-bit array element, all in a single operation. By doing so, one can eliminate the middle step of generating an unpacked 10-bit unadjusted array in RAM in two-byte increments, and instead generate the final 8-bit unadjusted array in elements of RAM that are single byte elements, meaning that (of course) the 8-bit array elements are completely packed within 8-bit bytes of memory locations in RAM. Not only is processing time saved, but also temporary memory allocation space is saved. Such a combined unpacking and transfer function equations application routine with look-up tables is described in a flow chart depicted on FIG. 8.

Figure 6:
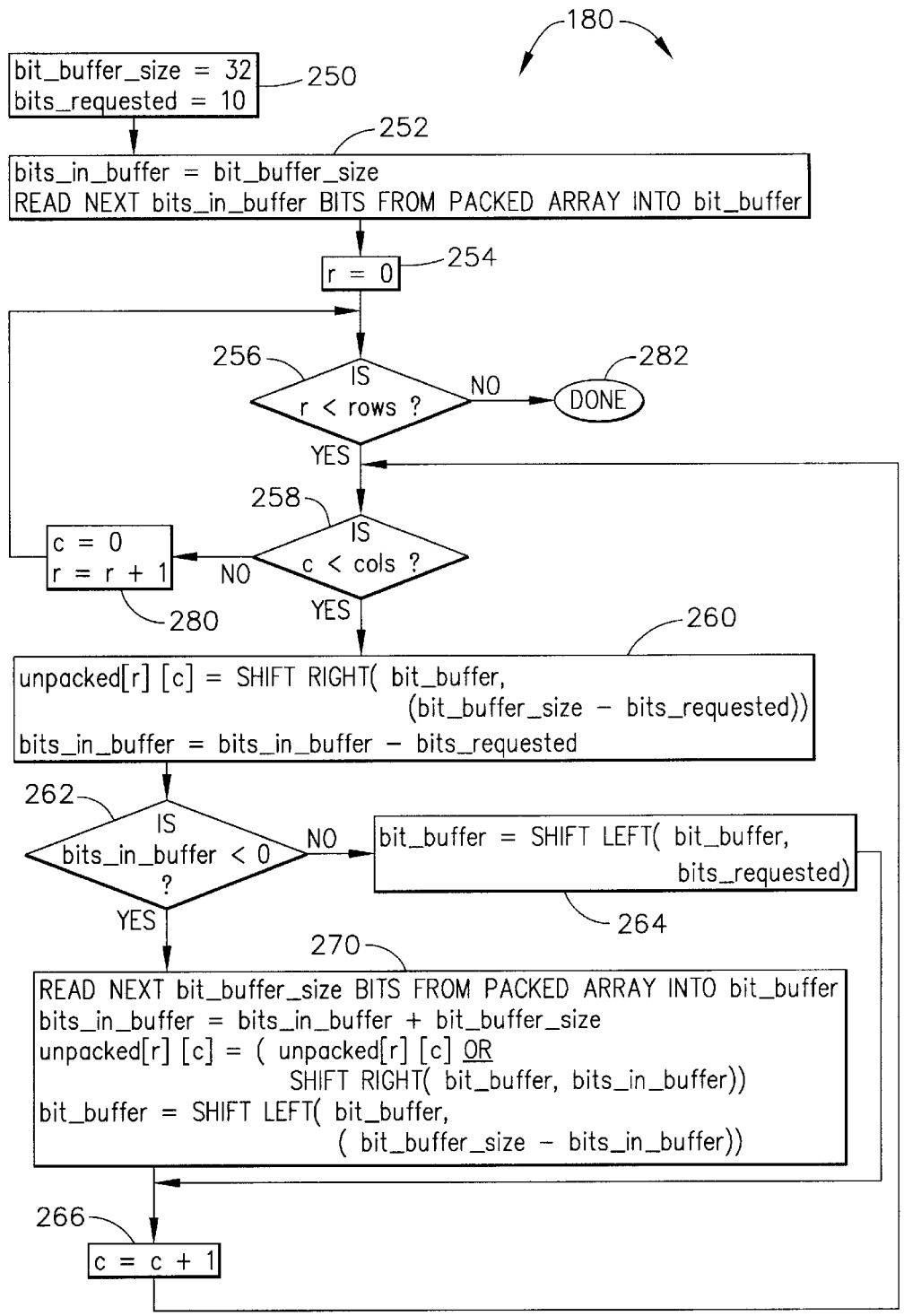
FIG. 6 is a flow chart depicting the steps for unpacking data from a very tight memory structure, as according to the present invention.
Figure 8:
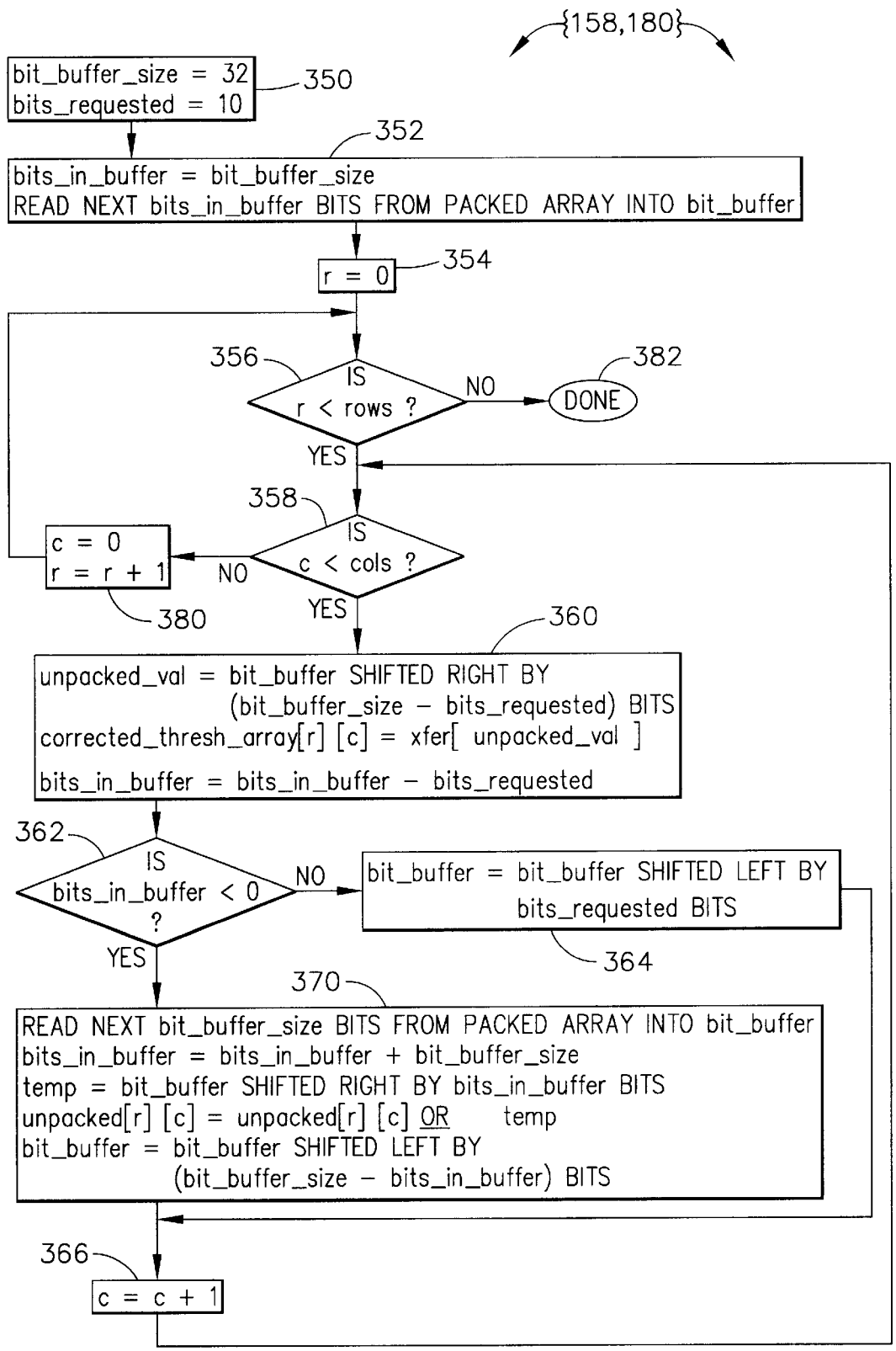
FIG. 8 is a flow chart illustrating the steps for both unpacking the corrected array data and applying a temporary look-up table, generated from application of transfer function equations to an unadjusted threshold array, in a single step for each value of the adjusted array, as according to the principles of the present invention.

On FIG. 8, a first step 350 initializes two of the variables that were also seen on earlier flow charts on FIGS. 5 and 6. These variables are the "bit_buffer_size," which is set to a value of 32, and the variable "bits_requested" which is set to a value of ten. The next step is to place the value of the variable "bit_buffer_size" into a variable called "bits_in_buffer," after which a certain number of bits are read from the packed array and placed into a variable called "bit_buffer." The number of bits to be read in is equal to the value of the variable "bits_in_buffer."

The logic flow now arrives at the point where the row and column data is operated on, starting with a step 354 that sets the row variable "r" to zero (0). After that occurs, a decision step 356 determines whether or not the current value of "r" is less than the value of a variable "rows" that was set to 128 in the preferred embodiment, since a threshold array having 128 rows and 128 columns is used.

During this first pass, the result at decision step 356 will be YES, and next a decision step 358 determines whether or not the current value of a variable "c" is less than the value of a variable "cols," which also has a value of 128 since the preferred embodiment uses a threshold array that has 128 columns. At this first pass, the result at decision step 358 will be YES, thereby directing the logic flow to a step 360.

In step 360, a variable "unpacked_val" is set equal to the "bit_buffer" variable after it has been shifted right by the number of bits equal to the quantity "bit_buffer_size" minus "bits_requested." The current array element of the output of this combined routine, which is a variable named "corrected_thresh_array[r][c]," is now set equal to the transfer function of the unpacked value, which in this example has the name "xfer[unpacked_val]." As before in the flow chart of FIG. 7, the example 10-bit to 8-bit look-up table provided in TABLE #5 hereinbelow is exemplary for the transfer function referred to as "xfer" at step 360, i.e., for a 32×32 array (rather than the preferred 128×128 array). Furthermore, the packed data represented by the variable "unpacked_val" is represented as a 32×32 example on TABLE #4 hereinbelow, while the adjusted 8-bit threshold array having the variable name "corrected_thresh_array" is also represented in a 32×32 size array example in TABLE #6, hereinbelow.

The last operation at step 360 is to calculate a new value for the "bits_in_buffer" variable, which is set equal to itself minus the value of the variable "bits requested." The logic flow now arrives at a decision step 362, where this "bits_in_buffer" is compared to see if it is less than zero (0). For the first three passes through this flow chart of FIG. 8, the result will be NO, and the logic flow will be directed to a step 364.

At step 364, the variable "bit_buffer" is set equal to itself after it has been shifted left by the number of bits of the value of the "bits_requested" variable. After that occurs, the column is changed by incrementing the variable "c" by one, at a step 366.

The logic flow is now directed back to decision step 358, where the value for c is compared to see if it is less than the value of the variable "cols" (which was earlier set to 128). Since the answer will be YES at this next, second pass, the step 360 will be executed, as well as the decision step 362, ultimately leading to the step 364. This loop will remain intact until the fourth pass through, at which time the result at decision step 362 will change from NO to YES. When that occurs, the logic flow is directed to a step 370.

At step 370, many of the same functions are performed as were executed in the step 270 depicted on FIG. 6. For example, the packed array is inspected and the next predetermined number of bits are placed into the variable "bit_buffer." This number of bits is equal to the value of the variable "bit_buffer_size," which in this example is set to the value of 32. After that occurs, the variable "bits_in_buffer" is set equal to itself plus the value of the variable "bit_buffer_size" (which is equal to 32). A new variable referred to as "temp" is now set to the value of the "bit_buffer" variable after that variable has been shifted right by the number of bits equal to the current value of the "bits_in_buffer" variable.

At this time, the appropriate row and column element of the unpacked array, having the variable name "unpacked[r][c]," is set equal to itself after it has been logically OR'ed to the variable "temp." Finally, the variable "bit_buffer" is set equal to itself after it has been shifted left by the quantity "bit_buffer_size" minus "bits_in_buffer." After this occurs, the column element is changed by incrementing the variable "c" at step 366.

This internal "DO-loop" is performed until all 128 columns have been processed, and when that finally occurs, the result at decision step 358 will change from YES to NO. When that occurs, a step 380 will reset the variable "c" back to zero (0), and will change the row position by incrementing the variable "r." The logic flow is now directed back to the decision step 356 to determine if the value of "r" is now less than the value of "rows" (which is equal to 128). If the logic flow has just arrived to the second row position, then the result at decision step 356 will, of course, be YES, and the logic flow re-enters the internal DO-loop that operates upon the various columns of this array.

When all columns and all rows have finally been processed, the logic flow will leave the step 366 and arrive at the decision step 358, which will then flow to the step 380, thereby incrementing the value of "r" to the point where the result at decision step 356 will be NO. When this occurs, this combined routine will be finished and can return, which is depicted as the step 382 as being "Done."

It is now appropriate to discuss the various tables that are included below, which will help to emphasize the advantages of the present invention. TABLES #1–3 are exemplary of a non-preferred methodology that takes an unadjusted 8-bit stochastic threshold array and converts it to an adjusted 8-bit threshold array.

TABLE #1 depicts a 32×32 stochastic threshold array that comprises 8-bit values for its individual array elements. There are 256 total possible values for the 8-bit array elements, and, there are 1024 possible array locations on this 32×32 array. Since the array is unadjusted, there should be four elements of each value somewhere within this stochastic threshold array. Since it is based on an ideal "machine" response, it is unlikely to lead to a linear perceptual result with respect to the lightness versus darkness of each individual incremental change as perceived by the human eye. In other words, this would likely lead to a graph such as the response curve 102 on FIG. 2, which exemplified a magenta color set of data on plain paper.

TABLE #2 represents a look-up table that is used to convert the unadjusted 8-bit values to adjusted 8-bit values. Since there are only 256 possible values (ranging from the values 0–255), this look-up table is a much smaller array, being 16×16, thereby providing 256 possible values. It should be noted that the value zero (0) will not actually be found on the threshold array in this example, so in actuality only 255 possible values will be converted (ranging from 1–255).

TABLE #3 is the adjusted 8-bit array that is derived by using the look-up table of TABLE #2 to convert the unadjusted values of TABLE #1. TABLE #3 has a size of 32×32, which provides a total of 1024 possible element locations. Since this example uses 8-bit precision, there will be a minimum of four elements of any given value somewhere on the rows and columns of this adjusted array. However, it will be understood that some numeric values will have many more than four element locations (since this array is adjusted). At the same time, it will also be understood that some numeric values will not be in the adjusted array of TABLE #3 at all. Such values can be easily found by inspecting TABLE #2. For example, in the top row of TABLE #2, the positions zero (0) through fifteen (15) show values as follows: 0, 1, 4, 7, 10, 13, 17, 20, 23, 26, 29, 32, 35, 38, 41, and 44. All of the numbers missing between those numbers listed in the previous sentence are numeric values that will not appear anywhere on TABLE #3. For example, the numeric values skip from 1 to 4, which means there will be no elements having numeric values for either 2 or 3 in TABLE #3.

TABLE 1

| 8-bit Unadjusted 32 × 32 Threshold Array | | | | | | | | | | | | | | | |
|---|---|---|---|---|---|---|---|---|---|---|---|---|---|---|---|
| 230 | 71 | 141 | 242 | 80 | 214 | 40 | 199 | 69 | 219 | 118 | 12 | 161 | 49 | 135 | 185 |
| 31 | 129 | 189 | 17 | 163 | 57 | 142 | 109 | 158 | 34 | 170 | 251 | 67 | 216 | 16 | 81 |
| 101 | 216 | 48 | 119 | 227 | 97 | 249 | 14 | 211 | 125 | 51 | 102 | 179 | 90 | 195 | 152 |
| 169 | 76 | 138 | 196 | 26 | 155 | 84 | 185 | 58 | 150 | 231 | 130 | 24 | 238 | 57 | 112 |
| 222 | 12 | 252 | 86 | 128 | 220 | 45 | 113 | 239 | 88 | 7 | 192 | 156 | 42 | 127 | 208 |
| 133 | 108 | 159 | 54 | 178 | 6 | 197 | 145 | 30 | 167 | 217 | 85 | 60 | 224 | 161 | 77 |
| 38 | 232 | 25 | 213 | 73 | 244 | 132 | 52 | 207 | 117 | 39 | 139 | 198 | 98 | 3 | 241 |
| 165 | 64 | 181 | 121 | 154 | 37 | 96 | 184 | 16 | 252 | 104 | 227 | 25 | 129 | 190 | 52 |
| 111 | 206 | 93 | 15 | 230 | 116 | 214 | 70 | 162 | 55 | 172 | 63 | 146 | 248 | 75 | 173 |
| 150 | 33 | 246 | 146 | 53 | 169 | 22 | 240 | 125 | 202 | 5 | 183 | 115 | 40 | 205 | 20 |
| 73 | 187 | 61 | 106 | 208 | 30 | 191 | 109 | 32 | 92 | 220 | 72 | 234 | 95 | 153 | 131 |
| 225 | 20 | 135 | 235 | 2 | 179 | 58 | 152 | 228 | 138 | 49 | 156 | 10 | 189 | 34 | 211 |
| 167 | 87 | 195 | 45 | 157 | 112 | 254 | 14 | 83 | 196 | 101 | 246 | 126 | 62 | 226 | 111 |
| 37 | 249 | 126 | 79 | 223 | 29 | 122 | 203 | 134 | 26 | 167 | 40 | 201 | 163 | 97 | 1 |
| 119 | 160 | 14 | 205 | 141 | 91 | 181 | 41 | 237 | 75 | 215 | 120 | 81 | 24 | 250 | 176 |
| 233 | 67 | 179 | 107 | 47 | 243 | 63 | 171 | 98 | 186 | 12 | 148 | 223 | 127 | 54 | 133 |
| 30 | 207 | 66 | 228 | 137 | 6 | 214 | 128 | 23 | 140 | 230 | 89 | 36 | 166 | 204 | 91 |
| 134 | 87 | 157 | 33 | 190 | 102 | 151 | 68 | 251 | 111 | 45 | 175 | 242 | 104 | 13 | 221 |
| 199 | 20 | 247 | 130 | 83 | 233 | 28 | 196 | 55 | 211 | 157 | 74 | 21 | 197 | 152 | 75 |
| 86 | 173 | 78 | 215 | 8 | 125 | 177 | 92 | 170 | 3 | 106 | 217 | 142 | 86 | 51 | 255 |
| 219 | 114 | 46 | 168 | 110 | 204 | 44 | 239 | 76 | 144 | 247 | 38 | 113 | 232 | 174 | 27 |
| 58 | 238 | 139 | 30 | 254 | 70 | 154 | 20 | 188 | 53 | 94 | 171 | 201 | 6 | 102 | 146 |
| 151 | 3 | 193 | 123 | 57 | 190 | 100 | 222 | 85 | 207 | 136 | 29 | 71 | 161 | 212 | 81 |
| 105 | 177 | 80 | 228 | 148 | 7 | 166 | 47 | 178 | 13 | 225 | 116 | 244 | 130 | 33 | 237 |
| 250 | 65 | 203 | 25 | 107 | 210 | 62 | 235 | 111 | 151 | 77 | 184 | 18 | 86 | 196 | 112 |
| 18 | 162 | 51 | 143 | 242 | 72 | 175 | 120 | 27 | 253 | 49 | 105 | 220 | 165 | 54 | 143 |
| 172 | 89 | 233 | 121 | 39 | 191 | 16 | 144 | 212 | 88 | 189 | 137 | 36 | 120 | 250 | 23 |
| 56 | 215 | 6 | 186 | 93 | 136 | 247 | 83 | 44 | 171 | 4 | 240 | 96 | 199 | 76 | 153 |
| 145 | 110 | 158 | 78 | 224 | 32 | 103 | 217 | 157 | 73 | 202 | 61 | 174 | 8 | 182 | 65 |
| 227 | 44 | 255 | 23 | 149 | 118 | 194 | 10 | 126 | 234 | 38 | 142 | 114 | 235 | 50 | 219 |
| 87 | 166 | 99 | 198 | 59 | 237 | 70 | 181 | 55 | 146 | 100 | 226 | 26 | 150 | 86 | 167 |
| 8 | 208 | 36 | 115 | 176 | 2 | 165 | 92 | 245 | 22 | 187 | 82 | 204 | 107 | 245 | 31 |
| 96 | 2 | 205 | 124 | 44 | 226 | 7 | 129 | 222 | 27 | 247 | 55 | 135 | 180 | 106 | 61 |
| 231 | 164 | 57 | 174 | 38 | 141 | 199 | 63 | 156 | 99 | 125 | 192 | 38 | 84 | 202 | 149 |
| 36 | 129 | 221 | 24 | 249 | 37 | 115 | 240 | 52 | 197 | 9 | 145 | 218 | 122 | 4 | 243 |
| 254 | 87 | 61 | 183 | 138 | 103 | 176 | 22 | 168 | 75 | 231 | 91 | 28 | 236 | 136 | 46 |
| 10 | 155 | 200 | 96 | 5 | 214 | 69 | 224 | 119 | 206 | 39 | 133 | 188 | 68 | 179 | 90 |
| 180 | 109 | 31 | 228 | 164 | 58 | 186 | 94 | 15 | 151 | 106 | 253 | 59 | 162 | 21 | 193 |
| 54 | 220 | 133 | 67 | 125 | 235 | 41 | 132 | 244 | 71 | 171 | 13 | 217 | 116 | 209 | 81 |
| 149 | 17 | 168 | 246 | 25 | 100 | 155 | 210 | 34 | 194 | 53 | 182 | 140 | 47 | 97 | 248 |

TABLE 1-continued 8-bit Unadjusted 32 × 32 Threshold Array

| 103 | 209 | 90  | 45  | 142 | 203 | 8   | 82  | 160 | 117 | 238 | 92  | 27  | 229 | 143 | 5   |
| --- | --- | --- | --- | --- | --- | --- | --- | --- | --- | --- | --- | --- | --- | --- | --- |
| 236 | 68  | 193 | 114 | 184 | 62  | 251 | 129 | 224 | 1   | 79  | 198 | 114 | 164 | 59  | 200 |
| 50  | 158 | 11  | 225 | 35  | 121 | 170 | 48  | 95  | 178 | 135 | 42  | 219 | 18  | 238 | 122 |
| 85  | 253 | 128 | 93  | 139 | 233 | 21  | 150 | 215 | 67  | 243 | 109 | 148 | 83  | 173 | 43  |
| 183 | 28  | 173 | 56  | 204 | 74  | 195 | 113 | 32  | 192 | 14  | 181 | 35  | 255 | 94  | 132 |
| 140 | 218 | 78  | 242 | 15  | 159 | 54  | 248 | 141 | 61  | 169 | 77  | 201 | 136 | 8   | 216 |
| 65  | 117 | 153 | 41  | 188 | 104 | 178 | 11  | 91  | 234 | 100 | 218 | 52  | 105 | 194 | 71  |
| 236 | 9   | 213 | 123 | 64  | 208 | 79  | 223 | 164 | 39  | 152 | 23  | 161 | 229 | 11  | 147 |
| 43  | 182 | 60  | 165 | 231 | 18  | 145 | 47  | 118 | 206 | 74  | 246 | 123 | 69  | 180 | 110 |
| 137 | 108 | 245 | 32  | 131 | 89  | 253 | 101 | 175 | 12  | 189 | 134 | 42  | 210 | 4   | 241 |
| 187 | 22  | 147 | 34  | 197 | 156 | 30  | 211 | 66  | 240 | 56  | 102 | 177 | 89  | 163 | 53  |
| 64  | 209 | 99  | 225 | 4   | 73  | 190 | 123 | 159 | 35  | 139 | 223 | 21  | 252 | 56  | 187 |
| 124 | 159 | 43  | 168 | 117 | 239 | 112 | 17  | 229 | 87  | 183 | 60  | 198 | 108 | 144 | 16  |
| 222 | 10  | 341 | 68  | 203 | 48  | 182 | 78  | 130 | 215 | 1   | 127 | 154 | 34  | 234 | 124 |
| 60  | 192 | 119 | 143 | 28  | 160 | 95  | 249 | 43  | 149 | 105 | 243 | 69  | 170 | 76  | 213 |
| 170 | 98  | 59  | 212 | 103 | 232 | 6   | 138 | 207 | 26  | 193 | 48  | 209 | 9   | 186 | 41  |
| 3   | 155 | 251 | 19  | 174 | 85  | 202 | 50  | 108 | 176 | 90  | 158 | 82  | 229 | 99  | 134 |
| 226 | 84  | 46  | 194 | 124 | 31  | 128 | 163 | 227 | 66  | 254 | 19  | 180 | 120 | 35  | 200 |
| 94  | 185 | 132 | 65  | 218 | 110 | 245 | 80  | 13  | 147 | 52  | 201 | 63  | 148 | 244 | 72  |
| 210 | 29  | 230 | 147 | 11  | 172 | 40  | 191 | 122 | 221 | 88  | 131 | 237 | 7   | 115 | 185 |
| 127 | 162 | 43  | 98  | 236 | 60  | 213 | 101 | 172 | 37  | 195 | 29  | 169 | 95  | 221 | 24  |
| 15  | 248 | 113 | 200 | 74  | 166 | 131 | 17  | 72  | 241 | 118 | 160 | 49  | 206 | 77  | 128 |
| 121 | 70  | 177 | 19  | 188 | 33  | 252 | 116 | 205 | 93  | 2   | 232 | 104 | 154 | 42  | 191 |
| 213 | 144 | 56  | 239 | 107 | 153 | 82  | 184 | 46  | 175 | 140 | 79  | 212 | 19  | 250 | 137 |

TABLE 2

Transfer Function Table to Convert 8-bit Values to 8-bit Values

|       | +0  | +1  | +2  | +3  | +4  | +5  | +6  | +7  | +8  | +9  | +10 | +11 | +12 | +13 | +14 | +15 |
| ----- | --- | --- | --- | --- | --- | --- | --- | --- | --- | --- | --- | --- | --- | --- | --- | --- |
| [  0] | 0   | 1   | 4   | 7   | 10  | 13  | 17  | 20  | 23  | 26  | 29  | 32  | 35  | 38  | 41  | 44  |
| [ 16] | 47  | 50  | 53  | 56  | 59  | 62  | 64  | 67  | 70  | 73  | 75  | 78  | 81  | 84  | 86  | 89  |
| [ 32] | 91  | 94  | 96  | 99  | 101 | 104 | 106 | 108 | 111 | 113 | 115 | 117 | 119 | 121 | 123 | 125 |
| [ 48] | 127 | 129 | 131 | 133 | 135 | 137 | 139 | 140 | 142 | 144 | 146 | 147 | 149 | 150 | 152 | 153 |
| [ 64] | 155 | 156 | 158 | 159 | 160 | 162 | 163 | 164 | 166 | 167 | 168 | 169 | 170 | 172 | 173 | 174 |
| [ 80] | 175 | 176 | 177 | 178 | 179 | 180 | 181 | 183 | 184 | 185 | 186 | 187 | 188 | 189 | 190 | 191 |
| [ 96] | 192 | 194 | 195 | 196 | 197 | 198 | 198 | 199 | 199 | 199 | 200 | 201 | 202 | 203 | 204 | 205 | 206 |
| [112] | 206 | 207 | 208 | 209 | 210 | 210 | 211 | 212 | 213 | 213 | 214 | 215 | 215 | 216 | 217 | 217 |
| [128] | 218 | 219 | 219 | 220 | 220 | 221 | 222 | 222 | 223 | 223 | 224 | 224 | 225 | 225 | 226 | 226 |
| [144] | 227 | 227 | 228 | 228 | 229 | 229 | 229 | 230 | 230 | 231 | 231 | 231 | 232 | 232 | 233 | 233 |
| [160] | 233 | 234 | 234 | 235 | 235 | 235 | 235 | 236 | 236 | 236 | 236 | 237 | 237 | 237 | 237 | 237 |
| [176] | 238 | 238 | 238 | 238 | 239 | 239 | 239 | 240 | 240 | 240 | 240 | 241 | 241 | 241 | 242 | 242 |
| [192] | 242 | 242 | 243 | 243 | 243 | 243 | 244 | 244 | 244 | 244 | 245 | 245 | 245 | 245 | 246 | 246 |
| [208] | 246 | 246 | 247 | 247 | 247 | 247 | 247 | 248 | 248 | 248 | 248 | 248 | 248 | 249 | 249 | 249 |
| [224] | 249 | 249 | 249 | 250 | 250 | 250 | 250 | 250 | 250 | 250 | 251 | 251 | 251 | 251 | 252 | 251 |
| [240] | 251 | 252 | 252 | 252 | 252 | 252 | 252 | 253 | 253 | 253 | 253 | 253 | 254 | 254 | 254 | 254 |

TABLE 3

8-bit Adjusted 32 × 32 Threshold Array - From 8-bit Unadjusted Array

| 250 | 164 | 225 | 252 | 175 | 247 | 111 | 244 | 162 | 248 | 211 | 35  | 234 | 129 | 222 | 240 |
| --- | --- | --- | --- | --- | --- | --- | --- | --- | --- | --- | --- | --- | --- | --- | --- |
| 89  | 219 | 241 | 50  | 235 | 144 | 226 | 204 | 233 | 96  | 236 | 253 | 159 | 248 | 47  | 176 |
| 198 | 248 | 127 | 212 | 250 | 194 | 253 | 41  | 247 | 216 | 133 | 198 | 238 | 186 | 243 | 230 |
| 236 | 170 | 224 | 243 | 75  | 231 | 179 | 240 | 146 | 229 | 250 | 219 | 70  | 251 | 144 | 206 |
| 249 | 35  | 254 | 181 | 218 | 248 | 121 | 207 | 251 | 184 | 20  | 242 | 232 | 115 | 217 | 246 |
| 221 | 203 | 233 | 139 | 238 | 13  | 243 | 227 | 86  | 236 | 248 | 180 | 149 | 249 | 234 | 172 |
| 106 | 250 | 73  | 247 | 167 | 252 | 220 | 152 | 246 | 210 | 108 | 224 | 244 | 195 | 7   | 252 |
| 235 | 155 | 239 | 213 | 231 | 104 | 192 | 240 | 47  | 254 | 199 | 250 | 73  | 219 | 242 | 135 |
| 206 | 246 | 189 | 44  | 250 | 210 | 247 | 163 | 234 | 140 | 237 | 153 | 228 | 253 | 169 | 237 |
| 229 | 94  | 252 | 228 | 137 | 236 | 64  | 251 | 216 | 245 | 13  | 240 | 209 | 111 | 245 | 59  |
| 167 | 241 | 150 | 201 | 246 | 175 | 242 | 204 | 91  | 188 | 248 | 166 | 251 | 191 | 231 | 220 |
| 249 | 59  | 222 | 251 | 4   | 238 | 146 | 230 | 250 | 224 | 129 | 232 | 29  | 241 | 96  | 247 |
| 236 | 183 | 243 | 121 | 232 | 206 | 254 | 41  | 178 | 243 | 198 | 252 | 217 | 152 | 249 | 206 |
| 104 | 253 | 217 | 174 | 249 | 84  | 214 | 345 | 222 | 75  | 236 | 111 | 244 | 235 | 194 | 1   |
| 212 | 233 | 41  | 245 | 225 | 187 | 239 | 113 | 251 | 169 | 248 | 213 | 176 | 70  | 253 | 238 |
| 250 | 144 | 238 | 202 | 125 | 252 | 153 | 237 | 195 | 240 | 35  | 229 | 249 | 217 | 139 | 221 |
| 86  | 246 | 158 | 250 | 223 | 17  | 247 | 218 | 67  | 225 | 250 | 185 | 101 | 235 | 245 | 187 |
| 222 | 194 | 232 | 94  | 242 | 198 | 230 | 160 | 253 | 206 | 121 | 237 | 252 | 199 | 38  | 249 |
| 244 | 59  | 253 | 219 | 178 | 250 | 81  | 243 | 140 | 247 | 232 | 168 | 62  | 243 | 230 | 169 |
| 181 | 237 | 173 | 248 | 26  | 216 | 238 | 188 | 236 | 7   | 201 | 248 | 226 | 181 | 133 | 254 |

TABLE 3-continued 8-bit Adjusted 32 × 32 Threshold Array - From 8-bit Unadjusted Array

| 248 | 208 | 123 | 236 | 205 | 245 | 119 | 251 | 170 | 227 | 253 | 106 | 207 | 250 | 237 | 78 |
|---|---|---|---|---|---|---|---|---|---|---|---|---|---|---|---|
| 146 | 251 | 224 | 86 | 254 | 163 | 231 | 59 | 241 | 137 | 190 | 237 | 244 | 17 | 198 | 228 |
| 230 | 7 | 242 | 215 | 144 | 242 | 197 | 249 | 180 | 246 | 223 | 84 | 164 | 234 | 247 | 176 |
| 200 | 238 | 175 | 250 | 229 | 20 | 235 | 125 | 238 | 38 | 249 | 210 | 252 | 219 | 94 | 251 |
| 253 | 156 | 245 | 73 | 202 | 247 | 152 | 251 | 206 | 230 | 172 | 240 | 53 | 181 | 243 | 206 |
| 53 | 234 | 133 | 226 | 252 | 166 | 237 | 213 | 78 | 254 | 129 | 200 | 248 | 235 | 139 | 226 |
| 237 | 185 | 250 | 213 | 108 | 242 | 47 | 227 | 247 | 184 | 241 | 223 | 101 | 213 | 253 | 67 |
| 142 | 248 | 17 | 240 | 189 | 223 | 253 | 178 | 119 | 237 | 10 | 251 | 192 | 244 | 170 | 231 |
| 227 | 205 | 233 | 173 | 249 | 91 | 199 | 248 | 232 | 167 | 245 | 150 | 237 | 23 | 239 | 156 |
| 250 | 119 | 254 | 67 | 229 | 211 | 243 | 29 | 217 | 251 | 106 | 226 | 208 | 251 | 131 | 248 |
| 183 | 235 | 196 | 244 | 147 | 251 | 163 | 239 | 140 | 228 | 197 | 249 | 75 | 229 | 181 | 236 |
| 23 | 246 | 101 | 209 | 238 | 4 | 235 | 188 | 252 | 64 | 241 | 177 | 245 | 202 | 252 | 89 |
| 192 | 4 | 245 | 215 | 119 | 249 | 20 | 219 | 249 | 78 | 253 | 140 | 222 | 239 | 201 | 150 |
| 250 | 235 | 159 | 237 | 184 | 225 | 244 | 153 | 232 | 196 | 216 | 242 | 106 | 179 | 245 | 229 |
| 101 | 219 | 249 | 70 | 253 | 104 | 209 | 251 | 135 | 243 | 26 | 227 | 248 | 214 | 10 | 252 |
| 254 | 183 | 133 | 240 | 224 | 199 | 238 | 64 | 236 | 169 | 250 | 187 | 81 | 251 | 223 | 123 |
| 29 | 231 | 244 | 192 | 13 | 247 | 162 | 249 | 212 | 246 | 108 | 221 | 241 | 160 | 238 | 186 |
| 239 | 204 | 89 | 250 | 235 | 146 | 240 | 190 | 44 | 230 | 201 | 254 | 147 | 234 | 62 | 242 |
| 155 | 248 | 221 | 159 | 217 | 251 | 113 | 220 | 252 | 164 | 237 | 38 | 248 | 210 | 246 | 176 |
| 229 | 50 | 236 | 252 | 73 | 197 | 231 | 247 | 96 | 243 | 137 | 239 | 225 | 125 | 194 | 253 |
| 199 | 246 | 186 | 121 | 226 | 245 | 23 | 177 | 233 | 210 | 251 | 188 | 78 | 250 | 226 | 13 |
| 251 | 160 | 242 | 208 | 240 | 152 | 253 | 218 | 249 | 1 | 174 | 244 | 208 | 235 | 147 | 244 |
| 131 | 233 | 32 | 249 | 99 | 213 | 236 | 127 | 191 | 238 | 222 | 115 | 248 | 53 | 251 | 214 |
| 180 | 254 | 218 | 189 | 224 | 250 | 62 | 229 | 248 | 159 | 252 | 204 | 229 | 178 | 237 | 117 |
| 240 | 81 | 237 | 142 | 245 | 168 | 243 | 207 | 91 | 242 | 41 | 239 | 99 | 254 | 190 | 220 |
| 225 | 248 | 173 | 252 | 44 | 233 | 139 | 253 | 225 | 150 | 236 | 172 | 244 | 223 | 23 | 248 |
| 156 | 210 | 231 | 113 | 241 | 199 | 238 | 32 | 187 | 251 | 197 | 248 | 135 | 200 | 243 | 164 |
| 251 | 26 | 247 | 215 | 155 | 246 | 174 | 249 | 235 | 108 | 230 | 67 | 234 | 250 | 32 | 228 |
| 117 | 239 | 149 | 235 | 250 | 53 | 227 | 125 | 211 | 246 | 168 | 252 | 215 | 162 | 239 | 205 |
| 223 | 203 | 252 | 91 | 220 | 185 | 254 | 198 | 237 | 35 | 241 | 222 | 115 | 247 | 10 | 252 |
| 241 | 64 | 228 | 179 | 243 | 232 | 86 | 247 | 158 | 251 | 142 | 198 | 238 | 185 | 235 | 137 |
| 155 | 246 | 196 | 249 | 10 | 167 | 242 | 215 | 233 | 99 | 224 | 249 | 62 | 254 | 158 | 241 |
| 215 | 233 | 117 | 236 | 210 | 251 | 206 | 50 | 250 | 183 | 240 | 149 | 244 | 203 | 227 | 47 |
| 249 | 29 | 252 | 160 | 245 | 127 | 239 | 173 | 219 | 248 | 1 | 217 | 231 | 96 | 251 | 215 |
| 131 | 242 | 212 | 226 | 81 | 233 | 191 | 253 | 117 | 229 | 200 | 252 | 162 | 236 | 170 | 247 |
| 236 | 195 | 147 | 247 | 199 | 250 | 17 | 224 | 246 | 75 | 242 | 127 | 246 | 26 | 240 | 113 |
| 7 | 231 | 253 | 56 | 237 | 180 | 245 | 131 | 203 | 238 | 186 | 233 | 177 | 250 | 196 | 222 |
| 249 | 179 | 123 | 243 | 215 | 89 | 218 | 235 | 250 | 158 | 254 | 56 | 239 | 213 | 99 | 244 |
| 190 | 240 | 220 | 156 | 248 | 205 | 252 | 175 | 38 | 228 | 135 | 244 | 153 | 229 | 252 | 166 |
| 247 | 84 | 250 | 228 | 32 | 237 | 111 | 242 | 214 | 249 | 184 | 220 | 251 | 20 | 209 | 240 |
| 217 | 234 | 117 | 195 | 251 | 149 | 247 | 198 | 237 | 104 | 243 | 84 | 236 | 191 | 249 | 70 |
| 44 | 253 | 207 | 244 | 168 | 235 | 220 | 50 | 166 | 252 | 211 | 233 | 129 | 246 | 172 | 218 |
| 213 | 163 | 238 | 56 | 241 | 94 | 254 | 210 | 245 | 189 | 4 | 250 | 199 | 231 | 115 | 242 |
| 247 | 227 | 142 | 251 | 202 | 231 | 177 | 240 | 123 | 237 | 225 | 174 | 247 | 56 | 253 | 223 |

To provide a specific example of how the look-up table is used, one should inspect the bottom left-hand array element of TABLE #1. As can be seen from this inspection, the numeric value is equal to "8." Now one is to inspect TABLE #2 for the numeric value 8. This value is found along the top row at the ninth position from the left, and the value found at that position is the number "23." In other words, the unadjusted value of 8 is to be adjusted (or corrected) by replacing that "8" with the value "23." Now one should inspect TABLE #3 at the bottom left-hand array element position, and it will be seen that the numeric value "23" is located at that position.

Figure 9:
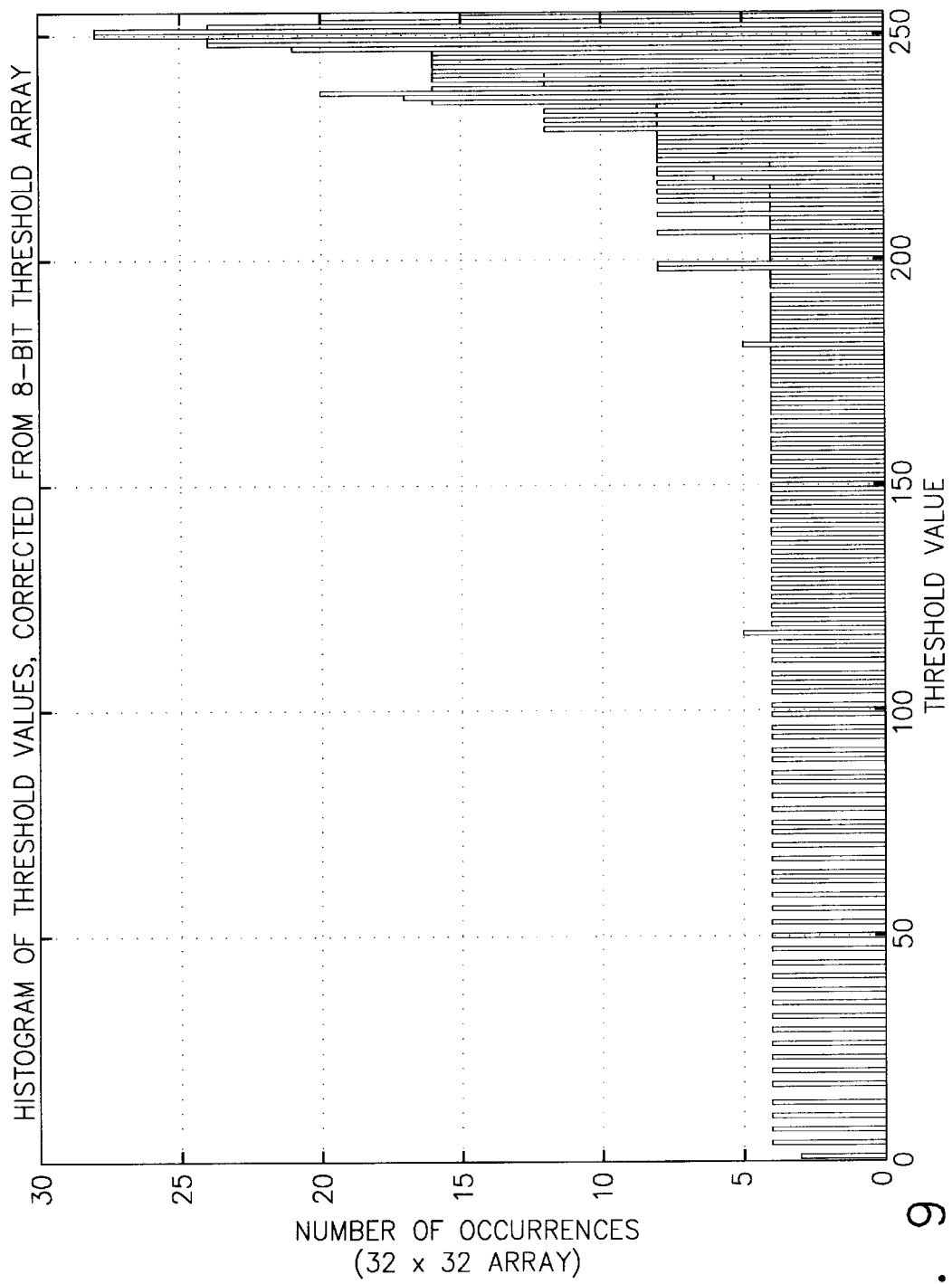
FIG. 9 is a graph illustrating a histogram of threshold values versus the number of occurrences in a 32×32 array that was corrected from an 8-bit threshold array, as according to the present invention.

Since the example of TABLES #1–3 used 8-bit precision throughout, many numeric values are missing from the adjusted output array of TABLE #3. This is particularly true for the lighter shades, since the human eye can perceive more fine differences in shading in the lighter shades than can be produced by the 8-bit resolution of these tables. This phenomenon is more clearly illustrated in the histogram of threshold values provided on FIG. 9. As can be seen, there are many threshold values along the left portion of this chart (along the gray scale axis) that have no numeric values associated. In other words, the number of occurrences within the adjusted 32×32 array is equal to zero (0) for many of the threshold values having values less than one hundred. It may be true that 8-bit adjusted arrays have been derived in the past from 8-bit unadjusted arrays, mainly stemming from operations performed at the factory of printer manufacturers. However, the prior printers typically store those adjusted threshold arrays in the printer's ROM, and since several different arrays are required to compensate for various types of print media and various colors that can be output by a color printer, these corrected or adjusted threshold arrays take a significant amount of memory space in the printer's ROM. One of the primary advantages of the present invention is to minimize the amount of ROM required to store the original unadjusted threshold arrays, as well as the look-up tables. This will be illustrated in an example, hereinbelow.

TABLE 4

10-bit Unadjusted 32 × 32 Threshold Array

| | | | | | | | | | | | | | | | |
|---|---|---|---|---|---|---|---|---|---|---|---|---|---|---|---|
| 924 | 283 | 564 | 972 | 320 | 859 | 156 | 798 | 273 | 877 | 473 | 45 | 644 | 194 | 540 | 743 |
| 222 | 516 | 759 | 64 | 651 | 225 | 567 | 436 | 633 | 133 | 683 | 1007 | 268 | 867 | 62 | 321 |
| 405 | 865 | 192 | 475 | 909 | 386 | 1000 | 53 | 847 | 499 | 201 | 408 | 719 | 359 | 782 | 607 |
| 677 | 304 | 553 | 787 | 103 | 622 | 334 | 742 | 230 | 600 | 927 | 520 | 92 | 955 | 228 | 448 |
| 892 | 46 | 1017 | 344 | 511 | 884 | 178 | 453 | 960 | 351 | 25 | 769 | 623 | 164 | 509 | 832 |
| 531 | 431 | 637 | 223 | 714 | 16 | 790 | 581 | 118 | 667 | 872 | 340 | 238 | 898 | 646 | 305 |
| 150 | 930 | 99 | 853 | 290 | 980 | 528 | 245 | 830 | 466 | 153 | 556 | 792 | 393 | 11 | 967 |
| 661 | 255 | 726 | 484 | 617 | 144 | 383 | 737 | 60 | 1010 | 417 | 911 | 97 | 525 | 760 | 207 |
| 442 | 829 | 373 | 57 | 921 | 463 | 860 | 277 | 647 | 218 | 689 | 251 | 584 | 996 | 299 | 692 |
| 602 | 131 | 985 | 586 | 211 | 675 | 84 | 962 | 500 | 808 | 19 | 732 | 460 | 159 | 822 | 76 |
| 291 | 749 | 242 | 422 | 835 | 317 | 767 | 435 | 127 | 368 | 882 | 286 | 939 | 379 | 613 | 525 |
| 902 | 77 | 542 | 944 | 4 | 716 | 231 | 610 | 926 | 552 | 193 | 626 | 36 | 756 | 135 | 846 |
| 670 | 348 | 781 | 179 | 629 | 449 | 1017 | 52 | 330 | 784 | 404 | 986 | 504 | 248 | 908 | 444 |
| 147 | 999 | 505 | 313 | 896 | 113 | 487 | 813 | 536 | 101 | 668 | 157 | 804 | 652 | 387 | 3 |
| 476 | 639 | 54 | 820 | 565 | 362 | 727 | 161 | 952 | 297 | 862 | 481 | 324 | 94 | 1001 | 705 |
| 936 | 226 | 718 | 427 | 188 | 974 | 249 | 685 | 390 | 745 | 44 | 594 | 893 | 508 | 216 | 534 |
| 119 | 831 | 264 | 915 | 547 | 21 | 858 | 513 | 88 | 560 | 923 | 356 | 142 | 664 | 816 | 363 |
| 535 | 389 | 627 | 130 | 763 | 406 | 606 | 272 | 1005 | 445 | 177 | 702 | 971 | 414 | 51 | 886 |
| 796 | 79 | 989 | 519 | 332 | 933 | 109 | 785 | 219 | 844 | 630 | 293 | 81 | 789 | 608 | 300 |
| 341 | 693 | 310 | 863 | 35 | 498 | 708 | 367 | 679 | 8 | 424 | 870 | 569 | 342 | 202 | 1022 |
| 880 | 457 | 181 | 674 | 441 | 817 | 174 | 959 | 301 | 578 | 990 | 151 | 451 | 931 | 698 | 107 |
| 232 | 956 | 557 | 117 | 1019 | 280 | 618 | 78 | 754 | 209 | 374 | 687 | 806 | 23 | 407 | 583 |
| 603 | 10 | 775 | 491 | 227 | 762 | 398 | 889 | 339 | 828 | 543 | 115 | 284 | 643 | 850 | 322 |
| 419 | 709 | 319 | 913 | 591 | 26 | 663 | 186 | 712 | 50 | 903 | 465 | 978 | 522 | 129 | 951 |
| 1003 | 258 | 812 | 96 | 428 | 841 | 247 | 943 | 443 | 604 | 308 | 736 | 68 | 345 | 786 | 447 |
| 70 | 649 | 204 | 574 | 970 | 287 | 700 | 479 | 105 | 1013 | 195 | 421 | 881 | 662 | 215 | 571 |
| 690 | 354 | 934 | 483 | 154 | 765 | 61 | 577 | 848 | 350 | 757 | 550 | 141 | 480 | 1002 | 90 |
| 222 | 861 | 20 | 747 | 370 | 546 | 991 | 331 | 175 | 684 | 12 | 963 | 382 | 799 | 302 | 612 |
| 580 | 440 | 634 | 312 | 897 | 124 | 410 | 871 | 628 | 289 | 811 | 244 | 697 | 30 | 730 | 260 |
| 912 | 173 | 1023 | 89 | 595 | 472 | 779 | 37 | 502 | 937 | 148 | 568 | 454 | 941 | 199 | 879 |
| 346 | 665 | 397 | 795 | 234 | 950 | 279 | 724 | 217 | 585 | 401 | 905 | 102 | 599 | 343 | 669 |
| 31 | 834 | 143 | 461 | 706 | 5 | 659 | 366 | 983 | 85 | 748 | 326 | 818 | 426 | 981 | 121 |
| 385 | 6 | 823 | 494 | 176 | 907 | 27 | 518 | 891 | 104 | 992 | 220 | 539 | 721 | 425 | 241 |
| 925 | 657 | 265 | 696 | 353 | 563 | 797 | 252 | 624 | 396 | 501 | 768 | 149 | 335 | 810 | 597 |
| 140 | 517 | 888 | 93 | 997 | 146 | 458 | 964 | 208 | 788 | 33 | 579 | 876 | 489 | 13 | 976 |
| 1020 | 347 | 203 | 733 | 551 | 412 | 707 | 87 | 671 | 298 | 926 | 365 | 110 | 948 | 544 | 184 |
| 39 | 620 | 803 | 384 | 17 | 857 | 276 | 900 | 474 | 827 | 155 | 532 | 752 | 270 | 717 | 360 |
| 722 | 437 | 123 | 914 | 656 | 229 | 746 | 376 | 59 | 605 | 423 | 1015 | 235 | 648 | 80 | 774 |
| 254 | 883 | 533 | 266 | 503 | 942 | 163 | 530 | 979 | 282 | 686 | 48 | 869 | 464 | 836 | 323 |
| 596 | 65 | 672 | 987 | 98 | 400 | 619 | 842 | 132 | 776 | 212 | 729 | 569 | 187 | 388 | 995 |
| 413 | 838 | 358 | 180 | 570 | 814 | 29 | 327 | 640 | 467 | 954 | 369 | 106 | 917 | 572 | 18 |
| 946 | 271 | 772 | 456 | 738 | 246 | 1006 | 512 | 899 | 1 | 315 | 794 | 455 | 655 | 236 | 801 |
| 197 | 632 | 43 | 901 | 137 | 482 | 681 | 190 | 380 | 715 | 541 | 166 | 878 | 69 | 953 | 488 |
| 338 | 1016 | 512 | 372 | 555 | 935 | 83 | 601 | 864 | 267 | 975 | 434 | 592 | 329 | 695 | 171 |
| 735 | 111 | 694 | 224 | 819 | 296 | 783 | 450 | 126 | 771 | 55 | 725 | 136 | 1021 | 377 | 527 |
| 561 | 874 | 311 | 969 | 58 | 635 | 214 | 993 | 566 | 243 | 676 | 306 | 805 | 545 | 28 | 868 |
| 259 | 468 | 611 | 160 | 753 | 416 | 713 | 41 | 364 | 940 | 399 | 873 | 206 | 418 | 778 | 281 |
| 945 | 32 | 852 | 493 | 256 | 833 | 314 | 894 | 658 | 152 | 609 | 91 | 645 | 919 | 40 | 590 |
| 168 | 731 | 240 | 660 | 928 | 71 | 582 | 185 | 471 | 824 | 295 | 988 | 492 | 275 | 723 | 438 |
| 548 | 430 | 984 | 125 | 524 | 357 | 1014 | 403 | 703 | 47 | 758 | 537 | 167 | 843 | 15 | 965 |
| 751 | 86 | 589 | 336 | 791 | 625 | 116 | 845 | 262 | 961 | 223 | 409 | 710 | 355 | 653 | 210 |
| 253 | 839 | 395 | 904 | 14 | 292 | 761 | 490 | 638 | 139 | 558 | 895 | 82 | 1009 | 261 | 750 |
| 497 | 636 | 169 | 673 | 469 | 957 | 446 | 67 | 920 | 349 | 734 | 237 | 793 | 433 | 575 | 63 |
| 890 | 38 | 966 | 269 | 815 | 191 | 728 | 309 | 521 | 866 | 2 | 506 | 615 | 134 | 938 | 495 |
| 198 | 770 | 477 | 573 | 108 | 641 | 378 | 996 | 172 | 598 | 420 | 973 | 274 | 682 | 303 | 854 |
| 680 | 391 | 233 | 851 | 411 | 932 | 22 | 554 | 829 | 100 | 773 | 189 | 837 | 34 | 744 | 162 |
| 9 | 621 | 1008 | 74 | 699 | 337 | 809 | 200 | 432 | 704 | 361 | 631 | 325 | 918 | 394 | 538 |
| 906 | 333 | 182 | 777 | 496 | 120 | 514 | 654 | 910 | 263 | 1018 | 75 | 720 | 478 | 138 | 800 |
| 375 | 740 | 529 | 257 | 875 | 435 | 982 | 318 | 49 | 587 | 205 | 807 | 250 | 593 | 977 | 285 |
| 840 | 114 | 922 | 588 | 42 | 691 | 158 | 766 | 486 | 885 | 352 | 523 | 949 | 24 | 459 | 741 |
| 507 | 650 | 170 | 392 | 947 | 238 | 856 | 402 | 688 | 145 | 780 | 112 | 678 | 381 | 887 | 85 |
| 56 | 994 | 452 | 802 | 294 | 666 | 526 | 66 | 288 | 968 | 470 | 642 | 196 | 826 | 307 | 510 |
| 485 | 278 | 711 | 72 | 755 | 128 | 1011 | 462 | 821 | 371 | 7 | 929 | 415 | 616 | 165 | 764 |
| 855 | 576 | 221 | 958 | 429 | 614 | 328 | 739 | 183 | 701 | 562 | 316 | 849 | 73 | 1004 | 549 |

TABLE 5

Transfer Function Table to Convert 10-bit Values to 8-bit Values

| | +0 | +1 | +2 | +3 | +4 | +5 | +6 | +7 | +8 | +9 | +10 | +11 | +12 | +13 | +14 | +15 |
|---|---|---|---|---|---|---|---|---|---|---|---|---|---|---|---|---|
| [ 0] | 0 | 1 | 2 | 3 | 3 | 4 | 5 | 6 | 6 | 7 | 8 | 9 | 10 | 10 | 11 | 12 |
| [32] | 25 | 26 | 26 | 27 | 28 | 29 | 30 | 30 | 31 | 32 | 33 | 33 | 34 | 35 | 36 | 36 |

TABLE 5-continued

Transfer Function Table to Convert 10-bit Values to 8-bit Values

| | +16 | +17 | +18 | +19 | +20 | +21 | +22 | +23 | +24 | +25 | +26 | +27 | +28 | +29 | +30 | +31 |
|---|---|---|---|---|---|---|---|---|---|---|---|---|---|---|---|---|
| [ 64] | 49 | 50 | 50 | 51 | 52 | 53 | 53 | 54 | 55 | 56 | 56 | 57 | 58 | 58 | 59 | 60 |
| [ 96] | 72 | 73 | 73 | 74 | 75 | 75 | 76 | 77 | 77 | 78 | 79 | 79 | 80 | 81 | 81 | 82 |
| [128] | 93 | 94 | 94 | 95 | 95 | 96 | 97 | 97 | 98 | 99 | 99 | 100 | 100 | 101 | 102 | 102 |
| [160] | 112 | 113 | 113 | 114 | 114 | 115 | 115 | 116 | 116 | 117 | 117 | 118 | 118 | 119 | 120 | 120 |
| [192] | 129 | 129 | 130 | 130 | 131 | 131 | 132 | 132 | 133 | 133 | 134 | 134 | 135 | 135 | 136 |
| [224] | 143 | 144 | 144 | 144 | 145 | 145 | 146 | 146 | 146 | 147 | 147 | 148 | 148 | 148 | 149 | 149 |
| [256] | 156 | 156 | 156 | 157 | 157 | 157 | 158 | 158 | 158 | 159 | 159 | 159 | 160 | 160 | 160 | 161 |
| [288] | 166 | 167 | 167 | 167 | 167 | 168 | 168 | 168 | 169 | 169 | 169 | 170 | 170 | 170 | 170 | 171 |
| [320] | 176 | 176 | 176 | 176 | 177 | 177 | 177 | 177 | 178 | 178 | 178 | 179 | 179 | 179 | 179 | 180 |
| [352] | 184 | 184 | 185 | 185 | 185 | 185 | 186 | 186 | 186 | 187 | 187 | 187 | 187 | 188 | 188 | 188 |
| [384] | 193 | 193 | 193 | 194 | 194 | 194 | 195 | 195 | 195 | 196 | 196 | 196 | 196 | 197 | 197 | 197 |
| [416] | 201 | 201 | 201 | 201 | 201 | 202 | 202 | 202 | 202 | 203 | 203 | 203 | 203 | 203 | 204 | 204 |
| [448] | 207 | 208 | 208 | 208 | 208 | 208 | 209 | 209 | 209 | 209 | 210 | 210 | 210 | 210 | 210 | 210 |
| [480] | 213 | 214 | 214 | 214 | 214 | 214 | 214 | 215 | 215 | 215 | 215 | 215 | 215 | 216 | 216 | 216 |
| [512] | 219 | 219 | 219 | 219 | 219 | 219 | 220 | 220 | 220 | 220 | 220 | 220 | 220 | 221 | 221 | 221 |
| [544] | 223 | 223 | 224 | 224 | 224 | 224 | 224 | 224 | 224 | 224 | 225 | 225 | 225 | 225 | 225 | 225 |
| [576] | 227 | 227 | 227 | 228 | 228 | 228 | 228 | 228 | 228 | 228 | 228 | 228 | 229 | 229 | 229 | 229 |
| [608] | 231 | 231 | 231 | 231 | 231 | 231 | 231 | 231 | 232 | 232 | 232 | 232 | 232 | 232 | 232 | 232 |
| [640] | 234 | 234 | 234 | 234 | 235 | 235 | 235 | 235 | 235 | 235 | 235 | 235 | 235 | 235 | 235 | 235 |
| [672] | 236 | 236 | 236 | 236 | 237 | 237 | 237 | 237 | 237 | 237 | 237 | 237 | 237 | 237 | 237 | 237 |
| [704] | 238 | 238 | 238 | 238 | 238 | 239 | 239 | 239 | 239 | 239 | 239 | 239 | 239 | 239 | 239 | 239 |
| [736] | 240 | 240 | 241 | 241 | 241 | 241 | 241 | 241 | 241 | 241 | 241 | 241 | 241 | 241 | 241 | 241 |
| [768] | 243 | 243 | 243 | 243 | 243 | 243 | 243 | 243 | 243 | 243 | 243 | 243 | 243 | 243 | 244 | 244 |
| [800] | 245 | 245 | 245 | 245 | 245 | 245 | 245 | 245 | 245 | 245 | 245 | 245 | 245 | 245 | 245 | 246 |
| [832] | 246 | 247 | 247 | 247 | 247 | 247 | 247 | 247 | 247 | 247 | 247 | 247 | 247 | 247 | 247 | 247 |
| [864] | 248 | 248 | 248 | 248 | 248 | 248 | 248 | 248 | 248 | 248 | 248 | 249 | 249 | 249 | 249 | 249 |
| [896] | 249 | 249 | 249 | 249 | 250 | 250 | 250 | 250 | 250 | 250 | 250 | 250 | 250 | 250 | 250 | 250 |
| [928] | 251 | 251 | 251 | 251 | 251 | 251 | 251 | 251 | 251 | 251 | 251 | 251 | 251 | 251 | 251 | 251 |
| [960] | 252 | 252 | 252 | 252 | 252 | 252 | 252 | 252 | 252 | 252 | 252 | 252 | 252 | 252 | 252 | 252 |
| [992] | 253 | 253 | 253 | 253 | 253 | 253 | 253 | 253 | 253 | 254 | 254 | 254 | 254 | 254 | 254 | 254 |

| | +16 | +17 | +18 | +19 | +20 | +21 | +22 | +23 | +24 | +25 | +26 | +27 | +28 | +29 | +30 | +31 |
|---|---|---|---|---|---|---|---|---|---|---|---|---|---|---|---|---|
| [ 0] | 13 | 13 | 14 | 15 | 16 | 16 | 17 | 18 | 19 | 20 | 20 | 21 | 22 | 23 | 23 | 24 |
| [ 32] | 37 | 38 | 39 | 39 | 40 | 41 | 42 | 42 | 43 | 44 | 45 | 45 | 46 | 47 | 48 | 48 |
| [ 64] | 61 | 61 | 62 | 63 | 63 | 64 | 65 | 66 | 66 | 67 | 68 | 68 | 69 | 70 | 70 | 71 |
| [ 96] | 83 | 83 | 84 | 85 | 85 | 86 | 87 | 87 | 88 | 89 | 89 | 90 | 90 | 91 | 92 | 92 |
| [128] | 103 | 103 | 104 | 104 | 105 | 106 | 106 | 107 | 107 | 108 | 109 | 109 | 110 | 110 | 111 | 111 |
| [160] | 121 | 121 | 122 | 122 | 123 | 123 | 124 | 124 | 125 | 125 | 126 | 126 | 127 | 127 | 128 | 128 |
| [192] | 136 | 137 | 137 | 138 | 138 | 138 | 139 | 139 | 140 | 140 | 141 | 141 | 142 | 142 | 142 | 143 |
| [224] | 150 | 150 | 150 | 151 | 151 | 152 | 152 | 152 | 153 | 153 | 153 | 154 | 154 | 155 | 155 | 155 |
| [256] | 161 | 161 | 162 | 162 | 162 | 163 | 163 | 163 | 164 | 164 | 164 | 165 | 165 | 165 | 166 | 166 |
| [288] | 171 | 171 | 172 | 172 | 172 | 172 | 173 | 173 | 173 | 174 | 174 | 174 | 174 | 175 | 175 | 175 |
| [320] | 180 | 180 | 180 | 181 | 181 | 181 | 181 | 182 | 182 | 182 | 183 | 183 | 183 | 183 | 184 | 184 |
| [352] | 188 | 189 | 189 | 189 | 190 | 190 | 190 | 190 | 191 | 191 | 191 | 191 | 192 | 192 | 192 | 193 |
| [384] | 198 | 198 | 198 | 198 | 198 | 198 | 199 | 199 | 199 | 199 | 199 | 200 | 200 | 200 | 200 | 200 |
| [416] | 204 | 204 | 205 | 205 | 205 | 205 | 205 | 206 | 206 | 206 | 206 | 206 | 207 | 207 | 207 | 207 |
| [448] | 210 | 211 | 211 | 211 | 211 | 211 | 212 | 212 | 212 | 212 | 212 | 213 | 213 | 213 | 213 | 213 |
| [480] | 216 | 216 | 216 | 217 | 217 | 217 | 217 | 217 | 217 | 218 | 218 | 218 | 218 | 218 | 218 | 219 |
| [512] | 221 | 221 | 221 | 221 | 222 | 222 | 222 | 222 | 222 | 222 | 222 | 223 | 223 | 223 | 223 | 223 |
| [544] | 225 | 225 | 226 | 226 | 226 | 226 | 226 | 226 | 226 | 226 | 227 | 227 | 227 | 227 | 227 | 227 |
| [576] | 229 | 229 | 229 | 229 | 229 | 230 | 230 | 230 | 230 | 230 | 230 | 230 | 230 | 230 | 231 | 231 |
| [608] | 232 | 232 | 232 | 233 | 233 | 233 | 233 | 233 | 233 | 233 | 233 | 233 | 233 | 233 | 234 | 234 |
| [640] | 235 | 236 | 236 | 236 | 236 | 236 | 236 | 236 | 236 | 236 | 236 | 236 | 236 | 236 | 236 | 236 |
| [672] | 237 | 237 | 237 | 237 | 238 | 238 | 238 | 238 | 238 | 238 | 238 | 238 | 238 | 238 | 238 | 238 |
| [704] | 239 | 239 | 239 | 240 | 240 | 240 | 240 | 240 | 240 | 240 | 240 | 240 | 240 | 240 | 240 | 240 |
| [736] | 242 | 242 | 242 | 242 | 242 | 242 | 242 | 242 | 242 | 242 | 242 | 242 | 242 | 242 | 242 | 243 |
| [768] | 244 | 244 | 244 | 244 | 244 | 244 | 244 | 244 | 244 | 244 | 244 | 244 | 244 | 244 | 245 | 245 |
| [800] | 246 | 246 | 246 | 246 | 246 | 246 | 246 | 246 | 246 | 246 | 246 | 246 | 246 | 246 | 246 | 246 |
| [832] | 247 | 247 | 247 | 247 | 247 | 248 | 248 | 248 | 248 | 248 | 248 | 248 | 248 | 248 | 248 | 248 |
| [864] | 249 | 249 | 249 | 249 | 249 | 249 | 249 | 249 | 249 | 249 | 249 | 249 | 249 | 249 | 249 | 249 |
| [896] | 250 | 250 | 250 | 250 | 250 | 250 | 250 | 250 | 250 | 250 | 250 | 250 | 250 | 250 | 250 | 251 |
| [928] | 251 | 251 | 251 | 251 | 251 | 251 | 251 | 251 | 251 | 251 | 251 | 252 | 252 | 252 | 252 | 252 |
| [960] | 252 | 252 | 252 | 252 | 253 | 253 | 253 | 253 | 253 | 253 | 253 | 253 | 253 | 253 | 253 | 253 |
| [992] | 254 | 254 | 254 | 254 | 254 | 254 | 254 | 254 | 254 | 254 | 255 | 255 | 255 | 255 | 255 | 255 |

TABLE 6

8-bit Adjusted 32 × 32 Threshold Array - From 10-bit Unadjusted Array

| 250 | 165 | 226 | 252 | 176 | 248 | 110 | 245 | 161 | 249 | 212 | 35 | 235 | 130 | 223 | 241 |
|---|---|---|---|---|---|---|---|---|---|---|---|---|---|---|---|
| 89 | 219 | 242 | 49 | 235 | 144 | 226 | 205 | 233 | 96 | 237 | 254 | 160 | 248 | 48 | 176 |
| 198 | 248 | 129 | 213 | 250 | 193 | 253 | 41 | 247 | 217 | 133 | 199 | 239 | 186 | 244 | 231 |
| 237 | 171 | 224 | 244 | 77 | 232 | 179 | 241 | 146 | 230 | 251 | 220 | 69 | 252 | 145 | 207 |

TABLE 6-continued 8-bit Adjusted 32 × 32 Threshold Array - From 10-bit Unadjusted Array

| | | | | | | | | | | | | | | | |
|---|---|---|---|---|---|---|---|---|---|---|---|---|---|---|---|
| 249 | 36 | 254 | 182 | 219 | 249 | 122 | 208 | 252 | 184 | 20 | 243 | 232 | 114 | 218 | 246 |
| 221 | 204 | 233 | 138 | 239 | 13 | 244 | 228 | 87 | 236 | 248 | 181 | 149 | 249 | 235 | 171 |
| 106 | 251 | 74 | 248 | 167 | 253 | 221 | 152 | 246 | 211 | 108 | 225 | 244 | 196 | 9 | 252 |
| 236 | 155 | 240 | 214 | 232 | 103 | 193 | 240 | 46 | 254 | 201 | 250 | 73 | 219 | 242 | 136 |
| 206 | 246 | 190 | 44 | 250 | 210 | 248 | 163 | 235 | 141 | 237 | 154 | 228 | 253 | 170 | 237 |
| 230 | 95 | 253 | 228 | 138 | 236 | 63 | 252 | 217 | 245 | 15 | 240 | 210 | 111 | 246 | 58 |
| 167 | 241 | 150 | 202 | 247 | 175 | 243 | 205 | 92 | 188 | 249 | 166 | 251 | 191 | 231 | 221 |
| 250 | 58 | 223 | 251 | 3 | 239 | 146 | 231 | 250 | 224 | 129 | 232 | 28 | 242 | 97 | 247 |
| 236 | 183 | 243 | 122 | 233 | 208 | 254 | 40 | 178 | 244 | 198 | 253 | 217 | 153 | 250 | 207 |
| 104 | 253 | 218 | 174 | 249 | 83 | 215 | 245 | 222 | 75 | 236 | 110 | 245 | 235 | 194 | 3 |
| 213 | 234 | 42 | 246 | 226 | 187 | 240 | 113 | 251 | 169 | 248 | 214 | 177 | 70 | 254 | 238 |
| 251 | 144 | 239 | 203 | 127 | 252 | 153 | 237 | 195 | 241 | 34 | 229 | 249 | 218 | 140 | 222 |
| 87 | 246 | 158 | 250 | 224 | 16 | 248 | 219 | 66 | 225 | 250 | 185 | 102 | 236 | 246 | 187 |
| 222 | 194 | 233 | 94 | 242 | 198 | 231 | 161 | 254 | 207 | 121 | 238 | 252 | 200 | 39 | 249 |
| 244 | 60 | 253 | 220 | 179 | 251 | 81 | 244 | 141 | 247 | 233 | 168 | 61 | 244 | 231 | 170 |
| 181 | 238 | 173 | 248 | 27 | 216 | 238 | 188 | 237 | 6 | 202 | 248 | 226 | 181 | 133 | 255 |
| 249 | 209 | 123 | 236 | 206 | 246 | 120 | 252 | 170 | 227 | 253 | 107 | 208 | 251 | 238 | 79 |
| 146 | 252 | 225 | 86 | 255 | 164 | 232 | 59 | 242 | 137 | 190 | 237 | 245 | 18 | 199 | 228 |
| 230 | 8 | 243 | 215 | 144 | 242 | 197 | 249 | 181 | 246 | 223 | 85 | 165 | 234 | 247 | 176 |
| 201 | 239 | 175 | 250 | 229 | 20 | 236 | 126 | 239 | 39 | 250 | 211 | 252 | 220 | 94 | 251 |
| 254 | 156 | 245 | 72 | 203 | 247 | 152 | 251 | 206 | 230 | 172 | 240 | 52 | 182 | 244 | 207 |
| 53 | 235 | 134 | 227 | 252 | 166 | 238 | 213 | 78 | 254 | 130 | 202 | 249 | 236 | 139 | 227 |
| 237 | 185 | 251 | 214 | 109 | 242 | 47 | 227 | 247 | 184 | 242 | 224 | 101 | 213 | 254 | 68 |
| 142 | 248 | 16 | 241 | 189 | 224 | 253 | 179 | 120 | 237 | 10 | 252 | 192 | 245 | 170 | 231 |
| 228 | 206 | 233 | 173 | 249 | 90 | 199 | 248 | 233 | 167 | 245 | 151 | 238 | 23 | 240 | 157 |
| 250 | 119 | 255 | 67 | 229 | 217 | 243 | 29 | 217 | 251 | 105 | 226 | 209 | 251 | 132 | 249 |
| 183 | 236 | 197 | 244 | 147 | 251 | 163 | 240 | 140 | 228 | 198 | 250 | 76 | 230 | 182 | 236 |
| 24 | 247 | 102 | 210 | 238 | 4 | 236 | 188 | 253 | 64 | 241 | 177 | 246 | 203 | 253 | 89 |
| 193 | 5 | 246 | 216 | 121 | 250 | 21 | 220 | 249 | 77 | 253 | 142 | 223 | 239 | 203 | 150 |
| 250 | 236 | 159 | 238 | 184 | 226 | 244 | 154 | 232 | 196 | 217 | 243 | 106 | 180 | 245 | 230 |
| 100 | 219 | 249 | 70 | 253 | 104 | 209 | 252 | 136 | 244 | 26 | 228 | 249 | 215 | 10 | 252 |
| 255 | 183 | 134 | 240 | 224 | 200 | 238 | 66 | 236 | 169 | 250 | 188 | 81 | 251 | 223 | 125 |
| 30 | 232 | 245 | 193 | 13 | 248 | 162 | 250 | 212 | 246 | 109 | 222 | 242 | 160 | 239 | 186 |
| 239 | 205 | 90 | 250 | 235 | 145 | 241 | 191 | 45 | 230 | 202 | 254 | 148 | 235 | 61 | 243 |
| 155 | 249 | 222 | 159 | 217 | 251 | 114 | 221 | 252 | 164 | 237 | 37 | 248 | 210 | 247 | 176 |
| 229 | 50 | 236 | 253 | 73 | 198 | 232 | 247 | 95 | 243 | 138 | 240 | 225 | 126 | 194 | 253 |
| 200 | 247 | 186 | 123 | 227 | 245 | 23 | 177 | 234 | 211 | 251 | 189 | 79 | 250 | 227 | 14 |
| 251 | 161 | 243 | 209 | 241 | 152 | 254 | 219 | 249 | 1 | 174 | 244 | 209 | 235 | 148 | 245 |
| 131 | 233 | 33 | 250 | 99 | 214 | 237 | 128 | 192 | 239 | 223 | 115 | 249 | 53 | 251 | 215 |
| 180 | 254 | 219 | 190 | 225 | 251 | 63 | 230 | 248 | 159 | 252 | 205 | 229 | 178 | 238 | 118 |
| 240 | 82 | 238 | 143 | 246 | 169 | 244 | 208 | 92 | 243 | 42 | 240 | 98 | 255 | 191 | 221 |
| 225 | 248 | 173 | 252 | 45 | 233 | 139 | 253 | 226 | 151 | 237 | 172 | 245 | 223 | 22 | 248 |
| 157 | 211 | 231 | 112 | 242 | 201 | 239 | 32 | 187 | 251 | 197 | 248 | 135 | 201 | 243 | 164 |
| 251 | 25 | 247 | 216 | 156 | 247 | 174 | 249 | 236 | 107 | 231 | 68 | 235 | 250 | 31 | 229 |
| 116 | 240 | 150 | 236 | 251 | 54 | 228 | 125 | 212 | 246 | 168 | 253 | 215 | 162 | 240 | 205 |
| 224 | 204 | 253 | 91 | 220 | 185 | 254 | 198 | 238 | 36 | 242 | 222 | 116 | 247 | 12 | 252 |
| 241 | 65 | 229 | 180 | 244 | 232 | 85 | 247 | 158 | 252 | 143 | 199 | 239 | 185 | 235 | 137 |
| 155 | 247 | 196 | 250 | 11 | 167 | 242 | 215 | 234 | 100 | 225 | 249 | 62 | 254 | 157 | 241 |
| 216 | 233 | 117 | 236 | 211 | 252 | 207 | 51 | 250 | 183 | 240 | 148 | 244 | 204 | 227 | 48 |
| 249 | 30 | 252 | 160 | 246 | 128 | 240 | 172 | 220 | 248 | 2 | 218 | 231 | 97 | 251 | 216 |
| 132 | 243 | 213 | 227 | 80 | 234 | 191 | 253 | 118 | 230 | 201 | 252 | 162 | 237 | 171 | 248 |
| 237 | 195 | 147 | 247 | 199 | 251 | 17 | 225 | 246 | 75 | 243 | 127 | 247 | 26 | 241 | 113 |
| 7 | 232 | 254 | 56 | 238 | 180 | 245 | 133 | 204 | 238 | 187 | 233 | 177 | 250 | 196 | 222 |
| 250 | 179 | 124 | 243 | 216 | 88 | 219 | 235 | 250 | 158 | 255 | 57 | 239 | 213 | 99 | 245 |
| 190 | 241 | 221 | 156 | 249 | 206 | 253 | 175 | 38 | 228 | 135 | 245 | 153 | 229 | 252 | 165 |
| 247 | 84 | 250 | 229 | 33 | 237 | 111 | 242 | 214 | 249 | 184 | 220 | 251 | 19 | 210 | 241 |
| 218 | 235 | 117 | 195 | 251 | 149 | 248 | 198 | 237 | 103 | 243 | 83 | 237 | 192 | 249 | 71 |
| 43 | 253 | 208 | 245 | 168 | 236 | 221 | 50 | 166 | 252 | 212 | 234 | 131 | 246 | 172 | 218 |
| 214 | 163 | 239 | 55 | 242 | 93 | 254 | 210 | 246 | 189 | 6 | 251 | 200 | 232 | 115 | 242 |
| 248 | 227 | 142 | 252 | 203 | 231 | 178 | 241 | 124 | 238 | 226 | 174 | 247 | 56 | 254 | 224 |

TABLES #4–6 provide an example of a preferred methodology to correct for improved visual perception an unadjusted 10-bit stochastic threshold array and to convert that information to an adjusted 8-bit threshold array. TABLE #4 illustrates a 32×32 stochastic threshold array, in which each of the array elements has a 10-bit value in the range of 1–1023. As in the previous example, the numeric value zero (0) is not used in any of these array elements. Since there are 1024 array locations, and 1024 (or more precisely 1023) possible numeric values, there should be a single array element location for each particular numeric value in this range. (Obviously, one of the numbers must be represented twice within this array.) Since this array is unadjusted, if a printer were to take this array's values and directly use that for its gray level half toning, a curve such as the one at 102 in FIG. 2 would likely result as the printed response of light intensity versus gray level in which the gray levels range from 1–1023.

TABLE #5 is a look-up table that is used to convert the 10-bit values of an unadjusted array (i.e., the array of TABLE #4) to adjusted 8-bit numeric values. TABLE #6 is the resulting adjusted threshold array, which uses 8-bit precision having values ranging between 1–255. TABLE #5 starts with values in the range of 1–1023, and therefore, requires a 32×32 array for storing this look-up table. The final adjusted 8-bit array of TABLE #6 is also 32×32 in size, however, the numeric values of the array elements of TABLE #6 are only 8-bit values ranging between 1–255.

As can be seen by an inspection of TABLE #5, there are no skipped or missing numeric values in the range of 0–255 among the array elements in TABLE #5. There are, of course, duplicate numeric values for more than one array location in many cases, especially in the larger values in the darker gray levels. A histogram of output values for the final 8-bit adjusted array depicted in TABLE #6 is illustrated on FIG. 10. As can be seen by viewing FIG. 10, every threshold value has at least one occurrence for this 32×32 array.

TABLES #4–6 are used in a similar manner as were the tables in the 8-bit example of TABLES #1–3. For example, in TABLE #4, the numeric value for the lower left-hand corner array element is equal to "31." This value "31" corresponds to the 10-bit range of 0–1023. The look-up table depicted in TABLE #5 shows this array location in the upper right-hand corner of this TABLE #5. As can be seen by inspecting the look-up table on TABLE #5, the converted, adjusted numeric value for this array location is equal to "24."

Figure 10:
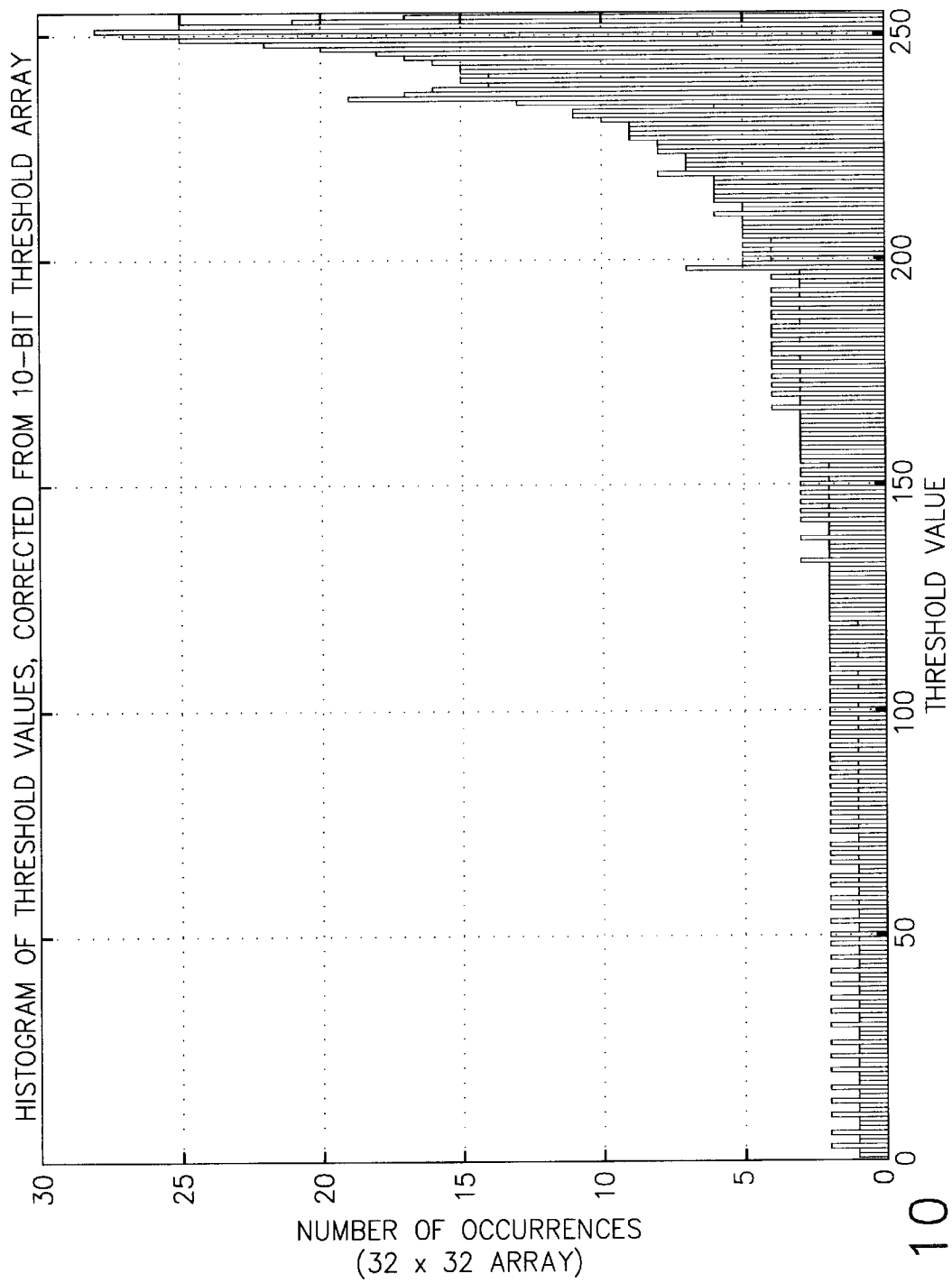
FIG. 10 is a graph illustrating a histogram of threshold values versus the number of occurrences in a 32×32 array that was corrected from a 10-bit threshold array, as according to the principles of the present invention.

The final result is illustrated in TABLE #6 by inspecting the lower left-hand corner array element location, which has a numeric value of "24." Thus, the 10-bit unadjusted value of "31" becomes an adjusted 8-bit value of "24," utilizing the principles of the present invention and the look-up table conversion methodology. One key aspect of this methodology is the use of a numeric precision in the unadjusted array that is greater than the numeric precision in the final adjusted array. In the example of TABLES #4–6, herein, the precision of the unadjusted array was 10-bits, which provides a numeric range between zero (0) and 1023. At the same time, the precision of the final adjusted array was 8-bits, ranging numerically between zero (0) and 255. This not only allows a more uniform histogram of threshold values (as illustrated in FIG. 10), but also allows for much finer gray level resolution that more perfectly emulates the human perceptual levels of increasing lightness or darkness for any given color. This last concept is illustrated in TABLE #7.

TABLE 7

| Perceptual Level | Normalized 0–255 Level | Number of Dots 8-bit Unadjusted | Number of Dots 10-bit Unadjusted | Number of Dots 8-bit Adjusted |
|---|---|---|---|---|
| 0 | 0 | 0 | 0 | 0 |
| 1 | 0.25 | | 16 | |
| 2 | 0.5 | | 32 | |
| 3 | 0.75 | | 48 | |
| 4 | 1 | 64 | 64 | 16 |
| 5 | 1.25 | | 80 | |
| 6 | 1.5 | | 96 | |
| 7 | 1.75 | | 112 | |
| 8 | 2 | 128 | 128 | 32 |
| 9 | 2.25 | | 144 | |
| 10 | 2.5 | | 160 | |
| 11 | 2.75 | | 176 | |
| 12 | 3 | 192 | 192 | 48 |
| 13 | 3.25 | | 208 | |
| 14 | 3.5 | | 224 | |
| 15 | 3.75 | | 240 | |
| 16 | 4 | 256 | 256 | 48 |
| 17 | 4.25 | | 272 | |
| 18 | 4.5 | | 288 | |
| 19 | 4.75 | | 304 | |
| 20 | 5 | 320 | 320 | 64 |
| 21 | 5.25 | | 336 | |
| 22 | 5.5 | | 352 | |

TABLE 7-continued

| Perceptual Level | Normalized 0–255 Level | Number of Dots 8-bit Unadjusted | Number of Dots 10-bit Unadjusted | Number of Dots 8-bit Adjusted |
|---|---|---|---|---|
| 23 | 5.75 | | 368 | |
| 24 | 6 | 384 | 384 | 80 |
| 25 | 6.25 | | 400 | |
| 26 | 6.5 | | 416 | |
| 27 | 6.75 | | 432 | |
| 28 | 7 | 448 | 448 | 96 |
| . | . | . | . | . |
| . | . | . | . | . |
| 1015 | 253.75 | | 16,240 | |
| 1016 | 254 | 16,256 | 16,256 | 16,320 |
| 1017 | 254.25 | | 16,272 | |
| 1018 | 254.5 | | 16,288 | |
| 1019 | 254.75 | | 16,304 | |
| 1020 | 255 | 16,320 | 16,320 | 16,320 |
| 1021 | 255.25 | | 16,336 | |
| 1022 | 255.5 | | 16,352 | |
| 1023 | 255.75 | | 16,368 | |

In TABLE #7, the left-hand column represents a theoretical perceptual level of lightness versus darkness, ranging between the values of 0–1023. Since the human eye cannot actually discern anywhere close to that number of perceptual levels, the next column to the right on TABLE #7 provides a "normalized" perceptual level in the range of 0–255. This is achieved by merely dividing by four the numeric values of the perceptual level in the left-hand column. For example, the perceptual level 9 becomes 2.25 on the normalized perceptual level column.

Even this normalized perceptual level column is not entirely accurate with respect to possible human perceptual level sensitivities. In general, human beings can perceive only approximately one hundred different levels of light intensity or darkness, and that is one reason that the CIELAB L* scale ranges between zero (0) and one hundred (100). On the normalized 0–255 level column of TABLE #7, these levels run from zero (0) through 255, which really more closely approximates an 8-bit gray scale darkness or lightness level. Of course, the key idea here is to use an adjusted gray scale level so that the linearly increasing numeric values along the normalized level column will approximate the perceptual level sensitivity of the human eye.

It will be understood that the tables provided in this document (i.e., TABLES #1–6) were provided as 32×32 threshold arrays, which had a total of 1024 possible array element locations. This is not necessarily a preferred array size for a tiling-type threshold array to be used in an actual printer. In fact, it is preferred to use a much larger array, one having a threshold array that is 128×128 elements in size. This provides a total number of elements or pixel locations of 16,384, which is equal to 214. If 8-bit element values are used to make up this 128×128 array in memory, then a total of 16,384 bytes will be required to represent the entire array. As with other prior art halftoning techniques, it is preferred to use the threshold array in a tiling manner over the entire bitmap that is to be printed.

The values in TABLE #7 in the three right-hand columns refer to the number of dots that will have a particular numeric value within a threshold array that is 128×128 in size. The middle column refers to the number of dots that would be used in each position for an 8-bit unadjusted stochastic threshold array. For example, using the normalized scale, a value of three (3) means that there will be 192 dots that will be printed for that particular gray level of intensity. Of course, this unadjusted scale would ultimately lead to a printing response similar to that depicted by the curve 102 in FIG. 2. Each gray level increase adds 64 more dots to the next threshold array level.

The fourth column from the left shows the number of dots that would be printed for each gray level using a 10-bit unadjusted stochastic threshold array. Since there is greater precision to be utilized, there will only be an increase of sixteen additional dots per level change, although on the normalized level scale of the second column, each integer increase would also provide a 64-dot level increase as one increases the normalized gray level, from integer value to the next integer value.

This greater precision available in a 10-bit unadjusted array can be used to advantage by applying the principles of the present invention. Since the 10-bit unadjusted array has one part out of 1024 precision, the look-up table concept can be used to map the lighter gray level values to provide an adjusted 8-bit array that will essentially have the same precision of the original 10-bit unadjusted array. In other words, the final resulting 8-bit array (which would normally only have a precision of one part of 256) can effectively have a much better precision of one part out of 1024. This is demonstrated by inspecting the fifth column (i.e., the right-hand column) of TABLE #7.

For example, if the normalized level of three (3) is to be printed, using the adjusted threshold array will result in forty-eight (48) dots being printed instead of the unadjusted value of 192. This will obviously provide a much lighter shading for the preferred printer's halftoning technique, but this is precisely what is needed to correct the non-linear printer response, such as the curve 102. The resulting perceptual response of the right-hand adjusted column is much closer to the straight line 100 on FIG. 2. In fact, the adjusted response will be precisely along line 100, at least within the precision of the 10-bits that were provided in the initial unadjusted threshold array. Of course, that precision is only one part out of 1024, which means there is about a $\frac{1}{10}^{th}\%$ error as a maximum deviation from the preferred straight line 100, as would be seen on a graph of L* versus gray level (similar to FIG. 2). Naturally, if the unadjusted threshold array were to have a greater precision (such as 11-bit or 12-bit precision), then the final output of the 8-bit adjusted array could have even finer differentiations between numbers of dots being printed at the normalized levels, and could have even less error as compared to the ideal target response along line 100 of FIG. 2, for example.

This concept has been thoroughly tested by the inventors, and the 10-bit precision available using the exact teachings of the present invention provide a very close match to the perfect target response for a printer's output, and any small fractional percentage error would be essentially indiscernible by the normal human eye.

The middle column of TABLE #7 provides a result that is essentially equivalent to the 32×32 unadjusted 8-bit array illustrated in TABLE #1, with the understanding that the 32×32 array only has a total of 1024 possible array element locations, whereas the number of dots depicted on TABLE #7 represent a 128×128 array having a total possible number of array elements of 16,384. In a similar manner, the fourth column from the left on TABLE #7 provides a result that is essentially equivalent to providing a 10-bit unadjusted array such as that depicted in TABLE #4 (again with the same understanding that the number of dots is different for the smaller 32×32 threshold array of TABLE #4). Finally, the number of dots of the 8-bit adjusted column of TABLE #7 along the right-hand column provides a result that is essentially equivalent to the adjusted array illustrated in TABLE #6, which exhibits the characteristics of the histogram depicted on FIG. 10. As discussed above, this histogram of threshold values illustrates clearly that a more uniform and linear result is provided by using a 10-bit unadjusted stochastic threshold array as the starting point as compared to merely using an 8-bit unadjusted stochastic threshold array. Since all of the threshold values are covered by the array of TABLE #6, it can be seen that a precision greater than 10 bits may not provide an important enough improvement to warrant the extra complexity and memory location requirements that would need to be provided to use a greater precision starting array.

Figure 11:
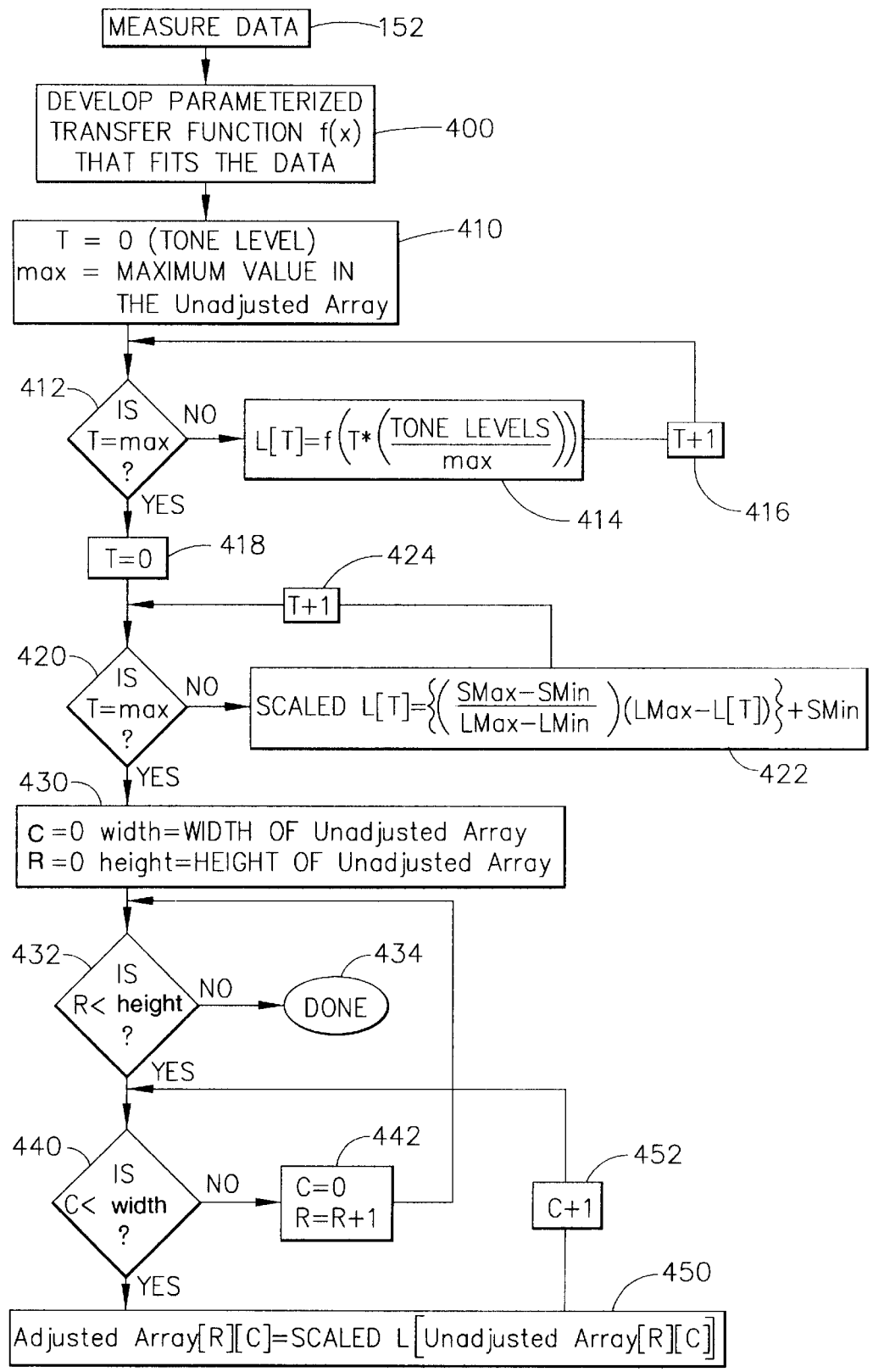
FIG. 11 is a flow chart illustrating the steps for sampling the transfer function equations and applying them to the uncorrected data of the unadjusted threshold array in order to derive the adjusted threshold array, according to the principles of the present invention.

In order to generate corrected data for the adjusted threshold array that is based upon an unadjusted stochastic threshold array (such as that depicted in TABLE #4), the printer must calculate a series of scaled lightness levels (i.e., gray levels) that will be entered into the adjusted threshold array at run time, once the printer receives a print job from a host computer. FIG. 11 illustrates a flow chart that depicts the important logical operations used by the methodology of the present invention to perform these tasks.

The first step in FIG. 11 is step 152 where the light intensity is measured for each square that was printed by the particular printer of interest, and this light intensity data is then measured, as described hereinabove with respect to FIG. 4. After that has been accomplished, a step 400 develops the parameterized transfer function, f(x)—i.e., the set of "transfer function equations"—that fits the data derived above in step 152. Of course, the data being referred to at this point is similar to the curve 102 on FIG. 2, or one of the other actual printer response curves as illustrated on FIG. 3, i.e., curves 112 or 122.

In performing this step 400, the type of equation or equations must be determined that will match up to (or "fit") the actual data of the printer response curve. Once the type of equation for a particular range of gray scale values is determined, the precise coefficients must now be determined. Of course, in actuality, the determination of coefficients and type of equation will likely be first determined before the range of gray scale values is selected for representation by this particular equation that is derived at this step 400. Obviously, a large number of iterations will be needed to derive the actual equations, and the number of iterations will also depend upon the attempted precision that is being sought. The greater the number of bits that represents the initially-provided unadjusted threshold arrays (e.g., 10-bit data or 8-bit data), the greater the useful precision that may be obtained. Floating point numbers could also be used in the unadjusted threshold arrays, but such use of floating point numbers would defeat some of the inventive purposes of diminishing processing time at run time and minimizing storage space in non-volatile memory (e.g., ROM) of the printer.

Once the parameterized transfer function f(x) has been developed, at run time the transfer function equations (i.e., the f(x) parameterized transfer function) can be sampled, starting at a step 410. In the flow chart of FIG. 11, the variable "T" represents the tone level that will be used in a threshold array. The tone level "T" will have a numeric range from zero through the maximum decimal or binary number that can be defined with a particular number of binary digits in a memory location or in a register. For example, if 8-bit data is to be used, then the range of numeric values for "T" will be 0–255. On the other hand, if 10-bit data is used, then the numeric range of values for "T" will be 0–1023. At step 410, the value of "T" is set to zero (0).

In the preferred embodiment, "T" in the unadjusted threshold array will have the range 0–1023, since the array elements are represented by 10-bit numbers. If the unadjusted array were to use array elements that are represented, for example, by 8-bit numbers, then "T" would have a range of 0–255.

A step 412 now determines whether or not the current value of "T" is equal to its maximum possible value. Of course, the answer will be NO at this point, since "T" was just set to zero (0). That being the case, the logic flow is directed to a step 414 that calculates a lightness value, essentially a value for L*, which is equal to the function of "x," f(x). In this instance, f(x) is equal to a function of {T·(tone levels/max)}. The quantity "tone levels" represents the maximum number of gray levels that will be used in the final adjusted threshold array, and is not dependent upon the precision of the numeric elements of the adjusted array, or the unadjusted threshold array for that matter. It is preferred that "tone levels" be set to a value of 255, which provides more than enough precision to give a smooth number of perceived tone levels (i.e., more levels that can be perceived by a human eye), and further the maximum value of 255 can be represented by a single 8-bit byte in memory. In addition, the preferred value for "max" is 1023, which represents the maximum (base 10) numeric value of a 10-bit binary number. In effect, this part of the equation f(x) is used to "normalize" the data from 1024 steps (at 10-bit precision) from 0–1023, to 256 steps (but still at 10-bit precision) from 0–255. This is similar to the two left-hand columns illustrated above in TABLE #7, in which the number of steps is 1024 in both cases, but the second column describes these steps as being in the range of 0–255.75.

The function "f(x)" used in step 414 gives values for L* in the range of 0–100, in which 0=pure black and 100=pure white. The f(x) values derived in this step 414 represent a multiple sampling of the actual printer response curve (such as curve 102 of FIG. 2) for a particular combination of printer color and print media. If, for example, the precision of the unadjusted array is 10-bits, then f(x) will sample the printer response curve 1024 times to create that many uncorrected values of L* to be used in further steps of the flow chart of FIG. 11. After the first pass has been accomplished, a step 416 increments the value of "T," and the logic flow is returned to decision step 412 to sample the next value at the next incremental tone level.

Once the entire range of tone levels has been sampled and L[T] has been calculated for each of these tone levels, then the result at decision step 412 will become YES, and the logic, flow will be directed to a step 418, where "T" is again set to zero (0). At this time, the methodology of the present invention will scale the data values to the appropriate range. In the earlier step 414, the preferred tone level range for "T" used 10-bit data, so the values for T ranged from 0–1023. In the following steps starting with a decision step 420, the values for "T" will be scaled to an 8-bit range of numeric values 0–255.

At decision step 420, it is determined if "T" is equal to its maximum value (i.e., of 1023, when using 10-bit data, as per this example). Of course, at this first pass the result will be NO and the logic flow is directed to a step 422, where a scaled value for the lightness level "L[T]" is calculated using the equation:

$$\{[(Smax-Smin)/(Lmax-Lmin)]\cdot(Lmax-L[T])\}+Smin.$$

For this calculation, the values for the variable "S" are to be 8-bit precision in a preferred embodiment, so these values will range from 1–255. In other words, Smax=255, and Smin=1. In the magenta example for plain paper exhibited on FIG. 2, the maximum L* value was 94.8, whereas the minimum L* value was 46.1. In the equation provided in step 422 of FIG. 11, the value for Lmax is, therefore, equal to 94.8, and the value for Lmin is, therefore, equal to 46.1. The use of these actual maximum and minimum values of L* for a particular printer's actual printed response will tend to maximize the precision that can be obtained when using the methodology of the present invention.

Step 422 functions to maximize the precision of the L* values that are of particular interest for this combination of printer color and print media. There will always be a maximum and minimum achievable L* value for any particular such combination, and these achievable maximum and minimum L* values will almost never be a zero (0) and one hundred (100). So it is preferred to concentrate solely on the actual achievable range of printed response for this combination. The general form of the equation is provided at step 422 on the flow chart of FIG. 11.

In the preferred embodiment depicted in FIG. 11, the result of the iterative process created by steps 420, 422, and 424, is to create a temporary look-up table, which preferably would be stored in the printer's RAM 15. This temporary look-up table is used to convert 10-bit uncorrected values of the elements of the unadjusted array into 8-bit corrected values of the elements for the newly-formed adjusted array, and is essentially equivalent to a Transfer Function Table that is disclosed in a commonly-assigned patent application, Ser. No. 09/441,581, filed on Nov. 17, 1999, titled "Method and Apparatus for Correcting Unadjusted Threshold Arrays for Halftoning by Use of Transfer Function Tables," also owned by the common assignee Lexmark International, Inc., which is incorporated by reference herein. An example of such a Transfer Function Table is provided in TABLE #5, depicted hereinabove, where it is referred to as a temporary look-up table.

After step 422 creates a scaled L* lightness value, a step 424 increments the value of "T," and decision step 420 again determines whether or not the value of "T" has reached its maximum value. The result will continue to be NO until the entire range of tone levels has been scaled, after which time the result at decision step 420 will become YES, and the logic flow will be directed to a step 430. At this point in the logic flow, the temporary look-up table has been fully generated.

Beginning at step 430, correction will be made to the unadjusted data, thereby resulting in a threshold array containing adjusted data. At step 430, a variable "C" is set equal to zero (0), and a variable "R" is also set to zero (0). The variable "R" is equivalent to the row of the adjusted array that is being calculated, and the variable "C" is equivalent to that array's column. In essence, the "R" variable is equal to the height of the unadjusted (as well as the adjusted) array, and the "C" variable is equal to width of those same unadjusted and adjusted arrays. It is preferred that the height and width of these arrays is 128×128 in size, which is the preferred size of a threshold array (or "screen") that will be used in a tiling manner to halftone a bitmap image. Using this array size, the variable "width" is set to a value of 128, and the variable "height" also is set to a value of 128.

The logic flow is now directed to a decision step 432 which determines if the current value of "R" is less than the maximum height of the unadjusted array. At this first pass through the logic, the result will of course be YES, and a decision step 440 will determine whether or not the current value of "C" is less than the width of the unadjusted array. The result at this first pass will of course be YES, and a step

450 will now calculate the value for a particular element of the adjusted threshold array.

At step 450, the adjusted array's particular row and column element (starting with (0,0) position) is determined by calculating the scaled value of L* from the unadjusted array, at that unadjusted array's same row and column position. Using the example 32×32 threshold array provided on TABLES #4–6, at the row and column (0,0), the unadjusted array element had a value of 924, of a possible range of 0–1023 (for 10-bit data). In the temporary Transfer Function Table used to convert the 10-bit unadjusted values to 8-bit adjusted values, it can be seen that the unadjusted value of 924 will result in an adjusted 8-bit value of 250, which is the value at the (0,0) position in the adjusted threshold array of TABLE #6.

It can be easily discerned that the 10-bit data of TABLE #4 was converted to 8-bit data in TABLE #6 using the parameterized transfer function that resulted in the temporary Transfer Function Table (e.g., TABLE #5). As a second example, a relatively "light" gray level can be seen at the bottom-left position of the unadjusted 32×32 threshold array of TABLE #4, which is the row and column position (31,0), in which the unadjusted 10-bit data value is 31. From TABLE #5, it can be seen that this unadjusted 10-bit value is to be adjusted to a numeric value of 24 in the 8-bit range of the adjusted array. The final result can be viewed in the bottom-left corner of TABLE #6, in which the numeric value of 24 is exhibited.

After a particular row and column element has been scaled, thereby creating the adjusted value in its proper location in the adjusted threshold array, a step 452 now increments the column value variable "C," and the logic flow is directed back to decision step 440. This inner DO-loop continues until all of the columns have been operated upon for this particular row, at which time the result at decision step 440 will become NO. When that occurs, a step 440 will reset the value for "C" to zero (0), and will increment the value for the row variable "R" by one (1). After that occurs, the logic flow is directed back to the decision step 432 to determine if the value of "R" is still less than the height of the array. The result at this decision step 432 will remain YES until all columns and all rows have been operated upon. When that occurs, the result at decision step 432 will become NO, and this routine will be finished so that the microprocessor can return to performing other tasks as the logic flow is directed to a step 434, labeled as "Done."

It will be understood that equations other than the exact ones provided on FIG. 11 could be used without departing from the principles of the present invention, while still obtaining the desirable results of the present invention. Furthermore, as an alternative embodiment, the transfer function equations can be sampled one row and column position at a time to directly derive the adjusted threshold array values without generating a temporary look-up table or "Transfer Function Table" of any form. Instead, each 10-bit data element of the unadjusted threshold array will be compared to its L* position on the uncorrected actual printer response curve (such as curve 102 on FIG. 2), and that particular value of L* will be used to intersect the ideal target response curve (i.e., line 100 on FIG. 2) to determine its proper gray level numeric value. Once this value is determined, it will be placed into the same row and column position in the adjusted threshold array.

Since a temporary look-up table is not needed in this alternative methodology, a certain amount of space in the printer's RAM would be saved that otherwise would need to be temporarily allocated. However, the execution time to derive the adjusted threshold array in this manner—that is, by inspecting each numeric value of the unadjusted threshold array and then applying the correct transfer function equation for the correct range of gray scale values to calculate the corrected numeric value in the adjusted array—will likely require greater processing time as compared to the preferred methodology of generating a look-up table by creating a conversion value once time for each single possible numeric value of an array element in the unadjusted threshold array.

In this alternative embodiment, multiple calculations will be necessary for the very same numeric value in circumstances where the unadjusted threshold array is of a sufficient size, i.e., if its size requires the same threshold level numeric value in multiple array element locations. For example, if the unadjusted threshold array is 128×128 in size, and if its array element precision is 10-bits, there will be sixteen (16) dots for each threshold level. In the alternative embodiment, the mathematical calculations (using the parameterized transfer function equations) must, therefore, be performed sixteen times for each possible numeric value in the unadjusted array. To the contrary, the mathematical calculations (using the parameterized transfer function equations) must be performed only once for each possible numeric value in the unadjusted array in order to generate a temporary look-up table.

Not only do the teachings of the present invention provide a much more ideal response for the printer's printed output as compared to the ideal perceptual level, but additionally a much smaller amount of memory space is utilized as compared to conventional adjusted arrays that are stored in a printer's ROM. It will be understood that, even a printer that may store its adjusted threshold arrays in a memory device other than ROM (e.g., such as a hard disk drive) will still require these adjusted threshold arrays to ultimately be downloaded into the printer's RAM. Thus, the printer must spend processing time and real time to upload information from the hard disk drive (in this example) into RAM, which greatly increases its processing time. Such a printer will either be very inefficient if this processing time must occur at the beginning of each print job, or such a printer must download into its RAM all of the needed adjusted threshold arrays upon initialization, which means that a large portion of its RAM must be allocated all of the time just to hold these adjusted threshold arrays. To the contrary, the present invention only stores the adjusted threshold arrays in RAM at run time for each individual print job, and only stores those adjusted threshold arrays for the precise type of print media and the type of colors that are to be printed for that particular print job.

As an example, if a color printer were to store a set of 8-bit adjusted threshold arrays for a color printer having four different colors, each of those colors would require 16 Kbytes per threshold array. These are the four ordinary colors that, for example, would include cyan, magenta, yellow, and black. However, certain ink jet color printers can also support two further pigments known as "dilute cyan" and "dilute magenta." Therefore, an additional threshold array is required for each dilute colorant. Furthermore, when the dilute colorants are used, a different formulation of black pigment is also used. Therefore, in addition to the four adjusted threshold arrays needed for the ordinary 4-color printing, an additional three adjusted threshold arrays are required if the dilute printing is also to be supported by a particular printer. Finally, if dilute ink printing is to be supported, there will also be required an additional threshold array for ordinary cyan and ordinary magenta colors when using the dilute ink cartridges. This now requires a total of nine different adjusted threshold arrays for any given single type of paper.

Since a printer will optimally support at least three different paper types, there will be a total of twenty-seven different unique combinations of paper versus ink type for which a unique threshold array must be generated and stored. Since each threshold array is 16K, and the total number of threshold arrays to be stored is equal to twenty-seven, the total number of bytes in memory required to store this information will be 432 Kbytes, which typically will take up space in the printer's ROM. As can be seen, this is almost one-half Mbyte of memory locations merely to hold the various threshold arrays. Of course, if true Read Only Memory is utilized, then these arrays will not be required to be downloaded into RAM for image processing by the printer when it is time to halftone an incoming print job. On the other hand, if a hard disk drive, for example, is used to store these arrays, then processing time and real time to access the hard disk drive will be required to download the data from the hard disk, and RAM space must be then allocated to hold the appropriate arrays.

When using the principles of the present invention, the example of the 10-bit unadjusted stochastic threshold array as the starting point is implemented using much less memory space. For example, a single set of unadjusted 10-bit threshold arrays are to be stored in ROM, one for each of the four normal color planes. Each 10-bit threshold array requires 20 Kbytes, which is 25% larger than a set of unadjusted 8-bit arrays that have been used in conventional printers in the past. In other words, if four threshold arrays were stored for the four ordinary colors in 8-bit precision, then each array would require 16 Kbytes, leading to a total of 64 Kbytes of ROM space required.

However, the 10-bit unadjusted threshold arrays are the preferred embodiment, and thus 80 Kbytes of ROM are required to hold those four threshold arrays. The transfer function equations are also stored in ROM, and each set of transfer function equations (i.e., for a particular combination of color and type of print media) requires only about 70 bytes of memory space in ROM. Since there are twenty-seven different combinations of colors and paper styles to be supported, there optimally would be twenty-seven (27) different sets of transfer function equations stored in ROM. This added to the 80 Kbytes of ROM holding the initial 10-bit threshold arrays provides a total requirement of about 82 Kbytes of ROM space in the printer. Of course, it is quite obvious that this is much smaller than the conventional printer's requirements that would require 432 Kbytes of ROM space to hold 8-bit adjusted arrays for the same twenty-seven combinations (and even considerably smaller than the use of Transfer Function Tables disclosed in the co-pending patent application noted hereinabove, Ser. No. 09/441,581, also assigned to Lexmark International, Inc.).

It will be understood that all of the memory size examples provided hereinabove assume that the data will be packed, as according to the principles of the present invention that, were described hereinabove. Obviously, to best utilize the packed data, it must first be unpacked, preferably according to the principles described hereinabove with respect to the flow charts provided on either FIG. 6, or FIG. 8. In the preferred embodiment discussed above, when it is time (i.e., at run time) to print an incoming print job, the stochastic threshold arrays stored in ROM for the four different ordinary colors must be utilized to create the necessary adjusted 8-bit threshold arrays for a particular type of print media.

If array data is required to print four different colors (i.e., for the ordinary colors such as cyan, magenta, yellow, and black), then four different adjusted 8-bit threshold arrays must be generated and stored in the printer's RAM, such as RAM 15 on FIG. 1. Each 8-bit threshold array requires 16 Kbytes of RAM, so to print using the four ordinary colors, a total of 64 Kbytes of RAM are required. If on the other hand six colors are to be printed (e.g., if the diluted pigments are going to be used), then a total of six adjusted 8-bit threshold arrays need to be generated and stored in RAM, which would require 96 Kbytes of RAM. Even in this worst case scenario, using the principles of the present invention a total of 203 Kbytes of memory are required (i.e., including both ROM and RAM memory requirements), which is still much less than the amount required by conventional printers that use 432 Kbytes of ROM space alone. This is, of course, quite a savings of memory resources.

It will be understood that the unadjusted threshold array data and the transfer function equations data could be stored in a memory device other that ROM, such as a hard disk drive. Moreover, the principles of the present invention can be applied to any type of printer, including laser printers, ink jet printers, thermal transfer printers, copiers having electrophotographic print engines, and so on (any of which could use either ROM or a hard disk drive to store array data).

Additionally, the unadjusted threshold array data and the transfer function equations data could be stored in a non-volatile memory device (e.g., a hard disk drive) located on a host computer (such as the "input device" 24 on FIG. 1) and downloaded to the printer either upon the printer's initialization (by way of a request from the printer to the host, for example), or upon an unsolicited communication from the host computer. In this configuration, the printer itself would need only RAM volatile-type memory to hold this information, although in a realistic application it is likely that a printer would at least hold a default unadjusted threshold array and a default set of transfer function equations within its own non-volatile memory devices.

An alternative to downloading the transfer function equations into the printer's RAM memory from a host computer (as per the example in the previous paragraph) is to download these equations into a different non-volatile memory device, such as a Flash memory device or an EEPROM memory device located either within the printer, or on a replaceable cartridge. An example of this is the memory device 42 that is part of the print engine 36, in which the transfer function equations could be downloaded into this device 42 from either a host computer, or from the printer 10 itself (as will be discussed below). Another example is the memory device 62 that is mounted on a replaceable cartridge 60, in which the transfer function equations could be downloaded additionally (or only) into this device 62 from either a host computer, or from the printer 10 itself (as also will be discussed below).

One situation in which the transfer function equations could be downloaded into one or both of the memory devices 42 and 62 is to compensate for the shift in print darkness over the life of a laser printer's process cartridge (e.g., replaceable cartridge 60). It is a well-known phenomena that many (if not most) laser print engines tend to produce darker printed images as the cleaner blade gradually scrapes away the capacitively-charged outer layer of the photoconductive (PC) drum (not shown) as printed sheets are produced by the laser print engine. In this circumstance, the energy density of the PC drum (i.e., capacitance per unit area of the PC drum) gradually increases, and the toner material tends to adhere more easily, the consequence of which is more toner is applied to the print media per printed pixel or pel. Other print engine parameters may also tend to increase the darkness of the printed output image on the print media over the life of the EP process cartridge.

In the past, this gradual darker printed output has not specifically been corrected. Instead, the initial printer response curve is "overcorrected" to a certain extent, with the knowledge that the darkness rapidly changes over the first one thousand sheets that are printed using a new EP process cartridge. In this scenario, the printer response will not look similar to that of FIG. 2, which has a decidedly concave shape to its response curve 102. Instead, the printer response for a new EP process cartridge is designed to have a somewhat convex shape that remains above the desired linear response (such as the line 100 on FIG. 2) all the way across the Gray scale range. After the first one thousand sheets have been printed, the printer response curve will quickly have dropped to approximately emulate the line 100, although the actual response curve will continually change over the usage of the EP process cartridge. However, the rate of change slows considerably after the initial usage of the EP process cartridge.

For EP process cartridges sold by Lexmark International, Inc. the shape of the printer response curve will gradually look more and more like the concave shape of curve 102. In other words, the endpoints at Gray scale values of zero (0) and 255 will not significantly change, and the shape itself of the response curve is what changes over usage life of the EP process cartridge. For EP process cartridges sold be other printer manufacturers, not only does the shape of the curve change over the usage life, but also the endpoints may change (at least for the "darker" endpoint at a Gray scale value of 255).

In either case discussed above, it is possible to attempt to compensate for the gradual darkness increase by use of the transfer functions utilizing the principles of the present invention. The printer designer must determine the printer response of a typical EP process cartridge over its usage life, and then decide at what usage intervals a correction should be made. This is precisely where the memory device 62 mounted on the EP process cartridge 60 can be effectively used, since each style of EP process cartridge may have a different change in printed darkness over its life, and this information can be easily stored in a non-volatile memory device, such as Flash or NVRAM (such as an EEPROM), or even in a write only, read often memory device such as an EPROM. This information can be transferred into the printer 10 upon command by the printer, preferably upon the printer's initialization.

The information about a particular EP process cartridge can be stored in various places within printer 10. It can be stored in RAM 15, so that it may be manipulated in any desired manner, however, it also will probably be stored in a non-volatile memory device within the printer so that this information is not lost upon de-energization of the printer. This EP process cartridge information can be stored in the printer's main memory system, such as at the Flash memory 52, the NVRAM 26, or the hard disk drive 50. In addition, or alternatively (as desired), this EP process cartridge information can be stored in the print engine's non-volatile memory 42. In either case, the transfer functions can perform a supplemental operation upon the adjusted threshold array (or arrays), and this supplemental operation is specifically designed to compensate for the gradual tendency for the print engine to produce a darker printed output over the life of the EP process cartridge.

The final result is to derive a new adjusted threshold array (or arrays) that will have somewhat different numeric elements depending upon the amount of previous usage of the EP process cartridge. By effectively causing the printer's response to become lighter over the usage of the EP process cartridge, the printer will also use less toner material than before, thereby providing a new benefit of a toner reservoir that produces more printed sheets while using the same amount of toner material. Another benefit is that uses of the printer will not perceive an obvious difference in print quality just after installing a new EP process cartridge. As things stand in conventional printers, a brand new EP process cartridge produces considerably lighter printed images as compared to the "old" EP process cartridge that was just removed from the same printer.

The printer response curve for a particular style of EP process cartridge (or other "pure" toner cartridge) can be mathematically described, and this information is used to generate appropriate transfer function equations that are appropriate for different usage intervals. Since the transfer function equations require very little memory space, it is possible to store multiple sets of these transfer function equations so that a new set is provided at regular usage intervals of the EP process cartridge, or a single set of transfer function equations can be provided in which EP process cartridge usage is one of the variables. The determination of actual usage can be accomplished in many ways, such as by counting the number of sheets that have been printed using a particular EP process cartridge, or by some measurement means that directly provides an indication of the remaining toner material (and by deduction, determines the amount of toner material already used). The tracking of this usage information can be controlled by the printer 10, and the usage information can be stored within the printer's memory, or perhaps within the memory device mounted on the EP process cartridge. If an EP process cartridge is removed from the printer, and later reinstalled, then it would be desirable for the printer to be able to determine how much usage this EP process cartridge had previously undergone.

It will be understood that particular combinations of print engine components and styles of EP process cartridges may cause the printed output to actually become lighter during use of the equipment. In this situation, the principles of the present invention still apply, although the transfer function equations would instead darken the printer response as the equipment is used.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for generating an adjusted threshold array in an image forming apparatus, comprising:
   (a) providing an unadjusted threshold array;
   (b) providing at least one transfer function equation;
   (c) applying said at least one transfer function equation to said unadjusted threshold array at run time to derive an adjusted threshold array;
   (d) halftoning at least one color of an input image by use of said adjusted threshold array; and
   (e) storing said unadjusted threshold array in a first portion or a memory circuit; storing said at least one transfer function equation in a second portion of said memory circuit; and temporarily storing said adjusted threshold array in a third portion of said memory circuit.

2. The method as recited in claim 1, wherein said image forming apparatus comprises a printer, said first portion of said memory circuit comprises read only memory (ROM), said second portion of said memory circuit comprises one of read only memory (ROM) and non-volatile random access memory (NVRAM), and said third portion of said memory circuit comprises one of random access memory (RAM) and a plurality of registers.

3. A method for generating an adjusted threshold array in a printer, comprising:

(a) providing an unadjusted threshold array;

(b) providing at least one transfer function equation;

(c) applying said at least one transfer function equation to said unadjusted threshold array at run time to derive an adjusted threshold array;

(d) halftoning at least one color of an input image print job by use of said adjusted threshold array;

(e) storing a plurality of unadjusted threshold arrays in a read only memory (ROM) circuit, wherein each single of said plurality of unadjusted threshold arrays represents a single color of a color printer;

(f) storing a plurality of transfer function equations in one of a second portion of said read only memory (ROM) circuit and a non-volatile random access memory (NVRAM) circuit, wherein at least one of said transfer function equations corresponds to one of said plurality of unadjusted threshold arrays that represents a single color of said color printer; and (g) wherein a size of memory storage space required to store all of said plurality of unadjusted threshold arrays and all of said plurality of transfer function equations is less than a size of memory storage space that would be required to store all of a set of adjusted threshold arrays that corresponds to all possible combinations of printable colors of said color printer and all expected print media types to be printed upon by said color printer.

4. A method for generating an adjusted threshold array in an image forming apparatus, comprising:

(a) providing an unadjusted threshold array;

(b) providing at least one transfer function equation;

(c) applying said at least one transfer function equation to said unadjusted threshold array at run time to derive an adjusted threshold array;

(d) halftoning at least one color of an input image by use of said adjusted threshold array;

wherein said unadjusted threshold array comprises a first plurality of individual elements each having a numeric value of a first predetermined precision, and said adjusted threshold array comprises a second plurality of individual elements each having a numeric value of a second predetermined precision;

wherein said first predetermined numeric precision is greater than said second predetermined numeric precision; and wherein said first predetermined numeric precision comprises 10-bit integer data having a range of values from 0–1023 inclusive, and said second predetermined numeric precision comprises 8-bit integer data having a range of values from 0–255 inclusive.

5. The method as recited in claim 4, wherein said at least one transfer function equation generates a temporary look-up table having 1024 elements, each of said elements having a numeric value within a range of 0–255 inclusive.

6. A method for generating an adjusted threshold array in an image forming apparatus, comprising:

(a) providing an unadjusted threshold array;

(b) providing at least one transfer function equation;

(c) applying said at least one transfer function equation to said unadjusted threshold array at run time to derive an adjusted threshold array;

(d) halftoning at least one color of an input image by use of said adjusted threshold array; and (e) generating a temporary look-up table of conversion values based upon the results of applying said at least one transfer function equation, and thereby deriving individual elements of said adjusted threshold array.

7. A method for generating an adjusted threshold array in an image forming apparatus, comprising:

(a) providing an unadjusted threshold array;

(b) providing at least one transfer function equation;

(c) applying said at least one transfer function equation to said unadjusted threshold array at run time to derive an adjusted threshold array, wherein said unadjusted threshold array comprises a plurality of individual elements each being a 10-bit binary number;

(d) halftoning at least one color of an input image by use of said adjusted threshold array; and (e) packing said plurality of 10-bit elements and storing said packed 10-bit elements in a non-volatile memory of a printer.

8. The method as recited in claim 7, further comprising: iteratively unpacking said plurality of 10-bit elements and temporarily storing them in a random access memory (RAM) of a printer at run time, when a print job requiring halftoning is received by said printer.

9. The method as recited in claim 8, further comprising: iteratively accessing each of said unpacked 10-bit elements so as to apply said at least one transfer function equation to said unadjusted threshold array, thereby deriving individual 8-bit elements of said adjusted threshold array.

10. The method as recited in claim 7, further comprising: at run time, iteratively unpacking each individual of said plurality of 10-bit elements and applying said at least one transfer function equation to said individual elements of said unadjusted threshold array, thereby iteratively deriving each individual 8-bit element of said adjusted threshold array for use by a printer, when a print job requiring halftoning is received by said printer.

11. A method for generating an adjusted threshold array in an image forming apparatus, comprising:

(a) providing an unadjusted threshold array;

(b) providing at least one transfer function equation;

(c) applying said at least one transfer function equation to said unadjusted threshold array at run time to derive an adjusted threshold array;

(d) halftoning at least one color of an input image by use of said adjusted threshold array; and (e) printing said at least one halftoned color, wherein said adjusted threshold array compensates for a gradual change in darkness of printer response due to at least one of: (i) use of components of said image forming apparatus over its life, and (ii) use of components of an electrophotographic process cartridge over its life, by application of at least one transfer function equation that is provided at predetermined usage amounts.

12. An image forming apparatus, comprising:
(a) a memory circuit for storage of data, wherein an unadjusted threshold array is stored in a first portion of said memory circuit, and at least one transfer function equation is stored in a second portion of said memory circuit;
(b) a communications port that is effectively connected to at least one external device and to said memory circuit, said communications port providing data from said at least one external device to said memory circuit; and
(c) a processing circuit that is configured to control the flow of data between said memory circuit and said communications port, and to apply said at least one transfer function equation to said unadjusted threshold array to derive an adjusted threshold array, and to halftone at least one color of an input image by use of said adjusted threshold array.

13. The image forming apparatus as recited in claim 12, wherein said image forming apparatus comprises one of: a liquid crystal display (LCD), a light-emitting diode (LED) display, and a cathode ray tube (CRT) display, and further comprises a video viewing screen that outputs a halftoned image.

14. The image forming apparatus as recited in claim 12, wherein said unadjusted threshold array is generated by one of: classical screening, using cluster-dot ordered dithering; stochastic screening, using cluster-dot unordered dithering; Bayer screening, using dispersed-dot ordering dithering; and stochastic screening, using dispersed-dot unordered dithering.

15. The image forming apparatus as recited in claim 12, wherein said image forming apparatus comprises a printer, and further comprises a print engine that outputs a halftoned image.

16. The printer as recited in claim 15, wherein said adjusted threshold array is derived at run time when a print job is received at said communications port.

17. The printer as recited in claim 15, wherein: (a) a plurality of unadjusted threshold arrays are stored in a read only memory (ROM) circuit, wherein each single of said plurality of unadjusted threshold arrays represents a single color of a color printer; (b) a plurality of transfer function equations are stored in one of a second portion of said read only memory (ROM) circuit and a non-volatile random access memory (NVRAM) circuit, wherein said plurality of transfer function equations corresponds to one of said plurality of unadjusted threshold arrays that represents a single color of said color printer; and (c) wherein a size of memory storage space required to store all of said plurality of unadjusted threshold arrays and all of said plurality of transfer function equations is less than a size of memory storage space that would be required to store all of a set of adjusted threshold arrays that corresponds to all possible combinations of printable colors of said color printer and all expected print media types to be printed upon by said color printer.

18. The printer as recited in claim 15, wherein the first portion of said memory circuit comprises read only memory (ROM), the second portion of said memory circuit comprises one of read only memory (ROM) and non-volatile random access memory (NVRAM), and the third portion of said memory circuit comprises one of a plurality of registers and random access memory (RAM).

19. The printer as recited in claim 18, wherein said printer derives an adjusted threshold array for only a precise printing requirement of said received print job.

20. The printer as recited in claim 19, wherein said precise printing requirement comprises a predetermined color and a predetermined type of print media.

21. The printer as recited in claim 18, wherein said printer derives an adjusted threshold array for only a precise printing requirement of said received print job.

22. The printer as recited in claim 21, wherein said precise printing requirement comprises a predetermined color and a predetermined type of print media.

23. The printer as recited in claim 15, wherein said unadjusted threshold array comprises a first plurality of individual elements each having a numeric value of a first predetermined precision, and said adjusted threshold array comprises a second plurality of individual elements each having a numeric value of a second predetermined precision.

24. The printer as recited in claim 23, wherein said first predetermined numeric precision is greater than said second predetermined numeric precision.

25. The printer as recited in claim 24, wherein said first predetermined numeric precision comprises 10-bit integer data having a range of values from 0–1023 inclusive, and said second predetermined numeric precision comprises 8-bit integer data having a range of values from 0–255 inclusive.

26. The printer as recited in claim 25, wherein application of said at least one transfer function equation generates a temporary look-up table having 1024 elements, each of said elements having a numeric value within a range of 0–255 inclusive.

27. The printer as recited in claim 23, wherein said first predetermined numeric precision comprises 8-bit integer data having a range of values from 0–255 inclusive, and said second predetermined numeric precision comprises 8-bit integer data having a range of values from 0–255 inclusive.

28. The printer as recited in claim 27, wherein application of said at least one transfer function equation generates a temporary look-up table having 256 elements, each of said elements having a numeric value within a range of 0–255 inclusive.

29. The image forming apparatus as recited in claim 12, wherein said at least one color comprises one of: red, green, blue, cyan, magenta, yellow, black, diluted cyan, and diluted magenta.

30. A method for halftoning an image, comprising:
(a) printing a plurality of dot groups, said dot groups representing different shades of a predetermined color;
(b) measuring the brightness of said plurality of dot groups, and generating an unadjusted printer response data set;
(c) providing an unadjusted threshold array for said predetermined color;
(d) generating at least one transfer function equation from said unadjusted printer response data set; and
(e) applying said at least one transfer function equation to said unadjusted threshold array to derive an adjusted threshold array that exhibits an improved perceptual printer response when used for halftoning said predetermined color.

31. The method as recited in claim 30, wherein said unadjusted threshold array is created off-line; said at least one transfer function equation is generated off-line; and said adjusted threshold array is derived at run time, when a printer receives a print job requiring halftoning.

32. The method as recited in claim 30, wherein said at least one transfer function equation is determined by substantially matching a shape of at least one curve to a shape of said unadjusted printer response data set, when plotted on a graph.

33. The method as recited in claim 32, wherein a first of said at least one transfer function equation substantially matches the shape of said unadjusted printer response data set, when plotted on a graph, for a first portion of gray scale levels; and a second of said at least one transfer function equation substantially matches the shape of said unadjusted printer response data set, when plotted on a graph, for a second portion of gray scale levels.

34. The method as recited in claim 30, wherein said unadjusted threshold array comprises a plurality of individual elements each being a 10-bit binary number; and further comprising packing said plurality of 10-bit elements and storing said packed 10-bit elements in a non-volatile memory of a printer.

35. The method as recited in claim 34, further comprising: iteratively unpacking said plurality of 10-bit elements and temporarily storing them in a random access memory (RAM) of a printer at run time, when a print job requiring halftoning is received by said printer.

36. The method as recited in claim 35, further comprising: iteratively accessing each of said unpacked 10-bit elements so as to apply said at least one transfer function equation to said unadjusted threshold array; and deriving individual 8-bit elements of said adjusted threshold array.

37. The method as recited in claim 35, further comprising: iteratively accessing each of said unpacked 10-bit elements so as to apply said at least one transfer function equation to said unadjusted threshold array; generating a temporary look-up table of conversion values based upon the results of applying said at least one transfer function equation; and deriving individual 8-bit elements of said adjusted threshold array.

38. The method as recited in claim 34, further comprising: at run time, iteratively unpacking each individual of said plurality of 10-bit elements and applying said at least one transfer function equation to said individual elements of said unadjusted threshold array; and iteratively deriving each individual 8-bit element of said adjusted threshold array for use by a printer, when a print job requiring halftoning is received by said printer.

39. The method as recited in claim 30, wherein said unadjusted threshold array comprises a plurality of individual elements each being a multi-byte binary number; and further comprising packing said plurality of multi-byte elements and storing said packed multi-byte elements in a non-volatile memory of a printer.

40. The method as recited in claim 39, further comprising: iteratively unpacking said plurality of multi-byte elements and temporarily storing them in a random access memory (RAM) of a printer at run time, when a print job requiring half toning is received by said printer.

41. The method as recited in claim 40, further comprising: iteratively accessing each of said unpacked multi-byte elements so as to apply said at least one transfer function equation to said unadjusted threshold array; and deriving individual single-byte elements of said adjusted threshold array.

42. The method as recited in claim 41, further comprising: at run time, iteratively unpacking each individual of said plurality of multi-byte elements and applying said at least one transfer function equation to said individual elements of said unadjusted threshold array; and iteratively deriving each individual single-byte element of said adjusted threshold array for use by a printer, when a print job requiring halftoning is received by said printer.

43. A method for dynamically generating an adjusted threshold array in an image forming apparatus, comprising:
    (a) providing an unadjusted threshold array comprising a plurality of individual array elements of "x" precision;
    (b) providing at least one transfer function equation;
    (c) applying said at least one transfer function equation to said unadjusted threshold array at run time to derive an adjusted threshold array, wherein said adjusted threshold array comprises a plurality of individual array elements of "y" precision, wherein said "x" precision is greater than said "y" precision; and
    (d) halftoning at least one color of an input image by use of said adjusted threshold array.

44. The method as recited in claim 43, wherein said "x" precision comprises 10-bit data, and said "y" precision comprises 8-bit data.

45. The method as recited in claim 44, further comprising packing said plurality of 10-bit elements and storing said packed 10-bit elements in a non-volatile memory of a printer.

46. The method as recited in claim 45, further comprising: at run time, iteratively unpacking each individual of said plurality of 10-bit elements and applying said at least one transfer function equation to said individual elements of said unadjusted threshold array; and iteratively deriving each individual 8-bit element of said adjusted threshold array for use by a printer, when a print job requiring halftoning is received by said printer.

47. A method for dynamically adjusting intensity levels used in threshold arrays, comprising:
    (a) providing unadjusted intensity level data of an image forming apparatus, said unadjusted intensity level data comprising a plurality of individual data of "x" precision;
    (b) providing at least one transfer function equation; and
    (c) dynamically adjusting said unadjusted intensity level data at run time by application of said at least one transfer function equation to said unadjusted intensity level data, and thereby deriving adjusted intensity level data which comprises a plurality of individual data of "y" precision, wherein said "x" precision is greater than said "y" precision.

48. The method as recited in claim 47, wherein said "x" precision comprises 10-bit data, and said "y" precision comprises 8-bit data.

\* \* \* \* \*